May 30, 1944.     C. D. REYNOLDS     2,350,128
BOBBIN-WINDING MACHINE
Filed June 17, 1942     21 Sheets-Sheet 1

May 30, 1944.                C. D. REYNOLDS                2,350,128
                          BOBBIN-WINDING MACHINE
                    Filed June 17, 1942        21 Sheets-Sheet 5

Fig. 5.

Inventor:
Charles D. Reynolds
By Watson, Cole, Grindle & Watson
Attorneys.

May 30, 1944.    C. D. REYNOLDS    2,350,128
BOBBIN-WINDING MACHINE
Filed June 17, 1942    21 Sheets-Sheet 7

Inventor:
Charles D. Reynolds
By
Watson, Cole, Grindle & Watson
Attorneys.

May 30, 1944.  C. D. REYNOLDS  2,350,128
BOBBIN-WINDING MACHINE
Filed June 17, 1942  21 Sheets-Sheet 8

Inventor:
Charles D. Reynolds
By
Watson, Cole, Grindle & Watson
Attorneys.

Inventor:
Charles D. Reynolds
By
Watson, Cole, Grindle
& Watson Attorneys.

May 30, 1944.  C. D. REYNOLDS  2,350,128
BOBBIN-WINDING MACHINE
Filed June 17, 1942  21 Sheets-Sheet 14

Inventor:
Charles D. Reynolds
By
Watson, Cole, Grindle & Watson
Attorneys.

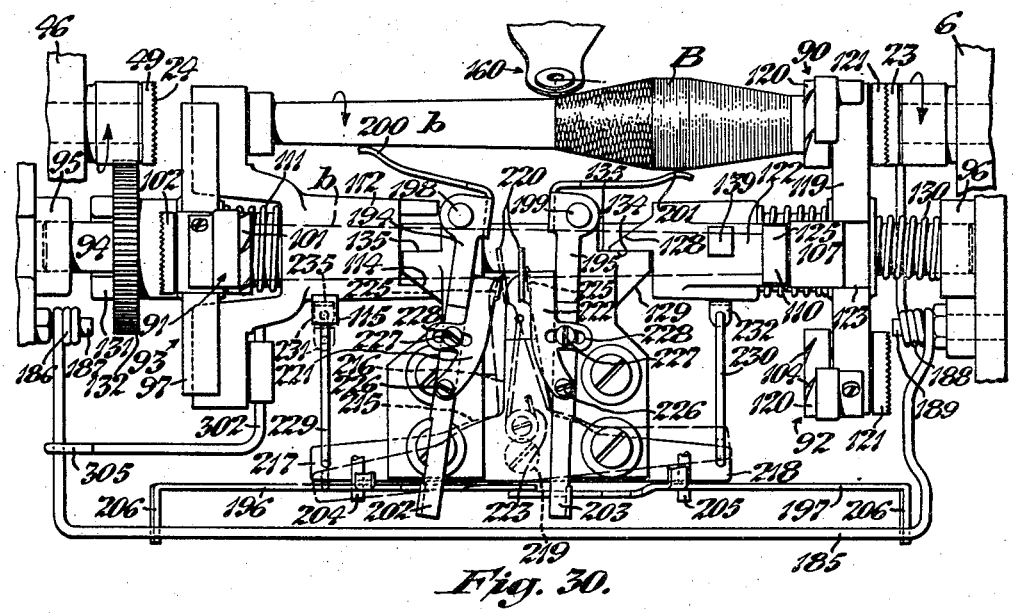

May 30, 1944.　　　C. D. REYNOLDS　　　2,350,128
BOBBIN-WINDING MACHINE
Filed June 17, 1942　　　21 Sheets-Sheet 16

Inventor:
Charles D. Reynolds
By Watson, Cole, Grindle
& Watson
Attorneys.

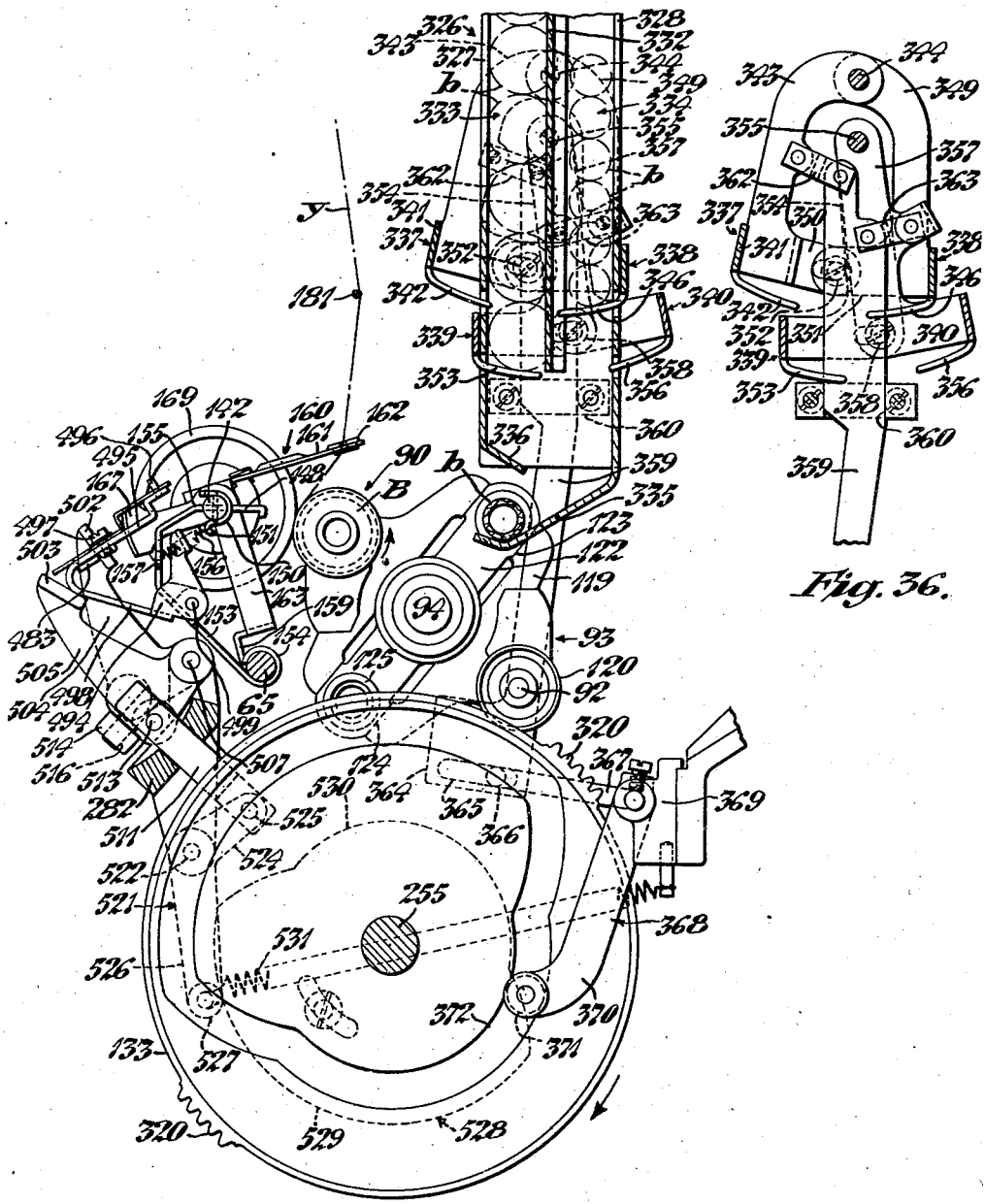

May 30, 1944. C. D. REYNOLDS 2,350,128
BOBBIN-WINDING MACHINE
Filed June 17, 1942 21 Sheets-Sheet 19

Inventor:
Charles D. Reynolds
By
Watson, Cole, Grindle & Watson
Attorneys.

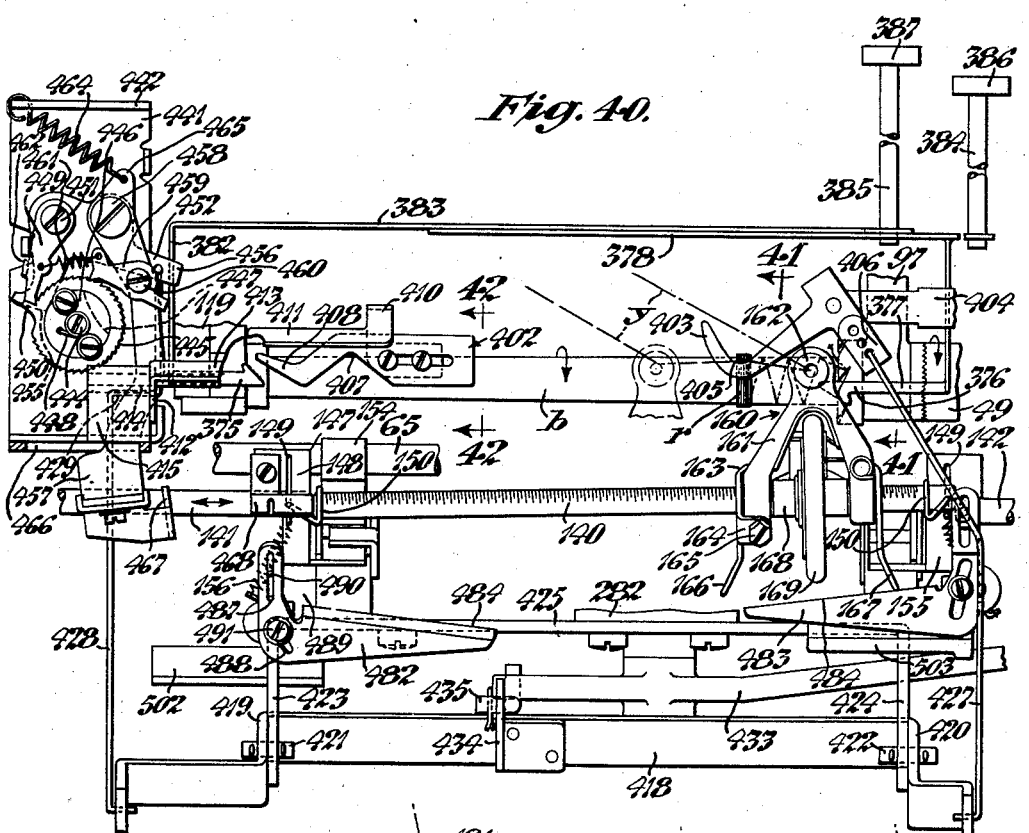
Fig. 40.
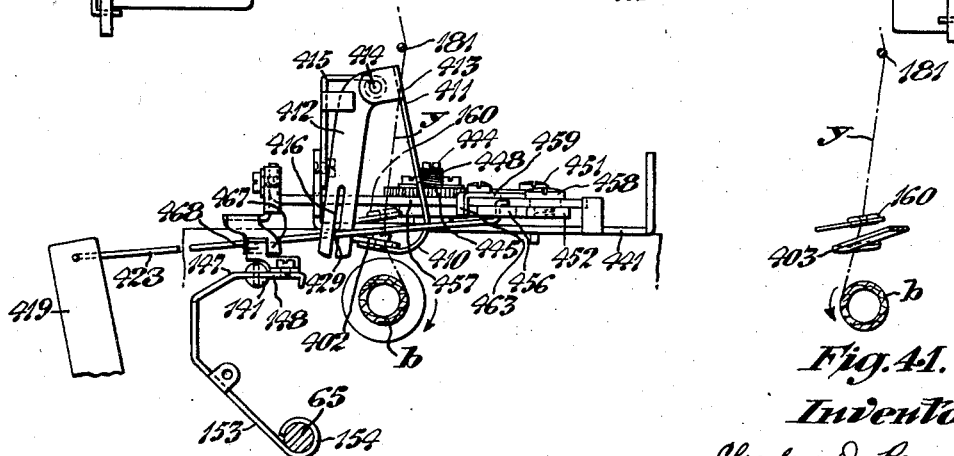
Fig. 42.
Fig. 41.
Inventor:
Charles D. Reynolds
By
Watson, Cole, Grindle & Watson
Attorneys.

May 30, 1944. C. D. REYNOLDS 2,350,128
BOBBIN-WINDING MACHINE
Filed June 17, 1942 21 Sheets-Sheet 21

Inventor:
Charles D. Reynolds
By
Watson, Cole, Grindle & Watson
Attorneys.

Patented May 30, 1944

2,350,128

UNITED STATES PATENT OFFICE 2,350,128

BOBBIN-WINDING MACHINE

Charles D. Reynolds, Cranston, R. I., assignor to Universal Winding Company, Boston, Mass., a corporation of Massachusetts Application June 17, 1942, Serial No. 447,378

60 Claims. (Cl. 242—32)

The present invention relates to improvements in winding machines and more particularly to automatic machines for winding cops, bobbins, pirns and other forms of packages, for example, bobbins of yarn to be used as filling or weft in the shuttles of looms.

In the present specification and claims the term "bobbin" is employed for convenience of description to apply to any usual form of textile package, the term "yarn-carrier" to apply to any form of core on which the bobbin is wound and the term "yarn" is intended to designate all types of strand materials.

Completely automatic machines for winding bobbins have heretofore been proposed in which empty cores or yarn-carriers are supplied automatically to a winding spindle, the end of the yarn strand attached to the yarn-carrier and the spindle rotated to wind the yarn on the carrier. During the winding the yarn strand is guided by a reciprocating thread-guide and means are provided for progressively advancing the thread-guide longitudinally of the yarn-carrier to deposit the yarn in overlapping conical layers to produce a bobbin. When the winding of a bobbin is completed it is doffed automatically from the winding spindle, an empty yarn-carrier donned and a new winding operation started at the same end where the bobbin on the previously wound bobbin was started. It has therefore been necessary in these prior art machines to provide mechanism for returning the thread-guide to initial winding position even though such return of the thread-guide performs no function in the winding operation and requires time that otherwise could be employed for winding.

One of the objects of the present invention is to provide a machine of the type indicated for winding bobbins in opposite directions on successively positioned yarn-carriers.

Another object is to provide a machine of the type indicated adapted to start winding a bobbin on an empty yarn-carrier at the end where the winding on the previously wound bobbin was completed.

Another object is to provide a machine of the type indicated which is adapted to arrest the winding operation upon completion of each bobbin wound in either direction.

Another object is to provide a machine of the type indicated which is adapted to mount successive yarn-carriers in reverse relationship.

Another object is to provide a machine of the type indicated in which the direction of rotation of alternate yarn-carriers is reversed as the bobbins are wound thereon in opposite directions.

Another object is to provide a machine of the type indicated in which the thread-guide is advanced longitudinally of the yarn-carrier in either direction depending upon the direction of rotation of the yarn-carrier.

Another object is to provide a machine of the type indicated with yarn-retaining means for engaging the yarn strand at the beginning of the winding in either direction to restrain its traverse to wind a reserve length of yarn or "bunch" on the yarn-carrier.

Another object is to provide a machine of the type indicated with means for automatically doffing wound bobbins and donning empty yarn-carriers.

Another object is to provide a machine of the type indicated with a magazine adapted to supply successive yarn-carriers one at a time in reversed relationship.

Another object is to provide a machine of the type indicated with a rotary turret adapted to mount a yarn-carrier in winding position and to grip an empty yarn-carrier supplied from the magazine at a point angularly displaced from the winding yarn-carrier.

Another object is to provide a turret of the type indicated having a plurality of rotatable spindles arranged in angular spaced relationship thereon.

Another object is to provide a turret of the type indicated with means for doffing a wound bobbin from one spindle and advancing an empty yarn-carrier on an adjacent spindle into winding position during rotation of the turret.

Another object is to provide a machine of the type indicated with a driving head at each end of the turret for alternately engaging successively operative spindles.

Another object is to provide a machine of the type indicated with means for moving the turret axially during its rotation to engage and disengage the successive winding spindles with opposite driving heads.

Another object is to provide a machine of the type indicated with means operative by the growth of the package being wound for arresting the winding operation, doffing a wound bobbin, donning an empty carrier and starting a new winding in rapid sequence.

Another object is to provide a machine of the type indicated with means operative upon breakage of the yarn or exhaustion of its supply for arresting the winding operation without initiating the operation of the doffing and donning means.

Another object of the invention is to provide a machine of the type indicated for continuously winding bobbins without manual attention except to replenish the yarn supplies and supply empty yarn-carriers to the magazine.

Further objects of the invention are set forth in the following specification which describes one preferred form of construction of the machine, by way of example, as illustrated by the accompanying drawings. In the drawings:

Fig. 5 is a transverse sectional view taken on line 5—5 of Fig. 4 showing the turret for mounting individual yarn-carriers in winding position and the magazine for advancing empty yarn-carriers into position to be donned on the turret;

Fig. 22 (sheet 1) is a sectional view taken on line 22—22 of Fig. 1 showing the clutch for connecting the traversing means to its drive-shaft and the means for operating the clutch simultaneously with the operation of the spindle-clutches;

Fig. 30 is a view similar to Fig. 27 showing the opposite feeler set to be operated when a bobbin is being wound toward the right as viewed in Fig. 1;

Fig. 31 is a view similar to Fig. 28 showing the drop-wire supported by the control lever opposite from that illustrated in Fig. 28;

Fig. 35 is a transverse sectional view taken on line 35—35 of Fig. 4 showing the magazine for supplying empty bobbins and the cam-operated means for releasing yarn-carriers from the magazine and setting the former-bar bearing plates;

Fig. 36 is a detailed view showing the means for operating the upper and lower gates of the magazine to release successive yarn-carriers in alternately reversed relationship;

Fig. 40 is a detailed plan view showing the yarn-retaining or bunch-building members adjacent opposite ends of the yarn-carrier and the common operating means therefor;

Fig. 41 is a sectional view taken generally on line 41—41 of Fig. 40 showing the relationship of one yarn-retaining member with respect to the thread-guide and yarn-carrier during the winding of a bunch on the carrier prior to the service winding;

Fig. 42 is a transverse sectional view taken on line 42—42 of Fig. 40 showing the other yarn-retaining member for engaging the yarn strand when a bobbin is wound in the opposite direction.

General organization

Figure 1:
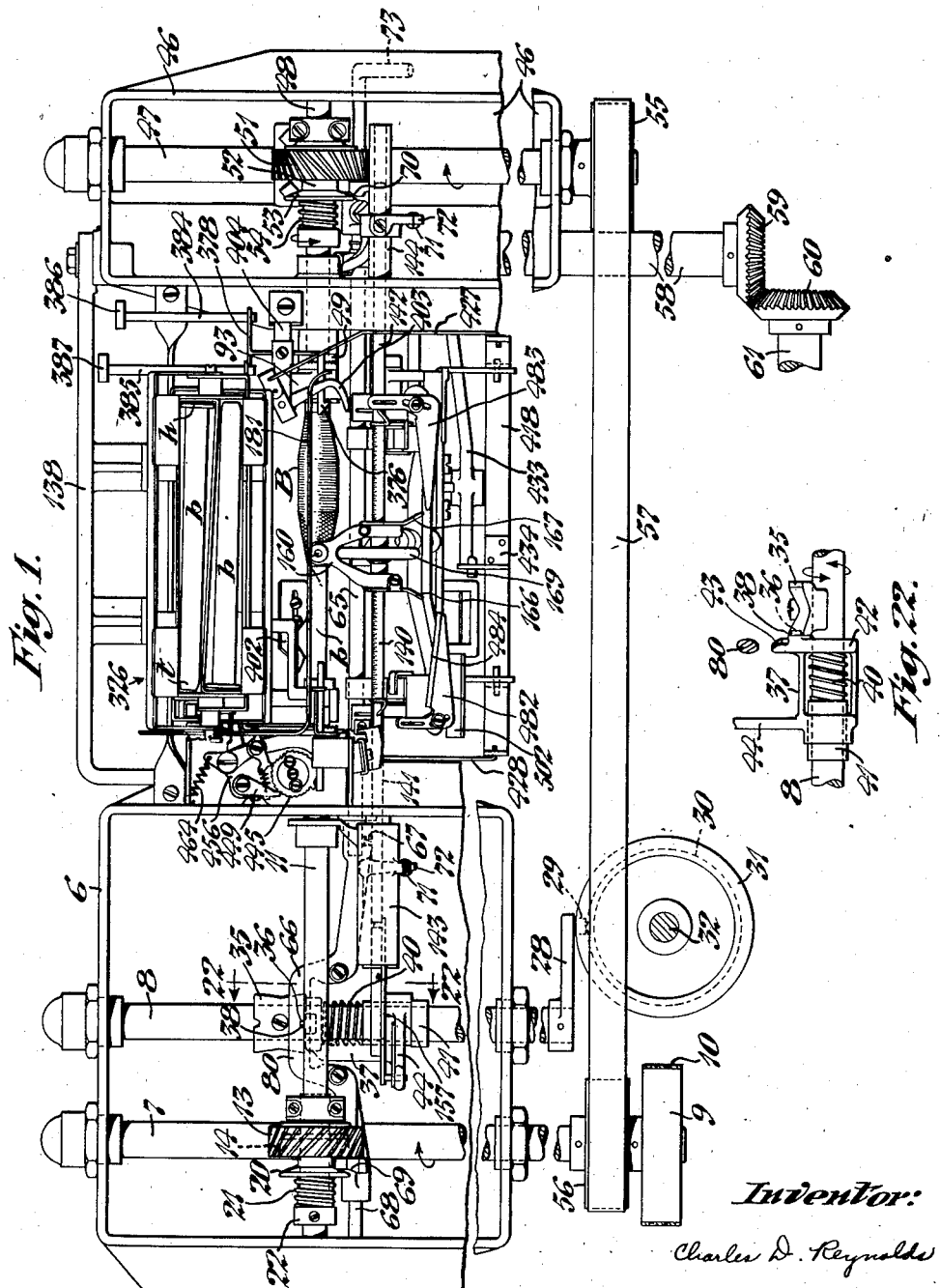
Fig. 1 is a plan view of a single winding unit of a gang machine incorporating the novel features of the present invention.

The present invention relates in general to a multiple unit automatic winding machine for simultaneously winding a plurality of bobbins. Only one winding unit is shown and described herein but it will be understood that a plurality of such winding units may be arranged in series on opposite sides of the machine. At each winding unit the bobbin being wound is mounted on one of a plurality of rotatable spindles arranged in angularly spaced relationship on an axially-movable turret. The yarn is traversed relatively of the rotating core or yarn-carrier by means of a reciprocating thread-guide which is advanced progressively along a threaded traverse-rod during the winding to lay the yarn in overlapping conical layers to produce a filling wound bobbin or shuttle cop. The rotation of the spindle and reciprocation of the thread-guide are controlled by clutches connecting the spindle and thread-guide to their respective drive-shafts and the clutches are operated simultaneously to start or stop the winding operation.

Upon completion of the winding of a bobbin on any particular winding unit the machine operates automatically to disengage the clutches to arrest the winding operation and to initiate the operation of doffing and donning mechanism. The doffing and donning mechanism operates to shift the turret axially to disengage the active winding spindle from its drive-shaft and to rotate the turret through a part of a revolution to move an empty yarn-carrier mounted on the next succeeding spindle into winding position. The turret is so constructed and operated that during its rotation through a part of a revolution the wound bobbin is doffed and another empty yarn-carrier is donned on the spindle adjacent the one mounting the carrier being moved to winding position. The empty yarn-carriers are supplied one at a time from a magazine in alternately reversed relationship into position to be donned on adjacent spindles on the turret and the alternate spindles are engaged with one or the other of a pair of driving heads at opposite ends of the turret by the axial movement of the latter. The driving heads are so driven as to rotate successive spindles in opposite directions.

After a wound bobbin has been doffed and an empty yarn-carrier moved into winding position, a yarn-hook at either end of the yarn-carrier engages the yarn strand between the wound bobbin and the thread-guide and carries it into position to be engaged by a notch or notches in the periphery of the spindle-cup which receives the head of the empty yarn-carrier. As the yarn strand trailing from the wound bobbin is adjacent its tip end the yarn-hook positions the yarn strand adjacent the spindle-cup or bobbin-driver at the end where the winding on the bobbin was completed. Upon rotation of the spindle mounting the empty yarn-carrier the yarn strand is caught and gripped in the notch in the spindle-cup, thereby acting to break the strand between the spindle and the previously wound bobbin. Thus, rotation of the spindle causes the yarn to be wound on the yarn-carrier and traversed by the thread-guide. At the beginning of the winding the yarn strand is engaged by one or the other of a pair of yarn-retaining members arranged adjacent the end of the yarn-carrier and adapted to restrain the traverse of the yarn strand by the thread-guide to wind a reserve length of yarn or bunch before starting the service winding. Former-bars at opposite ends of the yarn-carrier are alternately set to control the movement of the thread-guide at the beginning of the winding to form an initial conical chase.

As the winding on the yarn-carrier continues, the thread-guide is advanced along the threaded traverse-rod longitudinally of the yarn-carrier in the opposite direction from its direction of movement in winding the previously wound bobbin. As alternate yarn-carriers are arranged in opposite or reversed relationship and rotated in opposite directions the machine operates to wind successive bobbins in opposite directions. The stopping of the winding operation upon completion of each bobbin is controlled by the longitudinal growth of the bobbin by means of one or the other of a pair of feelers to effect release of the stopping means and initiate the operation of the doffing and donning means. A second control means is also provided which is operative upon breakage of the feeding yarn strand or exhaustion of its supply to release the stopping means to arrest the winding operation without initiating the operation of the doffing and donning means.

Frame and drive shafts

Figure 2:
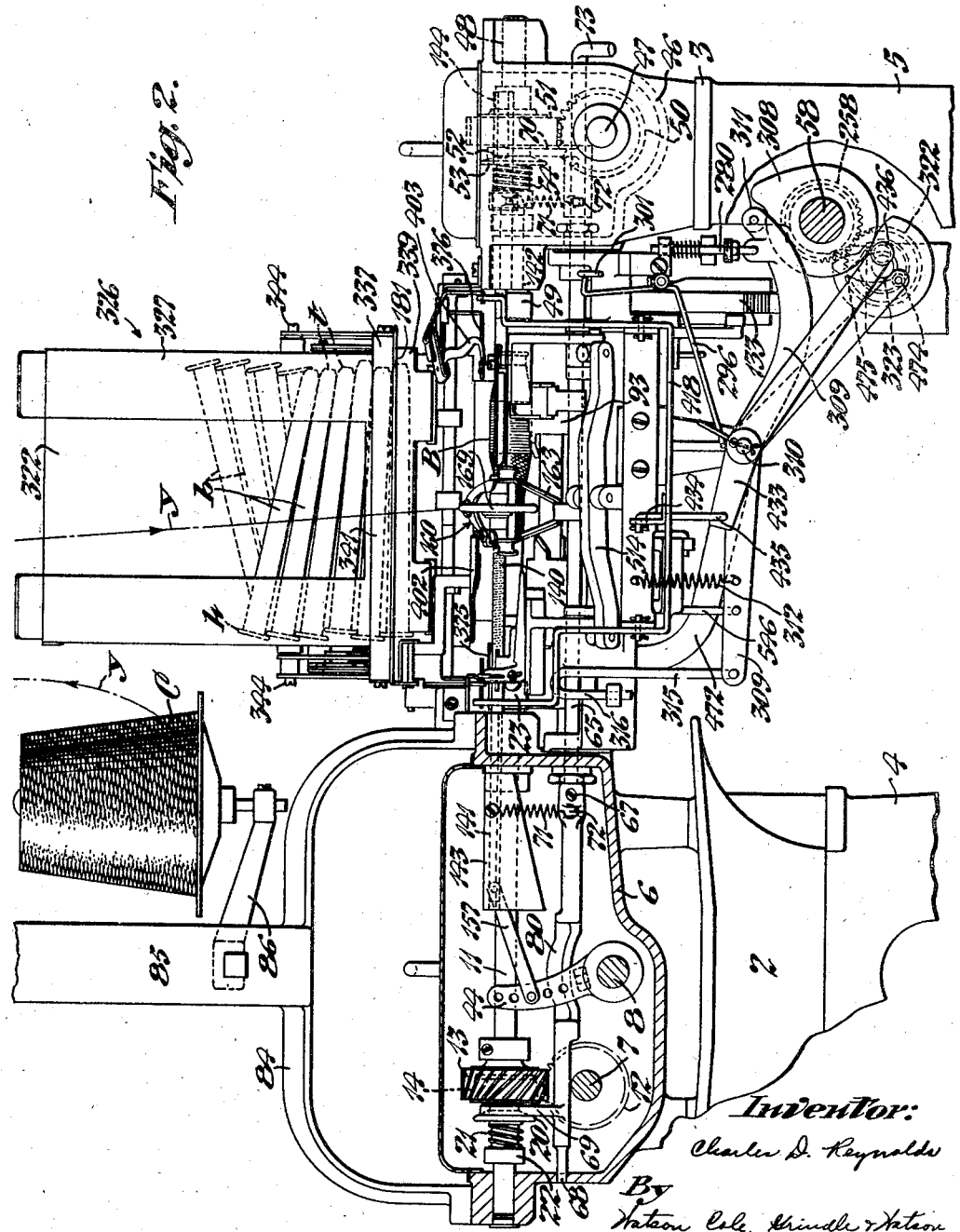
Fig. 2 is a side elevational view of the winding unit illustrated in Fig. 1, part-sectional through the main housing for the driving means.

Referring to Figs. 1 and 2 of the drawings, the several winding units of the machine are carried by a central horizontal bed 2 and outboard shelves 3 spaced laterally from the bed and extending longitudinally of the machine, only one of such shelves being shown herein. The bed 2 and shelves 3 are usually supported from the floor at spaced points longitudinally thereof by legs or standards 4 and 5. Although a single winding unit only is shown in the drawings it will be understood that a series of such units may be arranged along the machine with the alternate units extending outwardly from the bed in opposite directions. Mounted upon the bed 2 is a trough-like casing 6 in which various driving elements are enclosed. The construction and arrangement of the driving elements is generally similar to that illustrated and described in United States Letters Patent to S. W. Wardwell, No. 946,831, issued January 18, 1910, as comprising a spindle drive-shaft 7 and a traverse-reciprocating or rocker-shaft 8 journaled in bearings in the opposite end walls of the casing 6. It will be understood that the shafts 7 and 8 extend longitudinally throughout the length of the machine and are adapted for connection with each of the plurality of winding units.

The spindle drive-shaft 7 has a pulley 9 at its outer end adapted to be continuously driven from a suitable prime-mover, not herein shown, by means of a belt 10. A drive-shaft 11 for each winding unit is journaled in suitable bearings in the front and rear walls of the casing 6 and extends transversely above the drive-shaft 7. The shaft 11 is driven from the drive-shaft 7 by intermeshing helical gears 12 and 13, see Fig. 2, and a clutch 14 splined to the shaft 11 and engageable with the gear 13. The clutch 14 has a beveled flange 20 and is normally held in engagement with the gear 13 by means of a spring 21 acting between a collar 22 on the shaft and the rearward face of the beveled flange. The drive-shaft 11 extends through the front wall of the casing 6 and has a driving head 23 at its outer end, see Fig. 7, embodying an annular rim with radial serrations forming a series of clutch-teeth 24 shown in Fig. 23.

The traverse rocker-shaft 8 has a crank-arm 28 at its outer end with a follower 29 which projects into the groove 30 of a helical cam 31, see Fig. 1. The cam 31 is mounted on a vertical shaft 32 which is continuously driven from the prime-mover by suitable connections, not herein shown, the rotation of the cam 31 operating through the crank-arm 28 to continuously oscillate the shaft 8. The traverse drive-shaft 8 has an abutment 35 thereon with a notch or groove 36 in the end face thereof. Slidably mounted on the shaft 8 is a clutch-member or sleeve 37 having a detent-lug 38 for engagement with the notch 36, see Figs. 1 and 22. The lug 38 on the clutch-sleeve 37 is normally held in engagement with the notch 36 in the abutment 35 by means of a spring 40 acting between a collar 41 on the shaft and a flange 42 of the sleeve. The upper portion of the flange 42 of the sleeve 37 is inclined to provide a cam-face 43 and projecting radially from the sleeve 37 in spaced relation to the flange is an oscillating crank-arm 44 for reciprocating the traverse-rod of the machine.

A casing 46 similar to the casing 6 is mounted on the shelf 3 and journaled therein is a spindle drive-shaft 47 similar to the spindle drive-shaft 7 and a drive-shaft 48 similar to the drive-shaft 11. The drive-shaft 48 has a driving head 49 at its inner end, see Fig. 7, identical with the driving head 23 but of opposite hand and provided with radial serrations or clutch-teeth 24. The drive-shafts 11 and 48 are arranged in axial alinement with the driving heads 23 and 49 and in longitudinally-spaced relationship. The shaft 48 is driven from the drive-shaft 47 by intermeshing spiral gears 50 and 51 similar to the gears 12 and 13 and the gear 51 is connected to the shaft 48 by means of a clutch 52 having a beveled flange 53. A spring 54 acting between an abutment on the shaft 48 and the clutch 52 normally holds the latter in driving engagement with the gear 51. The shaft 47 has a pulley 55 at its outer end which is continuously driven from a pulley 56 on the spindle drive-shaft 7 by means of a connecting belt 57, see Fig. 1. The spiral gears 12 and 13 are of opposite hand from the gears 50 and 51 so that the driving heads 23 and 49 are rotated in opposite directions.

Also journaled in the machine frame below the casing 46 and extending longitudinally of the machine is a drive-shaft 58 for the doffing and donning mechanism which is continuously rotated at relatively slow speed. The shaft 58 has a bevel-gear 59 mounted at its outer end which meshes with a similar gear 60 on a shaft 61 connected to the prime-mover by suitable gearing, not herein shown. With the driving means as thus far described the driving heads 23 and 49 are continuously rotated in opposite directions, the traverse drive-shaft 8 is continuously oscillated and the doffing and donning mechanism drive-shaft 58 is continuously rotated at slow speed.

The clutches 14 and 52 are adapted to be simultaneously operated to arrest rotation of the driving heads 23 and 49 by a rock-shaft or rod 65 mounted in bearings in the spaced casings 6 and 46 and extending parallel to the shafts 11 and 48, see Figs. 1 and 2. A yoke-shaped member 66 is fastened at one end to the end of the rock-shaft 65 by means of a set-screw 67 and has its opposite end journaled on a pin 68 projecting inwardly from the rearward wall of the casing 6. Extending radially from the yoke-shaped member 66 and rock-shaft 65 are vertical arms 69 and 70 having inclined faces adjacent their outer ends, see Figs. 1 and 21, adapted for engagement with the inclined faces of the beveled flanges 20 and 53 of the clutches 14 and 52.

Figure 21:
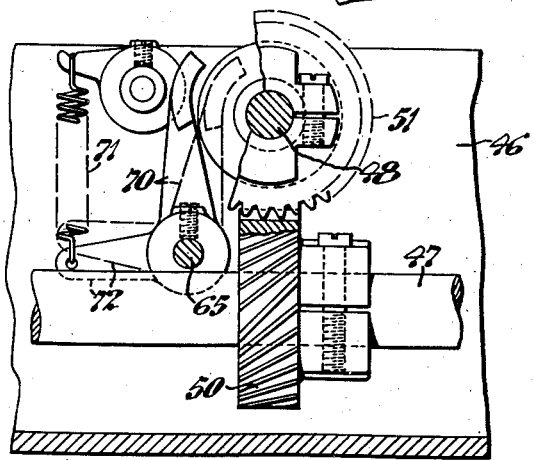
Fig. 21 is a sectional view taken on line 21—21 of Fig. 20 showing the clutch-operating means.

The rock-shaft 65 is normally rocked to engage the arms 69 and 70 of the yoke-member 66 and rock-shaft with the clutch flanges 20 and 53 by means of springs 71 anchored at one end to some fixed part of the casings 6 and 46, see Figs. 2 and 21, and connected at their opposite ends to horizontal arms 72 projecting radially from the yoke-member and rock-shaft. The inclined faces at the ends of the arms 69 and 70 when engaged with the flanges 20 and 53 of the clutches 14 and 52 under the action of the springs 71 act to disengage the clutches 14 and 52 from the gears 13 and 51 against the action of the springs 21 and 54 to disconnect the gears from the shafts 11 and 48. The outer end of the rock-shaft or rod 65 has a handle 73 for rocking it against the action of the springs 71 to disengage the arms 69 and 70 from the clutch-flanges 20 and 53.

Figure 23:
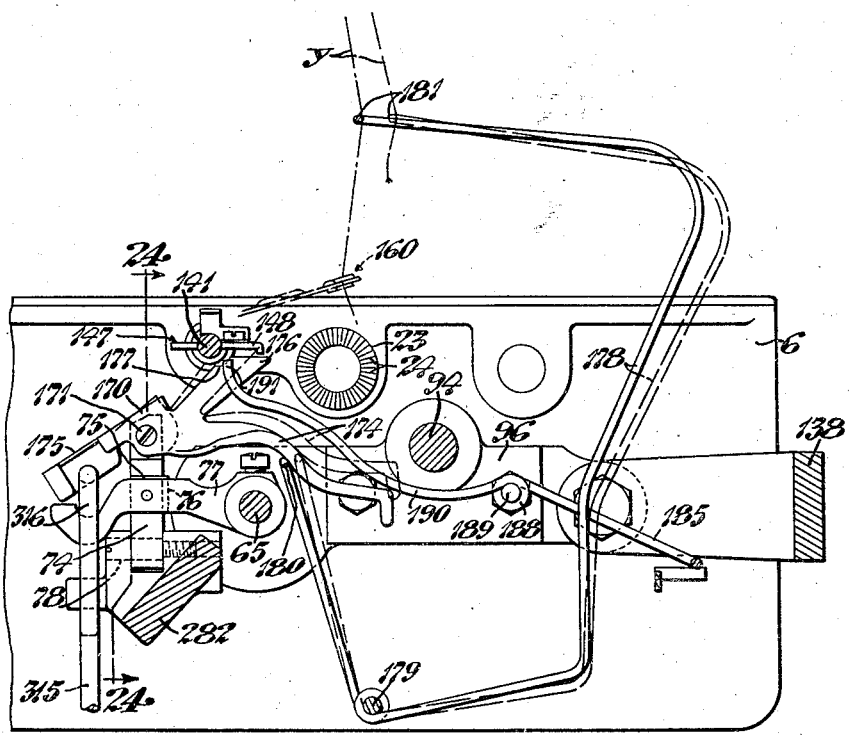
Fig. 23 is a detailed view showing the yarn-controlled drop-wire and detent-means for releasing the clutch-operating rock-shaft to arrest the winding operation when the feeding yarn strand breaks or its supply is exhausted.
Figure 24:
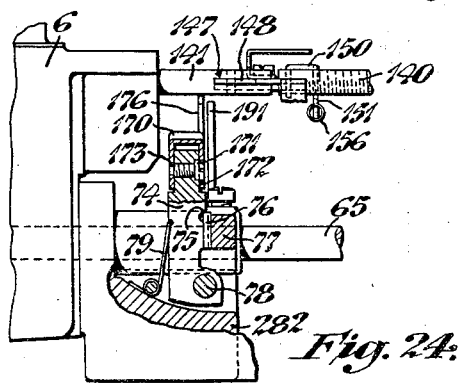
Fig. 24 is a transverse sectional view taken on line 24—24 of Fig. 23 showing the detent-means controlled by the drop-wire in locking engagement with an arm on the rock-shaft to retain the latter inoperative during a winding operation.
Figure 25:
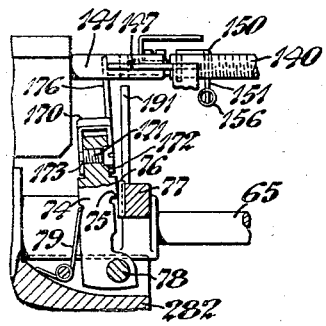
Fig. 25 is a view similar to Fig. 24 showing the detent-means rocked by the traverse means to release the rock-shaft and arrest the winding operation.

The rock-shaft 65 is latched in inoperative position by means of a detent-member 74 formed with a shoulder 75, see Figs. 23 to 25, adapted to overlie and engage the upper edge of a latch-plate 76 attached to the side of an arm 77 projecting horizontally from the rock-shaft. The detent-member 74 is pivotally mounted on a stud 78 and arranged to be rocked in clockwise direction, as viewed in Fig. 24, by means of a spring 79 to engage its shoulder 75 with the edge of the latch-plate 76 when the rock-shaft 65 is operated to start a winding operation. The detent locking-means 75 and 76 thus acts to maintain the rock-shaft 65 in inoperative position during the winding operation.

Simultaneously with the disengagement of the clutches 14 and 52 to arrest rotation of the driving heads 23 and 49, the intermediate portion 80 of the yoke-member 66 will engage the inclined face 43 of the clutch-sleeve 37 to slide it axially on the traverse rocker-shaft 8 to disengage its detent 38 from the notch 36 in the abutment 35. The clutch-sleeve 37 thus will be disconnected from the shaft 8 to arrest the motion of the traverse rocker-arm 44, see Figs. 1 and 22. When the rock-shaft 65 is latched in its inoperative position the intermediate portion 80 of the yoke 66 is moved to the position indicated in Fig. 22 whereby the spring 40 will hold the lug 38 on the clutch-sleeve 37 in driving engagement with the notch 36 in the abutment 35 on the shaft 8.

Extending upwardly from the casing 6 is a bracket 84 of inverted U-shape, see Fig. 2, having an upright stanchion 85 which supports a lateral bracket 86 for mounting a yarn supply package or cone C. The upright stanchion 85 is also adapted to mount a yieldable yarn-guide and tension-device, not herein shown, for maintaining the feeding yarn strand y taut during the winding of a bobbin B.

*Turret*

The bobbins of yarn, indicated by the reference character B, are wound on yarn-carriers or empty bobbins indicated by the reference character b, mounted on one or another of a plurality of spindles 89 to 92 arranged in angular spaced relationship on a rotatable and axially-movable horizontal turret 93 shown in Figs. 7 to 13, inclusive. The turret 93 is positioned between the spaced driving heads 23 and 49 and is movable axially to engage and disengage alternate winding spindles 89 to 92 with the opposite driving heads. The turret 93 also is rotatable through a quarter-revolution between the winding of successive bobbins B to doff a wound bobbin from winding position, move an empty bobbin b on the next successive spindle into winding position and don an empty bobbin on the second following spindle. Although the yarn-carrier may be of any suitable form to adapt it to serve as a core for packages of any kind of strand material, as herein illustrated the carrier or bobbin b is in the form of a hollow paper or fiber tube which is gradually tapered throughout its length to form a tip t at its smaller end. The bobbin b may have a metal ferrule or sleeve at its larger end with a flange forming a head h.

The turret 93, see Figs. 7 to 13, comprises a horizontal shaft 94 arranged in parallel relation to the alined drive-shafts 11 and 48 with its ends journaled in bearing plates 95 and 96 mounted on the rear wall of the casing 46 and the front wall of the casing 6, respectively. The arrangement of the shaft 94 and bearing plates 95 and 96 is such that the shaft may be rotated and moved axially.

Figure 7:
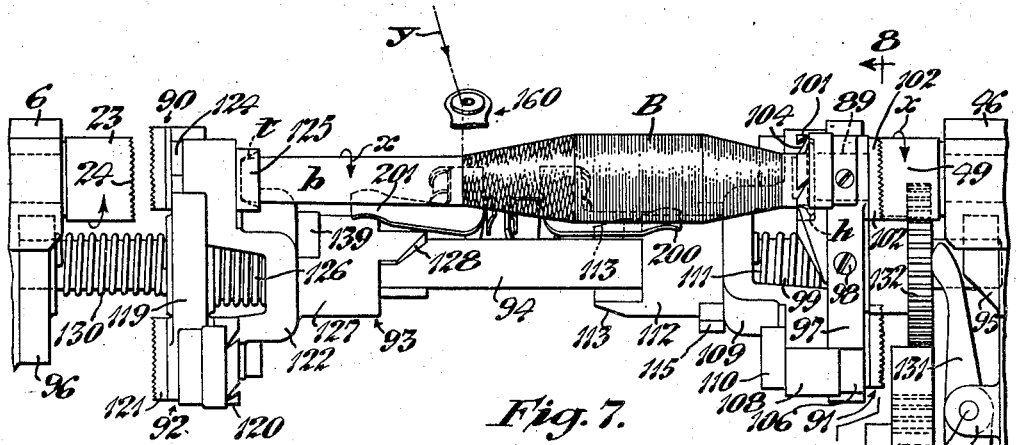
Fig. 7 is a detailed side view of the turret showing a yarn-carrier in winding position and a bobbin being wound toward the left.
Figure 8:
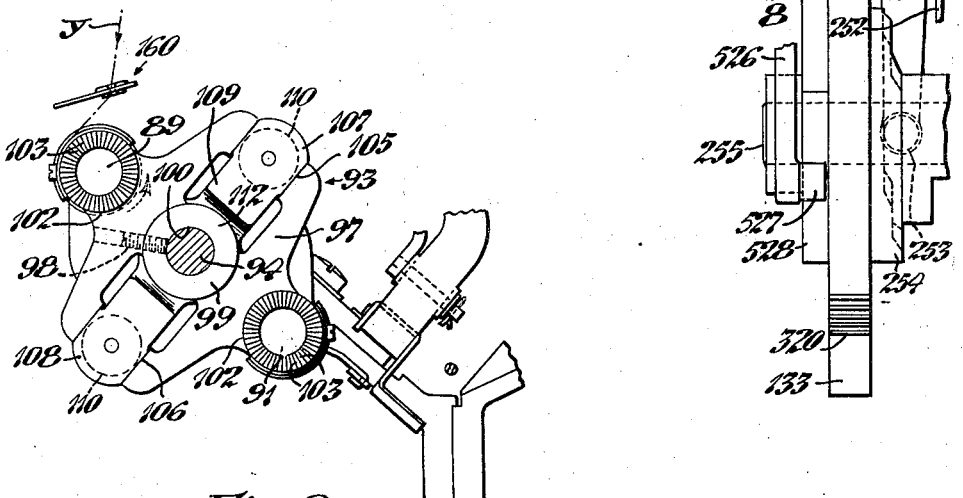
Fig. 8 is a sectional view taken on line 8—8 of Fig. 7 showing the forward end of the turret and the driving heads at the ends of one pair of winding spindles.

A plate 97, see Figs. 7 and 8, is mounted fast on the shaft 94 adjacent its outer or right-hand end, as viewed in Fig. 7, by any suitable means such as the set-screw 98. The plate 97 has a hub 99 with an axial bore 100 for mounting it on the shaft 94 with the plate extending radially from the shaft. Spindles 89 and 91 are journaled in suitable bearings on the plate 97 disposed in diametrically opposed relationship and arranged at equal distances from and in parallel relation to the axis of the shaft 94. Each of the spindles 89 and 91 carries a spindle-cup 101 at one side of the plate 97 and a driving head 102 at the opposite side thereof. The driving heads 102 are provided with teeth 103 of the same form and shape as the teeth of the driving head 49 for cooperation therewith, see Figs. 7 and 8. The spindle-cups 101 are adapted to receive the head ends h of the bobbins or yarn-carriers b and have angular notches 104 formed therein for catching the yarn strand y to attach it thereto to start the winding operation.

The plate 97 has radial slots 105 and 106 arranged at right-angles to a plane common to the axes of the spindles 89 and 91 for receiving the ends 107 and 108 of a slidable yoke-shaped member 109. The yoke-shaped member 109 has an axial bore through which the shaft 94 and hub 99 extend and the terminal portions 107 and 108 are of rectangular form and of such dimension as to closely fit between the sides of the radial slots 105 and 106 in the plate 97. Rotatably mounted at the ends 107 and 108 of the yoke-shaped member 109 are spindle-cups 110 of a shape and contour to adapt them to receive the tips t of yarn-carriers or empty bobbins b on the spindles 90 and 92, later to be described. A spring 111 coiled around the shaft 94 and acting between the plate 97 and the yoke-shaped member 109 normally tends to force the latter axially of the shaft toward the left as viewed in Fig. 7. The yoke-shaped member 109 has a hub 112 extending therefrom along the shaft 94 with inclined cam-faces 113 at its ends for cooperation with a similarly shaped fixed cam 114, see Figs. 11 to 13, for moving the yoke-shaped member against the action of the spring 111. The cam-faces 113 are arranged at opposite sides of the hub 112 and each extends through substantially 90° so that they cooperate with the fixed cam 114 to move the yoke-shaped member 109 axially during every other or alternate quarter-revolution of the turret 93 when the spindles 90 and 92 are displaced from winding position. A pair of radially-projecting cam-lugs 115 are also provided on the hub 112 of the yoke-shaped member 109 arranged 180° apart for a purpose as will appear later.

Figure 9:
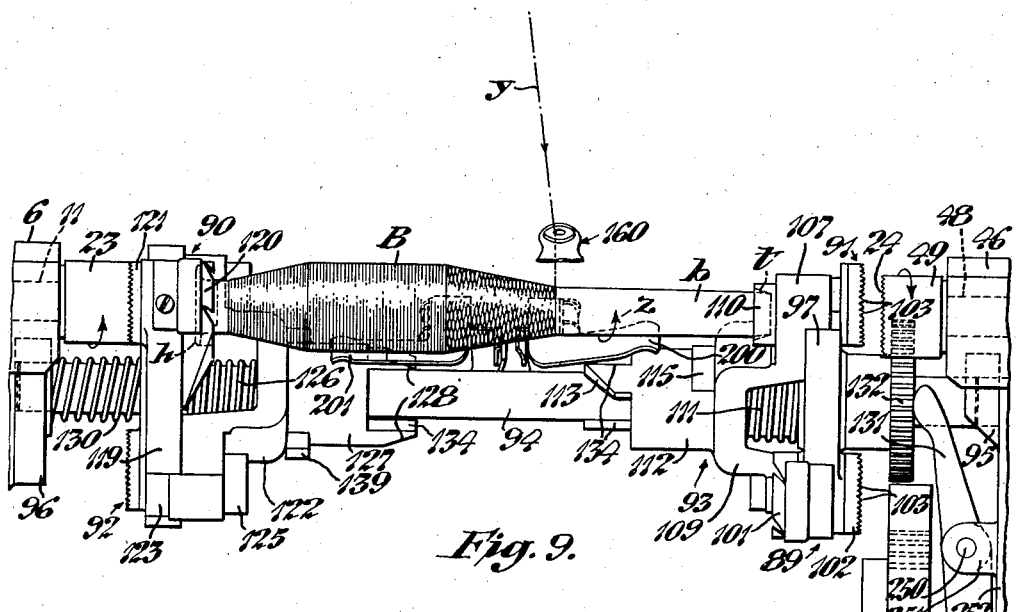
Fig. 9 is a view similar to Fig. 7 showing the turret rotated through 90° and moved axially to position a spindle in winding position and illustrating a bobbin being wound toward the right.
Figure 10:
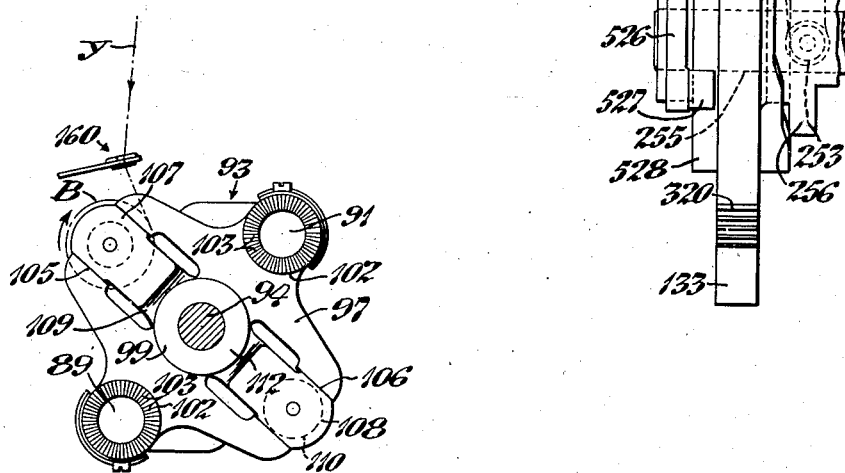
Fig. 10 is a sectional view similar to Fig. 8 showing the turret turned through 90°.
Figure 11:
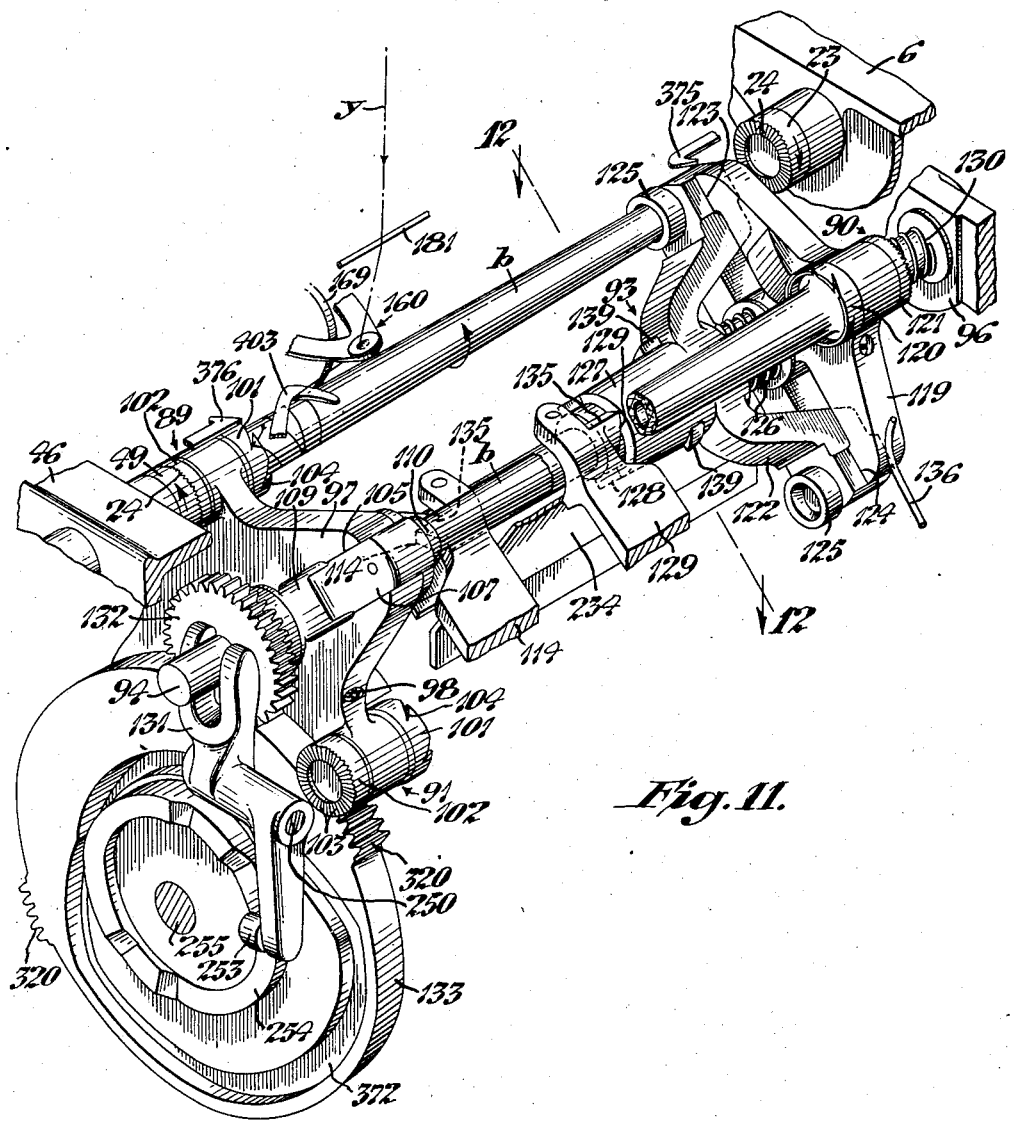
Fig. 11 is a perspective view of the turret showing rotating means therefor and the mechanism for moving it axially to disconnect one winding spindle from one driving head and connect the next following winding spindle to the other driving head.
Figure 12:
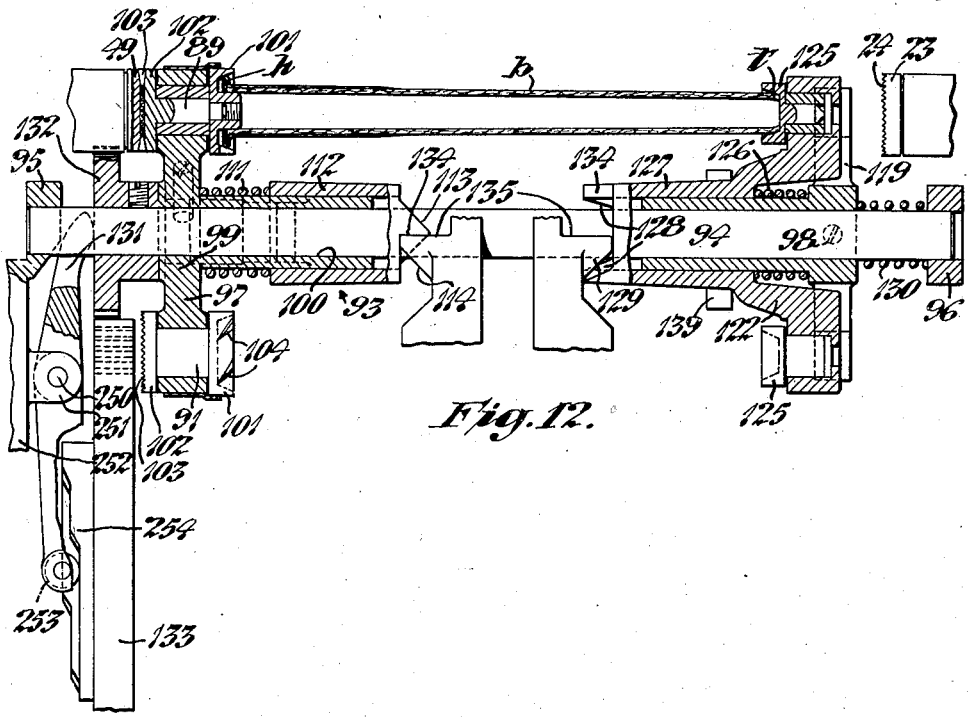
Fig. 12 is a sectional view taken on line 12—12 of Fig. 11 showing the relatively movable end-members of the turret in which the spindles and opposed spindle-cups are journaled.
Figure 13:
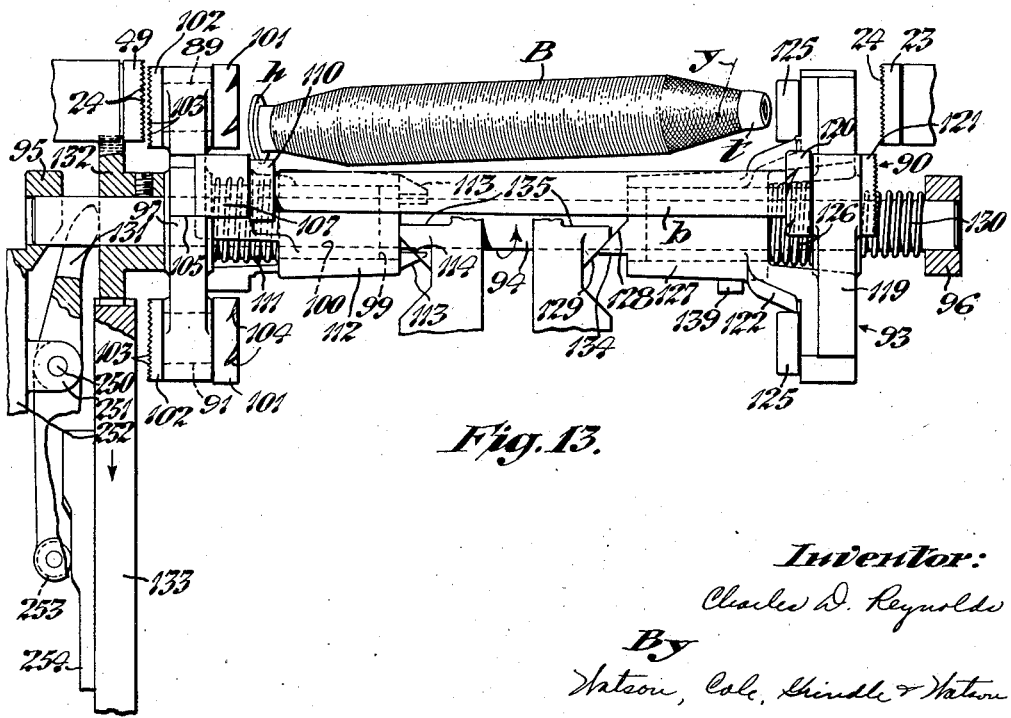
Fig. 13 is a view similar to Fig. 12 showing the turret and the cam for moving the bobbin-supporting members at one end of the turret to release a wound bobbin and grip an empty yarn-carrier.
Figure 27:
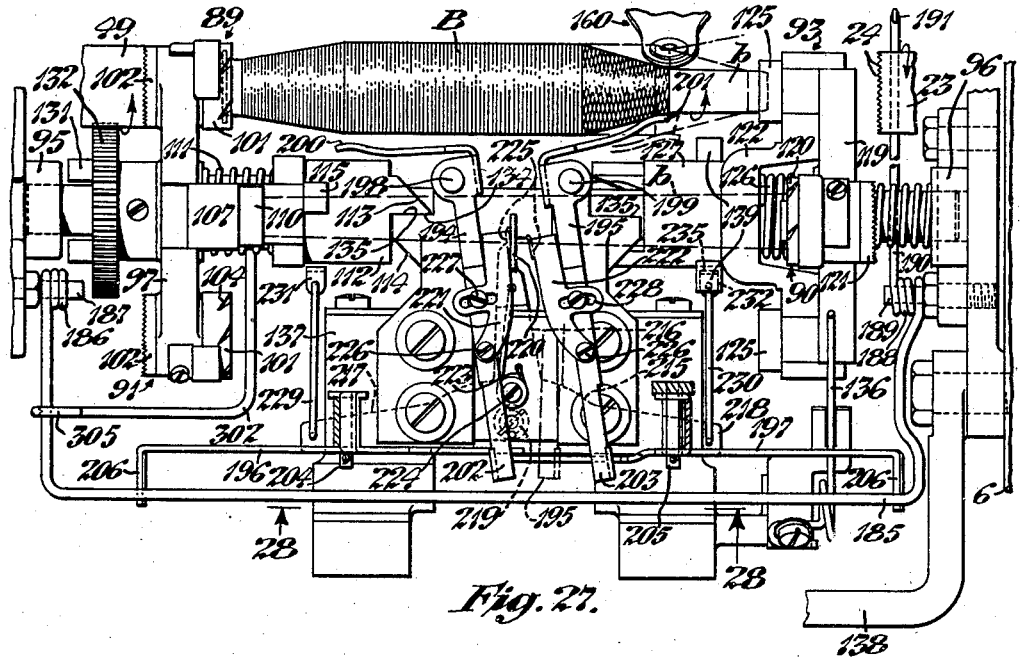
Fig. 27 is a view looking in the direction indicated by the arrow 27 in Fig. 5 showing the feelers controlled by the growth of the bobbin and illustrating their relationship when a bobbin is being wound toward the right.

A plate 119 similar to the plate 97 is fixedly mounted on the shaft 94 adjacent the end opposite from that on which the plate 97 is mounted, see Figs. 9, 10 and 11. The spindles 90 and 92, of a construction similar to the spindles 89 and 91, are journaled in diametrically opposed relationship on the plate 119 and have spindle-cups 120 at one side of the plate and driving heads 121 at the other side thereof. A yoke-shaped member 122 similar to the yoke-shaped member 109 is mounted on the shaft 94 to slide in radial slots 123 and 124 in the plate 119 and at each end of the member is mounted a spindle-cup 125 for receiving the tips t of empty yarn-carriers or bobbins *b* on the spindles 89 and 91. A spring 126 coiled around the shaft 91 acts between the plate 119 and yoke-shaped member 122 to normally force the latter axially of the shaft. The yoke-shaped member 122 is provided with a hub 127 having diametrically opposed cam-faces 128 at its end which extend through an arc substantially 90° and are adapted for cooperation with a fixed cam 129, see Fig. 11, to move the member axially during alternate quarter-revolutions of the turret 93. As shown in Figs. 5 and 27, the fixed cams 114 and 129 are mounted in side by side relationship on a bracket 137 supported from a cross-strut 138 extending between the casings 6 and 46. A pair of radially-projecting lugs 139 similar to the cam-lugs 115, before mentioned, are provided on the hub 127 of the yoke-shaped member 122, being arranged 180° apart. The plate 119 and yoke-shaped member 122 are displaced 90° with respect to the plate 97 and yoke-shaped member 109 so that the spindles 89 and 91 on the plate 97 aline respectively with the spindle-cups 125 on the opposite yoke-shaped member 122 while the spindles 90 and 92 on the plate 119 aline with the spindle-cups 110 on the opposite yoke-shaped member 109. Thus, the turret 93 has four spindles 89, 91 and 90, 92 with alined spindle-cups 110 and 125 angularly displaced 90° from each other and adapted to mount empty yarn-carriers or bobbins *b* in alternate reversed relationship.

The turret 93 is adapted to be moved as a unit outwardly from the casing 6 or to the right as viewed in Figs. 7 and 9 by means of a spring 130 acting between the bearing plate 96 and plate 119 of the turret. The turret 93 is moved inwardly or to the left against the action of the spring 130 by means of a shifting fork 131, see Fig. 11. The turret 93 is adapted to be rotated through a quarter-revolution by means of a gear 132 fixed to the shaft 94 between the plate 97 and bearing plate 95 which is adapted to mesh with a segment-gear 133. The segment-gear 133 has diametrically opposed toothed sections 320 which cooperate with the teeth of the gear 132 to rotate the turret through a quarter-revolution for each one-half revolution of the gear 133. The alinement of the spindles 89, 90, 91 and 92 with the driving heads 23 or 49 after a quarter-revolution of the turret 93 is controlled by the engagement of the longitudinally-extending flat faces 134 on the hubs 112 and 127 of the yoke-shaped members 109 and 122 adjacent the cam-faces 113 and 128 with the parallel flat faces 135 adjacent the inclined cam-faces on the cams 114 and 129, see Fig. 12. A wire spring 136, see Fig. 27, has its free end bearing against the side of the plate 119 to yieldingly hold the flat faces 134 and 135 in contacting engagement.

When the turret 93 is moved to the right, as viewed in Fig. 7, the head 102 of one of the spindles 89 or 91 will be carried into driving engagement with the driving head 49 and the bobbin *b* will be rotated in the direction indicated by the arrow *x* to wind a bobbin B toward the left. When the turret 93 is rotated through a quarter-revolution and moved axially to the left the driving head 121 of the adjacent spindle 90 or 92 at the opposite side of the turret will be engaged with the driving head 23 as shown in Fig. 9 to rotate the bobbin *b* in the opposite direction as indicated by the arrow *z* to wind a bobbin B toward the right.

During each quarter-revolution of the turret 93 one or the other of the yoke-shaped members 109 or 122 is moved axially by the fixed cam 114 or 129 away from the opposite plate 119 or 97. For instance, during the rotation of the turret 93 from the position shown in Fig. 7 to the position illustrated in Fig. 9 the cam 129 will move the yoke-shaped member 122 and spindle-cups 125 thereon axially toward the right, as viewed in Fig. 12, or away from the opposite plate 97 to release the wound bobbin B from the cup 101 on the spindle 89, see Fig. 13. The cam 129 continues to retain the yoke-shaped member 122 axially displaced from the plate 97 until the second successive spindle 91 is alined with an empty bobbin *b* to be donned, at which time the cam-face 128 will slide off from the fixed cam 129 and the spring 126 will move the yoke-shaped member 122 toward the left as viewed in Figs. 11 and 12 to grip the bobbin *b* in the spindle-cups 101 and 125. During the next quarter-revolution of the turret 93 the fixed cam 114 will act to move the yoke-shaped member 109 axially to doff a wound bobbin B from the spindle 90 and don an empty bobbin *b* on the spindle 92. The cams 114 and 129 operate alternately on the opposite yoke-shaped members 109 and 122 during successive quarter-revolutions of the turret.

*Traversing means*

The yarn strand *y* to be wound is drawn off from the supply cone C, see Fig. 2, to lead upwardly through a tension-device, not herein shown, and then downwardly to the bobbin *b*. During the winding the yarn strand *y* is traversed back and forth to wind the yarn in conical layers and the zone of traverse is advanced progressively first in one direction and then in the other direction depending upon the disposition of the bobbin *b* and its direction of rotation.

The traversing mechanism is best illustrated in Figs. 1 to 5 and 35 as comprising a threaded traverse-rod 140 arranged in parallel relation to the bobbin *b* at one side thereof. The traverse-rod 140 is connected at its opposite ends to rods 141 and 142, see Fig. 1, slidably mounted in bearings 143 and 144 attached to the front wall of the casing 6 and rear wall of the casing 46, respectively. The ends of the rods 140 and 141 have alined axial slots 145 and 146 therein, see Fig. 4, in which the flat plate-portion 148 of a connecting-member 147 is received, see Fig. 3. The plate 148 of the connecting-member 147 is fixedly attached to the rod 141, as by brazing or welding, but is free to slide in the slot 145 of the traverse-rod 140. The portion of the plate 148 extending into the slot 145 in the threaded traverse-rod 140 has a slot 149 therein extending transversely of the axis of the traverse-rod, see Fig. 3. A wire 150 extending through a hole in the end of the traverse-rod 140 projects downwardly through the slot 149 in the plate-portion 148 of the connecting-member 147, the upper end of the wire being bent laterally and then around the traverse-rod 140 with its terminal portion formed into a hook 151, see Figs. 3 and 35. As shown in Fig. 35, the connecting-member 147 has an arm 153 depending therefrom at one side of the traverse-rod 140 which is bent angularly with its end 154 looped around the starting rod or rock-shaft 65. The looped end 154 of the depending arm 153 constitutes a bearing sleeve adapted to slide on the rod 65 to afford additional support for the end of the threaded traverse-rod 140. A spring 156 connected between the hook 151 at the end of the wire 150 and a lug 157 on the depending arm 153 tends to hold the inner end of the traverse-rod 140 in alinement with its associated rod 141 with the wire pin 150 in engagement with the forward end of the slot 149, see Fig. 3.

The traverse-rod 140 is connected to the rod 142 by a connecting-member 155 identical in construction and arrangement with that of the connecting-member 147 and having a slot 149 and a wire pin 150 extending through the traverse-rod and slot. The connecting-member 155 also has a depending arm 153 with an end-portion 154 looped around the starting rod 65. A spring 156 is also provided between the wire pin 150 and depending arm 153 for normally holding the outer end of the traverse-rod 140 in alinement with its associated rod 142. Thus, the rods 140, 141 and 142 are connected to each other for reciprocation as a unit and the rod 140 is normally held in alinement with the rods 141 and 142. On the other hand, either end of the threaded traverse-rod 140 may be moved rearwardly toward the bobbin b against the action of one or the other of the springs 156 for a purpose explained hereinafter.

The inner end of the rod 141 is connected to the crank-arm 44 on the clutch-sleeve 37, see Figs. 1 and 2, by means of a link 157 whereby oscillation of the traverse rock-shaft 8 will be translated into reciprocatory motion of the threaded traverse-rod 140. As will be noted by reference to Fig. 2, the link 157 may be connected to one of a series of holes in the crank-arm 44 to adjust the length of stroke of the traverse-rod 140 as imparted to it by the crank-arm 44.

Figure 3:
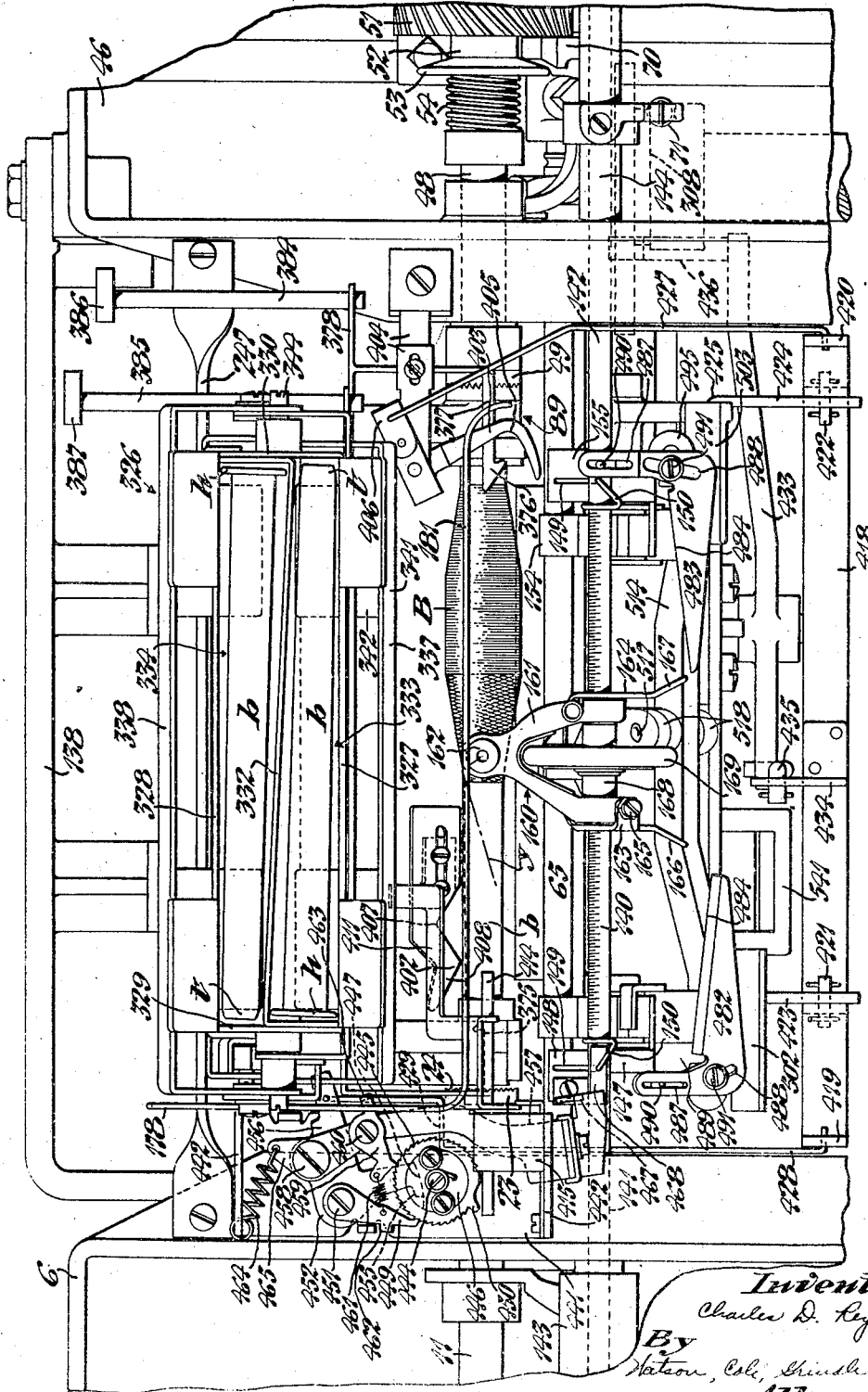
Fig. 3 is an enlarged plan view similar to Fig. 1 showing the relationship of the parts during the winding of a bobbin in a direction toward the housing or to the left.
Figure 4:
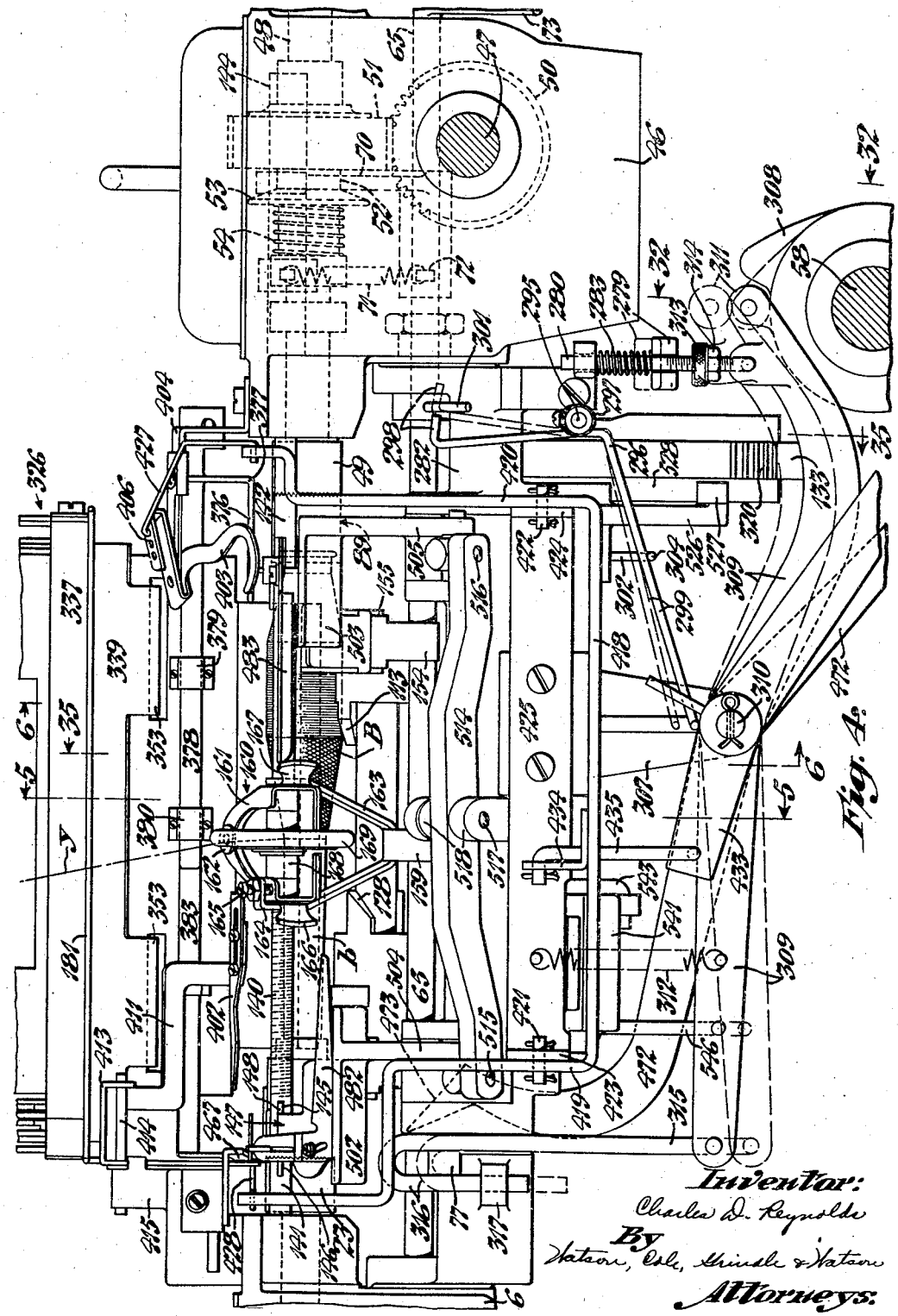
Fig. 4 is an enlarged side elevational view similar to Fig. 2 showing the mechanism for the various operations more in detail.

Mounted on the threaded traverse-rod 140 is a thread-guide 160 of well-known construction, see Fig. 3, comprising a bifurcated arm 161 having depending ears apertured to embrace the traverse-rod and an eyelet 162 at its outer end through which the yarn strand y feeds as it is wound on the bobbin b, see Figs. 3 and 4. A U-shaped member or yoke 163, see Figs. 4 and 35, has right-angular side arms which straddle the sides of the bifurcated arm 161 and are apertured to embrace the threaded traverse-rod 140. As shown in Fig. 5, a tail-portion 159 depending from the member 163 embraces the starting rod or rock-shaft 65 to hold said member against rocking movement on the traverse-rod 140. An angular ear 164 on one of the arms of the yoke 163 overlies the bifurcated arm 161 and has a set-screw 165 adapted for adjustment to limit the rocking movement of the thread-guide toward the bobbin b while permitting its free rocking movement away from the bobbin. The rearward ends 166 and 167 of the side arms of the yoke 163 are adapted to engage former-bars 482 and 483, to be described later, for forming a conical base of yarn or chase at the beginning of the winding in either direction. Between the bifurcations of the arm 161 of the thread-guide 160 is a nut 168 having internal threads in engagement with the screw-threads formed on the periphery of the traverse-rod 140 and carrying a contact-wheel or feeler-disk 169 fast thereon.

As the thread-guide 160 is reciprocated with the traverse-rod 140 it will deposit the yarn in conical layers on the chase of the bobbin B being wound and the contact-wheel 169 will engage the periphery of the winding at each rearward stroke of the guide and be turned to a slight extent by the rotation of the bobbin. This intermittent rotation of the contact-wheel 169 acts to rotate the nut 168 and feed the thread-guide 160 progressively along the traverse-rod 140 so that the bobbin grows in size by longitudinal extension. Due to the fact that in the present machine the bobbins are wound continuously without returning the thread-guide from the finishing end of one bobbin to the beginning end of the next bobbin successive yarn-carriers or bobbins b are arranged in reversed relationship, that is with the head end of one opposite the tip end of another. The bobbins b are rotated in opposite directions so that the engagement of the contact-wheel 169 with the winding yarn on the bobbin B will cause the thread-guide 160 to feed along the traverse-rod 140 first in one direction in winding one bobbin and then in the opposite direction in winding the next bobbin.

*Stopping means*

As described above, the starting and stopping of the winding is controlled by the rock-shaft or rod 65 which is latched in inoperative position during the winding operation by means of the pivoted detent-member 74, see Fig. 24, and adapted to be rocked by the spring 71 to disengage the clutches 14, 37 and 52 simultaneously when released by the detent-member, see Figs. 1 and 21. The detent member 74 is actuated to release the rock-shaft 65 and arrest the winding operation by yarn-controlled means which are automatically operable when the feeding yarn strand y breaks or its supply is exhausted.

The yarn-controlled means is best illustrated in Figs. 23 to 26 as comprising a knock-off member 170 pivotally mounted intermediate its ends on the upper end of the pivoted detent-lever 74. As shown in Figs. 24 and 25, the intermediate portion of the knock-off member 170 is of inverted U-shape in cross-section to adapt it to embrace the upper end of the detent-lever 74, being pivoted on the opposite ends of a stud 171 which is screwed through the detent-lever with its head and tip end engaging alined holes 172 and 173 in the sides of the knock-off member. The member 170 has a depending reversely-curved arm 174 at one side of the pivot-stud 171 and a tail-portion 175 at the opposite side of the stud to balance its weight with a slight overbalance on the side of the arm 174 tending to normally rock the lever in clockwise direction as viewed in Fig. 23. The knock-off member 170 has an arm 176 extending upwardly with its upper edge positioned adjacent the reciprocable rod 141. A recess 177 is formed in the arm 176 of the member 170 to provide a clearance for the reciprocable rod 141 to permit the upper edge of the arm to be raised into the path of the flat plate-portion 148 of the connecting member 147, referred to previously as a part of the traverse-rod.

The member 170 is rockable in counterclockwise direction, as viewed in Fig. 23, to move its arm 176 into the path of the connecting-member 147 by a drop-wire 178. The drop-wire 178 is pivoted intermediate its ends on a stud 179 and has a right-angular end-portion 180 which underlies the depending curved arm 174 of the member 170. The opposite end of the drop-wire 178 has an arm 181 extending parallel to the axis of the bobbin b against which the yarn strand y bears as it feeds to the bobbin B being wound. The arrangement of the drop-wire 178 is such that it tends to rock by gravity in clockwise direction about the pivot-stud 179 but is held from such rocking movement during the winding of a bobbin B by the feeding yarn strand y as shown by full lines in Fig. 23. If, however, the yarn strand y breaks or its supply is exhausted the drop-wire 178 will fall to the position indicated by dash lines in Fig. 23. Rocking movement of the drop-wire 178 from the position shown by full lines to that indicated by dash lines in Fig. 23 will cause its right-angular end-portion 180 to rise and due to its contact with the arm 174 it will rock the knock-off member 170 and thereby raise the upper edge of the arm 176 into the path of movement of the connecting-member 147. During the next reciprocation of the traverse-rod 140 the flat plate-portion 148 of the connecting-member 147 will bunt against the upper end of the arm 176 of the knock-off member 170 to rock the detent-lever 74 on which it is mounted from the position shown in Fig. 24 to that illustrated in Fig. 25. The rock-shaft 65 thus will be released and operated by the springs 71 to arrest the winding operation.

Figure 26:
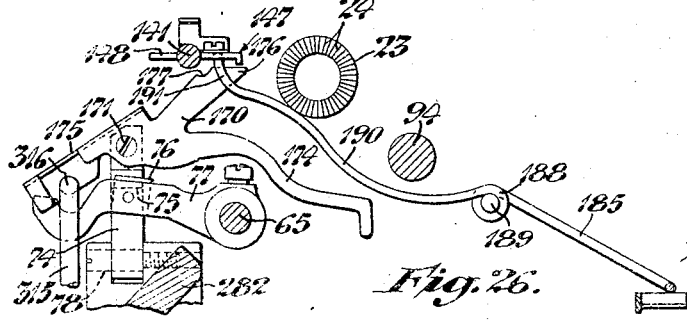
Fig. 26 is a detailed view similar to Fig. 23 showing a second drop-wire controlled by the size of the package and illustrated in position to be shifted by the traverse means to rock the detent-means when a bobbin is fully wound.

Sizing means are provided for actuating the detent-member 74 to arrest the winding operation when a bobbin B is completed. The sizing means comprises a drop-wire 185, see Figs. 26 and 27, in the form of a U-shaped bail. One arm of the drop-wire 185 is coiled at its end to provide a bearing 186 pivotally mounted on a pin 187 projecting from the casing 46 and the opposite arm of the wire has a similar bearing 188 intermediate its ends pivotally mounted on a pin 189 projecting from the casing 6. The extension 190 of this arm of the drop-wire 185 beyond the bearing 188 is positioned adjacent the side of the arm 176 of the knock-off member 170 and is adapted to be raised to position its end 191 in the path of movement of the connecting-member 147 on the traverse-rod 140 as shown in Fig. 26. Consequently, reciprocation of the traverse-rod 140 will cause its connecting-member 147 to engage the end 191 of the drop-wire 185 to move the knock-off member 170 and to rock the detent-lever 74 on which it is mounted from the position shown in Fig. 24 to that shown in Fig. 25 to release the rock-shaft 65 and arrest the winding operation.

The position of the drop-wire 185 is controlled by feelers 194 and 195 acting through control levers 196 and 197, see Figs. 27 to 31. The feelers 194 and 195 are in the form of bell-crank levers pivotally mounted on pins 198 and 199 on the cam-members 114 and 129, described previously. The ends 200 and 201 of the feelers 194 and 195, respectively, are arranged adjacent the yarn-carrier or bobbin b when the latter is in winding position and adapted to be contacted by the yarn mass at the end of the bobbin B as the latter reaches completion. The arms 202 and 203 of the feelers 194 and 195 at the opposite side of their pivot-pins 198 and 199 extend at substantially right-angles to the contact or feeler ends 200 and 201. The feelers 194 and 195 are rockable on the pivot-pins 198 and 199 and are adapted to be tilted so that one of the feelers is engaged by a bobbin B wound in one direction and the other feeler engaged by a bobbin wound in the opposite direction. The feeler 195 is set to be engaged by the bobbin being wound toward the right as viewed in Fig. 27, while the opposite feeler 194 is in inoperative position. Upon completion of a bobbin B the contact end 201 of the feeler 195 is engaged by the yarn at the tip of the bobbin and rocked from the position shown by full lines to that indicated by dash lines in Fig. 27.

Figure 28:
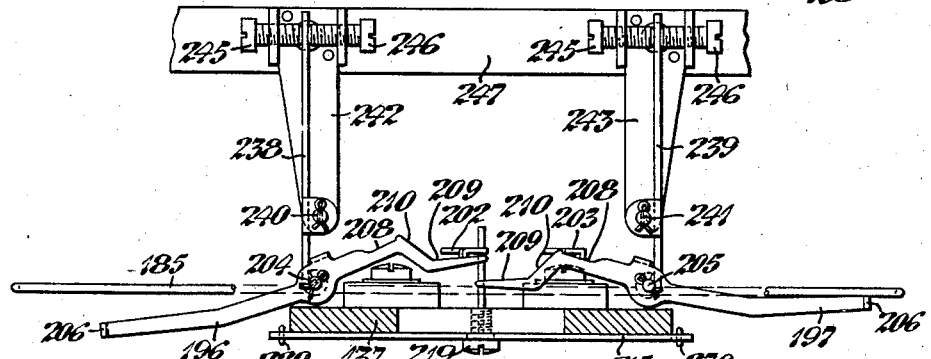
Fig. 28 is a sectional view taken on line 28—28 of Fig. 27 showing the position of the control levers as governed by the feelers to support the drop-wire while the bobbin is being wound toward the left.
Figure 29:
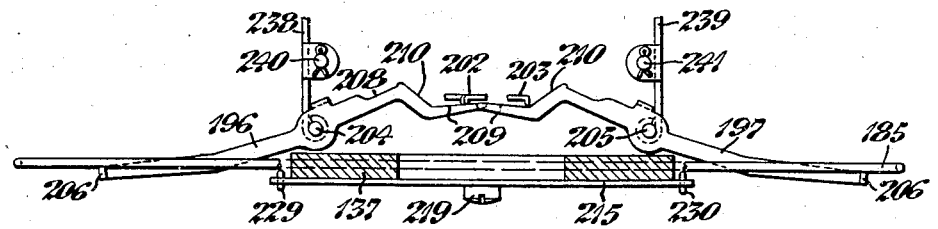
Fig. 29 is a view similar to Fig. 28 showing the position of the control levers when the bobbin has been fully wound to cause release of the drop-wire to initiate the operation of the stopping means.

The ends of the arms 202 and 203 of the feelers 194 and 195 each overlies one arm of one of the control levers 196 or 197 in the manner shown in Fig. 28. The control levers 196 and 197 are pivotally mounted intermediate their ends on pins 204 and 205 and each has a right-angular portion 206 at its outer end adapted to underlie the bail of the drop-wire 185. The opposite or inner end of each of the control levers 196 and 197 is offset to provide stepped shoulders 208 and 209 with an inclined cam-face 210 between the shoulders. With the parts in the position shown by full lines in Fig. 27 the end of the arm 203 of the feeler 195 overlies the shoulder 208 of the control lever 197 to hold the bail of the drop-wire 185 in raised position as shown in Fig. 28. At this juncture the end of the arm 202 of the feeler 194 is engaged against the shoulder 209 of the control lever 196 whereby the latter is held in the position shown in Fig. 28. Upon engagement of the contact end 201 of the feeler 195 by the yarn on the bobbin B the feeler will be rocked from the position illustrated in full lines in Fig. 27 to that indicated by dash lines to move the end of the arm 203 toward the left to the position shown in Fig. 29. This action causes the control lever 197 to be released and rocked by gravity in clockwise direction to thereby permit the drop-wire 185 to fall, see Fig. 29. The drop-wire 185 is thus caused to rock about the pivot-pins 187 and 189 to raise its end 191 into the path of movement of the connecting-member 147 on the traverse-rod 140.

When the opposite feeler 194 is in position to be engaged by the yarn on a bobbin B being wound in the opposite direction or toward the left as viewed in Fig. 30 the feeler 195 will remain inoperative, see Fig. 31. The end of the arm 202 of the feeler 194 will then rest against the upper stepped shoulder 208 of the control lever 196 with the latter held in the position shown in Fig. 31 to sustain the bail of the drop-wire 185 elevated. The end of the arm 203 of the feeler 195 then rests against the lower step-shoulder 209 of the control lever 197 after the latter has rocked into inoperative position as shown in Fig. 31. Thus the feelers 194 and 195 are alternately operative to sustain the bail of the drop-wire 185 in raised position during a winding operation and to release the drop-wire upon completion of a bobbin B being wound in either direction whereby to effect operation of the stopping means to arrest the winding operation.

The feelers 194 and 195 are automatically reset between the winding of successive bobbins by the operation of a T-shaped member 215, see Figs. 5, 27 and 30, having a central arm 216 positioned between the depending arms 202 and 203 of the feelers 194 and 195 and laterally-extending arms 217 and 218. As shown most clearly in Fig. 30, the T-shaped member 215 is pivoted at the junction of its three arms 216, 217 and 218 on a stud 219 projecting from the bracket 137, referred to previously. The upper end of the arm 216 has a right-angular flange or projection 220 adapted to engage one or the other of bunter-members 221 and 222 adjustably mounted on the feelers 194 and 195. The T-shaped member 215 is normally held in central or neutral position by means of a spring 223 coiled around a screw 224 fast in the bracket 137 with one end attached to the bracket and the opposite end attached to the member, see Figs. 5 and 27; it being noted that a portion of the T-shaped member 215 is offset to underlie the bracket 137.

Each of the bunters 221 and 222 is in the form of an offset arm having a depending flange 225 at its outer end for engagement by the flange 220 on the T-shaped member 215. Each bunter 221 or 222 is mounted on the arm 202 or 203 of the feeler 194 or 195 by means of a pivot-screw 226 with a screw 227 extending through a slot 228 in the bunter and screwed into the arm to permit initial adjustment of the flange 225 toward or away from the flange 220 on the T-shaped member 215.

Links 229 and 230 are connected at one end to the opposite ends of the arms 217 and 218 of the T-shaped member 215 and at their opposite ends to levers 231 and 232, see Figs. 5 and 27. As shown in Fig. 5, the levers 231 and 232 are mounted on pivots 233 held in ears on an inclined plate 234 supported from the bracket 137. The levers 231 and 232 are bent at an angle and formed at their free ends with shoulders 235 arranged in the path of movement of the cam-lugs 115 and 139 on the turret 93. Thus, during each quarter-revolution of the turret 93 one of the cam-lugs 115 or 139 will engage the shoulder 235 on one of the levers 231 or 232 to rock the lever on its pivot, which motion is transmitted through the link 229 or 230 to rock the T-shaped member 215 on its pivot 219. During the rocking movement of the T-shaped member 215 the flange 220 on its central arm 216 will engage one or the other of the bunters 221 or 222 and rock the feeler 194 or 195 to shift its contact end 200 or 201 into position to be engaged by the yarn on a bobbin B. The arrangement of the cam-lugs 115 and 139 is such that the opposite feeler 194 or 195 from the one that has been actuated at the completion of one bobbin B will be shifted into position to be actuated upon completion of the next succeeding bobbin wound in the opposite direction.

For initially adjusting the relative position of the control levers 196 and 197 and drop-wire 185 the pivot-pins 204 and 205 are carried at the ends of arms 238 and 239, see Fig. 28. The arms 238 and 239, in turn, are pivotally mounted intermediate their ends on pins 240 and 241 projecting from brackets 242 and 243 depending from a cross-strut 247, see Fig. 5. The upper end of each lever 238 or 239 is held in fixed position by adjusting screws 245 and 246 extending through ears at opposite sides of each bracket 242 or 243. By means of this construction the levers 238 and 239 may be adjusted by turning the screws 245 and 246 to shift the position of the pivot-pins 204 and 205.

*Doffing and donning mechanism*

After a bobbin B has been wound in either direction the actuation of the stopping means to arrest the winding operation initiates the operation of the doffing and donning means. The doffing and donning means operates to shift the turret 93 axially to disengage the operative spindle 89, 90, 91 or 92 from the driving head 23 or 49, next rotate the turret to doff the wound bobbin B from that spindle and move an empty bobbin on the first successive spindle into winding position, while at the same time donning an empty bobbin on the second successive spindle and finally to shift the turret axially to engage the first successive spindle with the appropriate driving head.

Figure 20:
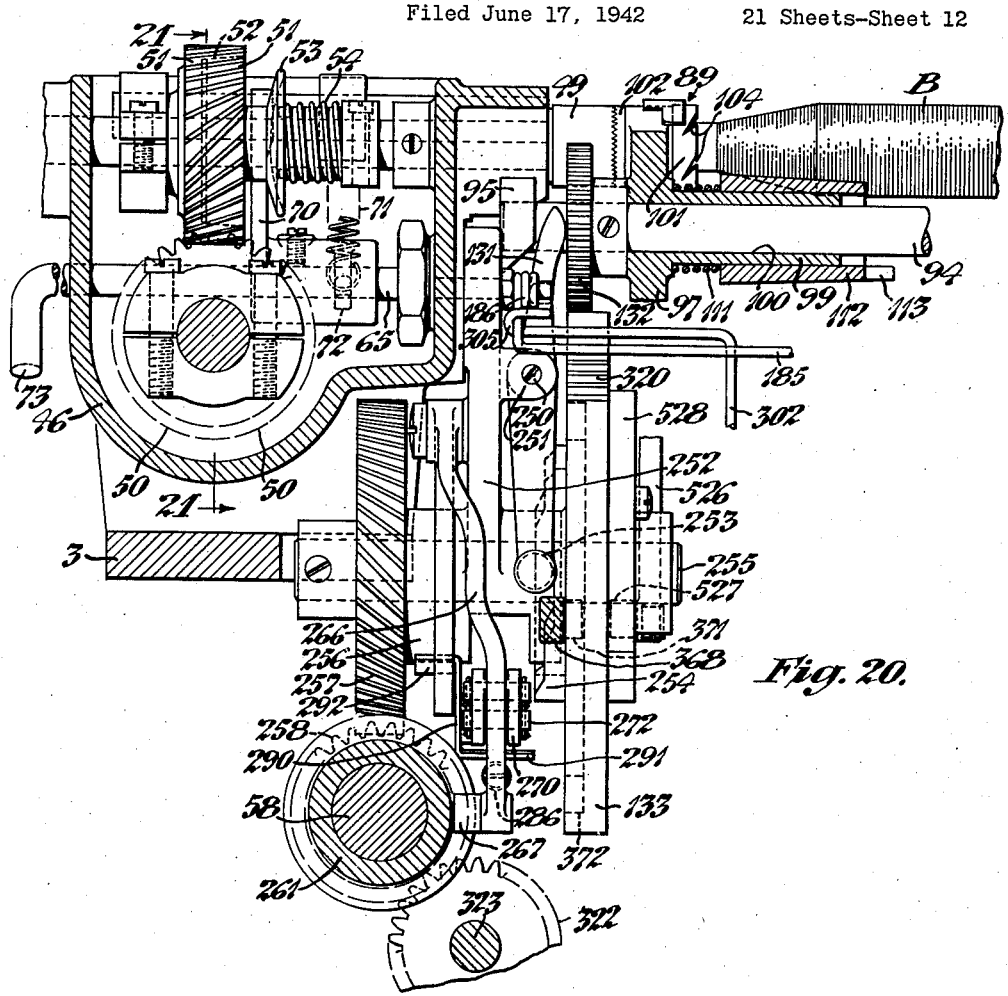
Fig. 20 is a sectional view taken generally on line 20—20 of Fig. 6 showing the clutch for connecting the right-hand driving head to its drive shaft and the drive for the doffing and donning means.

As shown in Figs. 11 and 20, the turret-shifting fork 131, previously referred to in the description of the turret, is rockably mounted intermediate its ends on a pivot-stud 250 extending between spaced ears 251 projecting laterally from a bracket 252 attached to and depending from the casing 46. The shifting fork 131 straddles the turret shaft 94 and bears against the side of the gear 132 while its end at the opposite side of the pivot-stud 250 has a cam-follower or roller 253 which is arranged to ride on a face-cam 254. The face-cam 254 is fixedly mounted on the side of the segment-gear 133 for rotation therewith and has a series of lobes and dwells operative during a half-revolution to shift the turret 93 axially in timed relation to its rotation whereby to disengage one of the winding spindles, such as 89 shown in Figs. 7 and 8, from the driving head 49 and concurrently engage the next successive spindle 90 with the opposite driving head 23, see Figs. 7 and 9. The face-cam 254 also has a series of similar lobes and dwells arranged in reverse order for controlling the shifting movement of the turret 93 axially in the opposite direction under the action of the spring 130 during the second half-revolution of the cam, whereby to engage the spindle 91 with the driving head 49.

Figure 34:
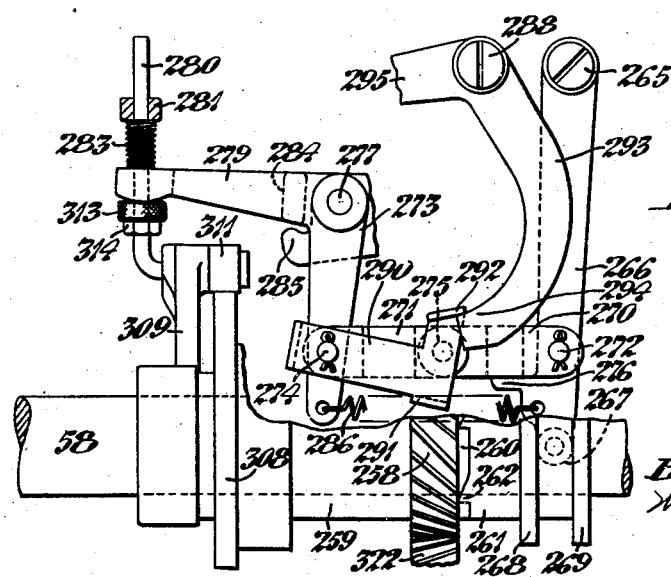
Fig. 34 is a view similar to Fig. 32 showing the clutch-operating means as reset to adapt it to disconnect the clutch when the winding of a new bobbin is started.

The segment-gear 133 and face-cam 254 are fixedly mounted on one end of a horizontal shaft 255, see Fig. 20, journaled intermediate its ends in a bearing 256 at the lower end of the bracket 252. The shaft 255 is located above the doffing and donning drive-shaft 58 and arranged at right-angles thereto with a helical gear 257 at its end in mesh with a helical gear 258 on a sleeve 259 free to rotate on the drive-shaft. The sleeve 259 has clutch-teeth 260 at its right-hand end, see Figs. 32 to 34, to adapt it for driving connection with the drive-shaft 58 by means of a clutch-member 261. The clutch-member 261 is splined to the drive-shaft 58 to adapt it to slide thereon and has clutch-teeth 262 at its end adapted to engage with the clutch-teeth 260 on the sleeve 259.

Figure 32:
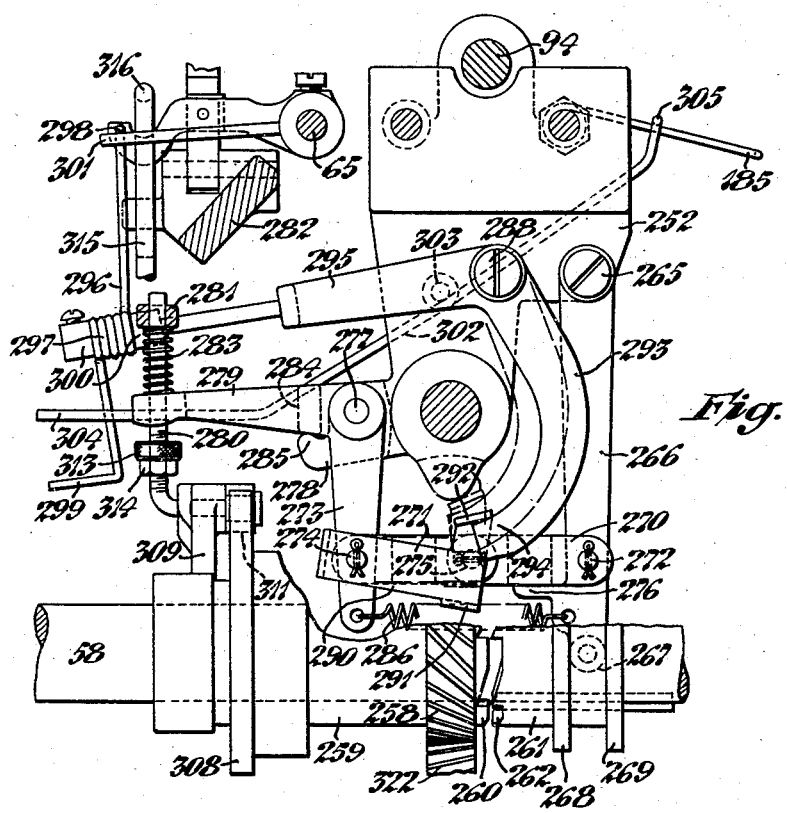
Fig. 32 is a transverse sectional view taken on line 32—32 of Fig. 4 showing the clutch for connecting the doffing and donning cams to their drive-shaft and the operating means therefor.
Figure 33:
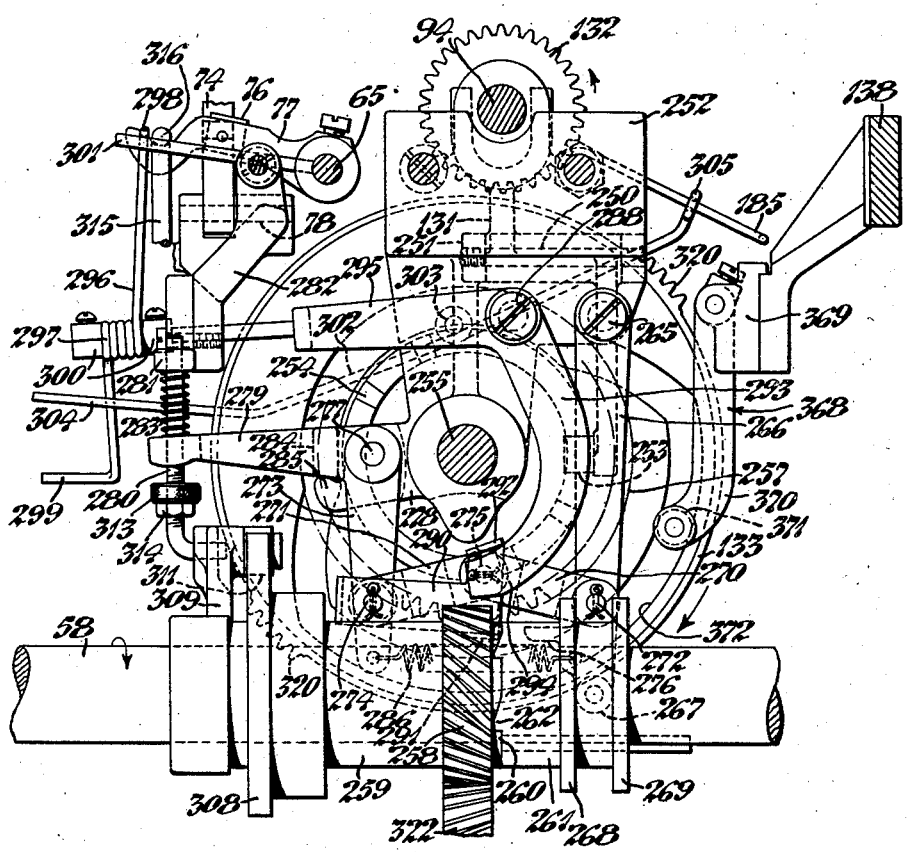
Fig. 33 is a view similar to Fig. 32 showing the relationship of the parts when the clutch is engaged to connect the doffing and donning cam-shafts to their drive-shaft.
Figure 38:
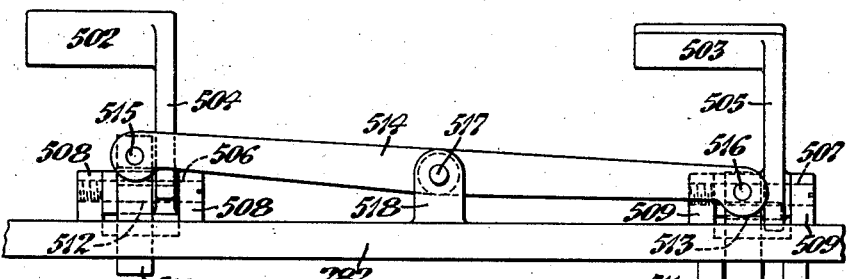
Fig. 38 is a view similar to Fig. 37 showing the opposite bearing plate as set to start a new winding outwardly toward the right as viewed in Fig. 1.
Figure 37:
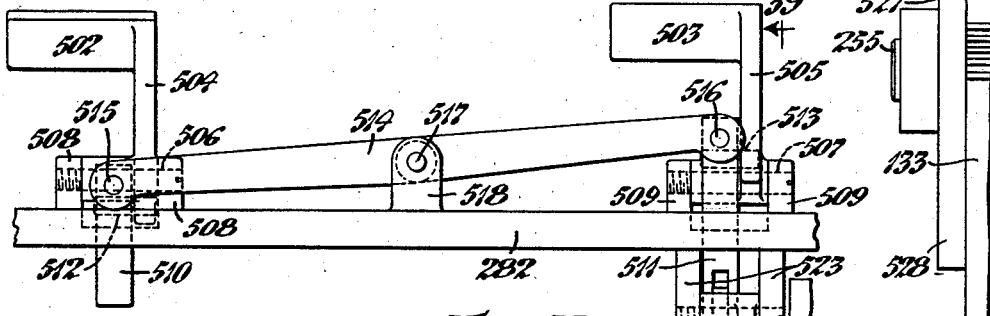
Fig. 37 is a detailed view showing the cam-actuated means for operating the bearing plates for the former-bars and illustrating the right-hand bearing plate as set to start the winding of a new bobbin toward the left as viewed in Fig. 1.

The clutch-member 261 may be slid from the position shown in Fig. 32 to that shown in Fig. 33 by a shifting lever 266 controlled and actuated by the stopping means. The lever 266 is pivotally mounted at its upper end on a stud 265 projecting laterally from the bracket 252, see Figs. 20 and 32, and has a roller 267 at its lower end positioned between spaced flanges 268 and 269 on the clutch-member 261. The clutch-member 261 is normally held in its inoperative position shown in Fig. 32 by means of a toggle comprising links 270 and 271. The link 270 has a bifurcated end stradding the lever 266 and pivotally connected thereto by a clevis-pin 272 extending through the end of the link and the lever. The link 271 has a bifurcated end straddling the depending arm of a bell-crank lever 273 and pivotally connected thereto by a clevis-pin 274. The adjacent ends of the links 270 and 271 are pivotally connected by means of a pin 275 and the downward movement of the toggle is limited by the engagement of the bottom of the link 270 with a lug 276 projecting laterally from the lever 266.

The bell-crank lever 273 is rockably mounted on a pivot-pin 277 carried by a flange 278 on the depending bracket 252 with its horizontal arm 279 projecting laterally from the pivot. The outer end of the arm 279 of the bell-crank lever 273 is bifurcated to straddle a push-rod 280 slidable in a bearing lug 281 projecting from the right-hand end of a cross-strut 282 which extends between the casings 6 and 46, see Fig. 4. A spring 283 coiled about the push-rod 280 between the lug 281 and the bifurcated end of the arm 279 tends to normally rock the bell-crank lever 273 in counterclockwise direction, as viewed in Fig. 32. The spring 283 thus acts on the bell-crank lever 273 to cause the toggle-links 270 and 271 to hold the lever 266 in position to maintain the clutch-member 261 in inoperative position as shown in Fig. 32. The rocking movement of the bell-crank lever 273 in counterclockwise direction is limited by the engagement of a laterally projecting lug 284 on the arm 279 with an abutment 285 on the flange 278 on the bracket 252. A helical spring 286 connected between the lower end of the depending arm of the bell-crank lever 273 and the lever 266 tends to draw them toward each other when the toggle is released.

An arm 290 rockably mounted on the clevis-pin 274 has a laterally-extending flange 291 which underlies the pivotally connected ends of the toggle-links 270 and 271 and a lateral flange 292 projecting in a direction away from the toggle-links. A bell-crank lever 293 pivotally mounted intermediate its ends on a pivot-stud 288 projecting laterally from the bracket 252 has a curved arm with its terminal portion 294 underlying the flange 292. The opposite arm 295 of the bell-crank lever 293 extends outwardly and below the rock-shaft 65, previously described as functioning for starting and stopping the winding operation. A drop-wire 296, see Figs. 4 and 32, has a helically-coiled portion intermediate its ends forming a hub 297 rotatable on a rod-like extension of the arm 295 of the bell-crank lever 293. The drop-wire 296 has an arm extending upwardly with its right-angular end providing a hook 298 and a laterally-extending tail-portion 299. The drop-wire 296 is retained in position on the arm 295 of the bell-crank lever 293 between collars 300 fastened to the rod-like extension of the arm.

Projecting laterally from the rock-shaft 65 is a wire arm 301 adapted to engage the hook 298 of the drop-wire 296. Due to its weight the depending tail-portion 299 of the drop-wire 296 tends to tilt the latter to displace its hook 298 laterally away from the arm 301. Thus, upon pivotal movement of the rock-shaft 65 to arrest the winding operation, due to a break in the feeding yarn strand $y$ or exhaustion of its supply, the hook 298 of the drop-wire 296 will not be engaged by the arm 301. However, upon pivotal movement of the rock-shaft 65 to arrest the winding operation after the completion of a bobbin B the drop-wire 296 will be rocked on the arm 295 of the bell-crank lever 293 by a second drop-wire 302 to move its hook 298 into position to be engaged by the arm 301, see Fig. 32. The second drop-wire 302 is pivotally mounted intermediate its ends on a pin 303, see Fig. 32, with the end 304 of one arm underlying the depending tail-portion 299 of the drop-wire 296, being formed with a loop 305 at the end of its opposite arm embracing the bail of the drop-wire 185, see Figs. 27 and 32. When the drop-wire 185 is held in raised position during the winding operation the end 304 of the drop-wire 302 will be maintained in its lowermost position permitting the drop-wire 296 to be rocked by gravity to the position shown by full lines in Fig. 4 to displace the hook 298 laterally from the arm 301. When the drop-wire 185 is released to fall to the position shown in Fig. 33 upon the completion of a bobbin B the opposite end 304 of the drop-wire 302 will be raised to bear against the depending tail-portion 299 of the drop-wire 296 to rock the latter to position its hook 298 above the arm 301 as shown by dash lines in Fig. 4. Rocking movement of the rock-shaft 65 to arrest the winding operation will then cause the arm 301 to engage the hook 298 of the drop-wire 296 to thereby rock the bell-crank lever 293 in clockwise direction as viewed in Fig. 32.

Upon movement of the bell-crank lever 293 in clockwise direction from the position illustrated in Fig. 32 to that illustrated in Fig. 33 the engagement of its end 294 with the flange 292 on the arm 290 will rock the latter on the clevis-pin 274 and engage its flange 291 with the under edges of the toggle-links 270 and 271 below their connecting pivot 275 to break the toggle. The spring 286 acting between the depending arm of the bell-crank lever 273 and the lever 266 will then rock the latter in clockwise direction from the position illustrated in Fig. 32 to that illustrated in Fig. 33 to shift the clutch-member 261 and engage its clutch-teeth 262 with the clutch-teeth 260 on the sleeve 259. This engagement of the clutch-member 261 with the sleeve 259 will connect the gear 258 for rotation by the doffing and donning drive-shaft 58 and the gear 257 will be driven therefrom to rotate the shaft 255, see Fig. 20. The gear 133 and face-cam 254 on the shaft 255 will thus be driven to rotate the turret 93 and shift it axially to carry an empty bobbin $b$ into winding position. During each quarter-revolution of the turret 93 the fixed cam 114 or 129 will cooperate with the cam-face 113 or 128 on one of the hubs 112 or 127 of the yoke-shaped member 109 or 122 to move one of these members axially to doff the wound bobbin B and don an empty bobbin $b$. The opposite yoke-shaped members 109 and 122 are moved axially in alternate order during successive quarter-revolutions of the turret 93 so that an empty bobbin $b$ will be donned on the winding spindle second successive to the one from which a wound bobbin B is doffed and the bobbin $b$ previously donned on the first successive spindle will be moved into winding position.

The clutch-operating means is reset to disengage the clutch-member 261 from the sleeve 259 by means of a cam 308 on the sleeve, see Figs. 2, 4 and 32. The cam 308 is arranged to rock a lever 309, see Fig. 4, which is pivotally mounted intermediate its ends on a pin 310 carried by a suitable bracket 307 depending from the cross-strut 282, referred to previously. The lever 309 has a follower 311 at its end for engagement with the cam 308, the follower being held in engagement with the cam by means of a spring 312 anchored to the cross-strut 282 and connected to the horizontal arm of the lever, see Fig. 4. The push-rod 280, referred to previously, is connected to the lever 309 adjacent the follower 311 and is screw-threaded for a portion of its length. An abutment 313 in the form of a nut is adjustable longitudinally of the push-rod 280 by rotating it thereon and may be locked in any adjusted position by a lock-nut 314. At the outer end of the lever 309 is a link 315, see Figs. 4 and 23, which extends upwardly and has a hooked end 316 slidably guided in a suitable bearing 317 on the cross-strut 282. The hooked end 316 of the link 315 overlies the arm 77 which projects laterally from the rock-shaft 65 as shown in Figs. 4, 23, 32 and 33.

Adjacent the end of each rotation of the sleeve 259 the cam 308 will operate through the follower 311 to rock the lever 309 from the position shown by full lines in Fig. 4 to that indicated by dash lines. Such movement of the lever 309 will lift the push-rod 280 to engage the abutment 313 with the arm 279 of the bell-crank lever 273 and rock the latter in clockwise direction from the position shown in Fig. 33 to that shown in Fig. 34. Such rocking movement of the bell-crank lever 273 thus will cause its depending arm to move to the left to aline the links 270 and 271 of the toggle to resist the action of the spring 286. Simultaneously with the lifting of the push-rod 280 the link 315 at the opposite end of the lever 309 will be moved downwardly to engage its hooked end with the arm 77 and rock the rock-shaft 65 to starting position where it is automatically latched by the detent-member 74 so that a new winding operation will be initiated. Simultaneously with the rocking of the rock-shaft 65 to start the winding operation the arm 301 will release the drop-wire 296 to permit the bell-crank lever 293 to rock to the position shown in full lines in Fig. 32. Continued rotation of the cam 308 will then release the lever 309 to cause it to be operated by the spring 312, see Fig. 4, to depress the push-rod 280 and raise the link 315 to the position shown in Fig. 32. The spring 283 will then act between the bearing 281 and the arm 279 of the bell-crank lever 273 to rock the latter in counterclockwise direction from the position shown in Fig. 33 to that shown in Fig. 32 to transmit the motion through the toggle 270, 271 whereby to move the lever 266 to the right and disengage the clutch-member 261 from the sleeve 259. The clutch-member 261 thus will be disengaged to terminate the operation of the doffing and donning means simultaneously with the starting of a new winding.

The arrangement of the gears 257 and 258 is such that one complete revolution of the sleeve 259 will turn the shaft 255 through one-half revolution, see Fig. 20. The gear 133 has opposed segments 320 arranged 180° apart as shown in Fig. 33 so that for each half-revolution of the shaft 255 one segment of the gear will mesh with the gear 132 on the turret shaft 94 and the number of teeth in each segment is such as to rotate the turret through a quarter of a revolution to aline the next successive spindle 90 with the driving head 23, see Fig. 11.

Figure 6:
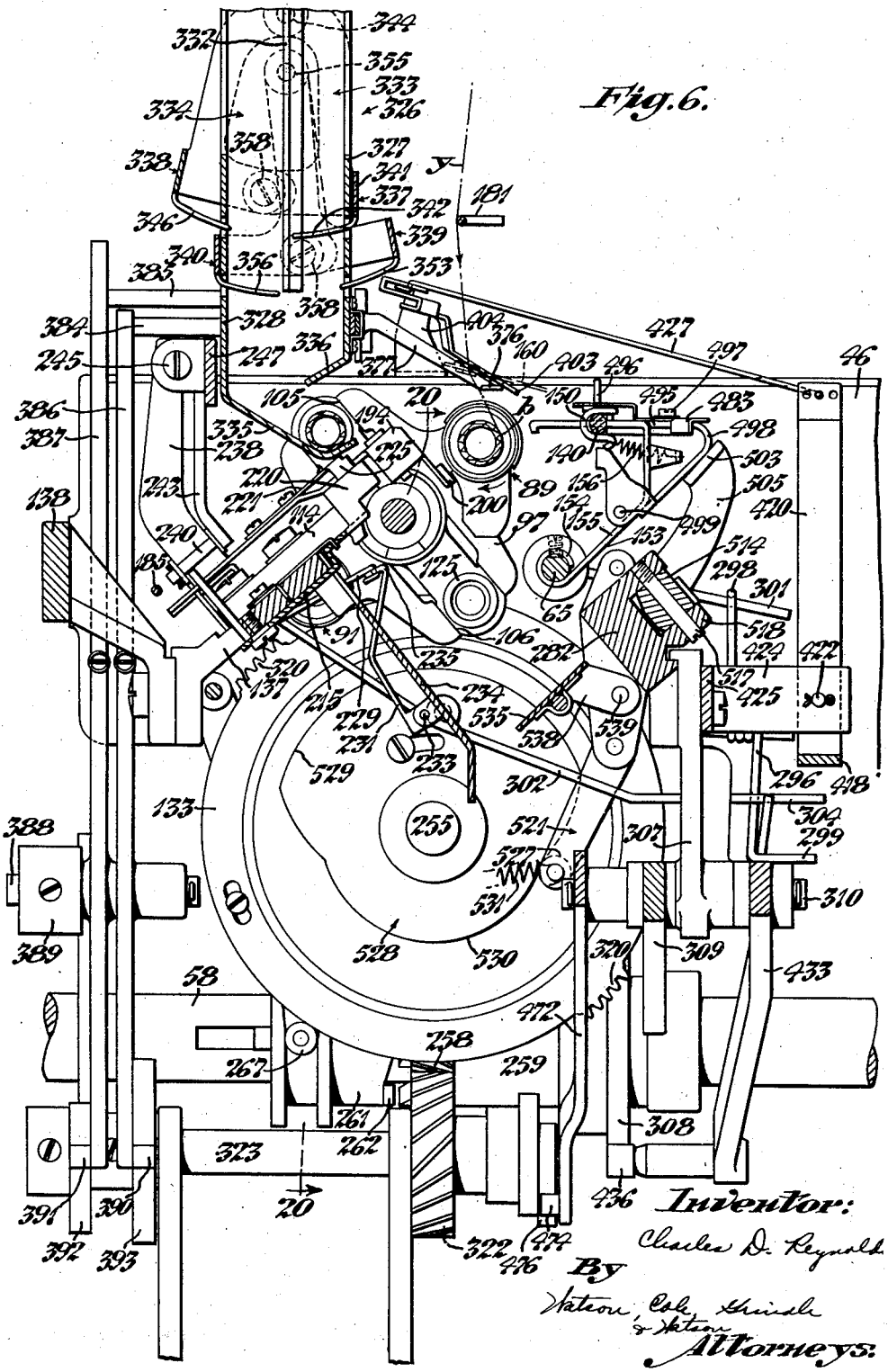
Fig. 6 is a transverse sectional view taken on line 6—6 of Fig. 4 showing the segment-gear for rotating the turret to doff a wound bobbin and done an empty yarn-carrier.

Also meshing with the gear 258 on the shaft 58 is a gear 322 mounted fast on a cam-shaft 323, see Figs. 2, 6 and 20. The cam-shaft 323 is journaled in suitable bearings in the machine frame and mounts several cams for operating certain parts as will appear later. The ratio of the gears 258 and 322 is such that one complete revolution of the sleeve 259 will rotate the cam-shaft 323 through one complete revolution.

*Magazine*

Empty yarn-carriers or bobbins *b* are fed into position automatically to be donned on the spindles 89, 90, 91 and 92 in alternately reversed relationship from a magazine 326. The magazine 326, best illustrated in Figs. 1 to 5 and 35, is in the form of an upright rectangular chute having U-shaped side walls 327 and 328 and end walls 329 and 330. The magazine 326 is mounted on the cross-strut 247 by the attachment of the bottom portion of its wall 328 thereto, see Figs. 3 and 5. A septum 332 extending between the end walls 329 and 330 divides the magazine into two compartments 333 and 334, the septum being arranged at an angle to the plane of the front and rear walls 327 and 328, see Fig. 1, so that each compartment may receive empty bobbins *b* arranged in one position only and reversed from the bobbins in the other compartment.

As illustrated in Fig. 3, the compartment 333 adjacent the winding position is adapted to receive bobbins *b* with their heads *h* toward the casing 6 and their tips *t* toward the casing 46 and the compartment 334 is adapted to receive bobbins *b* with their heads toward the casing 46 and their tips toward the casing 6. It will be apparent therefore that the bobbins *b* in compartment 333 are adapted to be donned on spindles 90 and 92 while the bobbins in compartment 334 are adapted to be donned on spindles 89 and 91. As shown in Fig. 5, the wall 328 of the magazine 326 below the cross-strut 247 is inclined forwardly and then upwardly to provide a V-shaped cradle 335 for guiding and supporting a bobbin released from the compartment 334 in position to be gripped between the spindle 89 or 91 and the appropriate spindle-cup 125 on the yoke-shaped member 122 when the latter is released by the cam 129. The bottom portion 336 of the front wall 327 of the magazine 326 is inclined rearwardly to guide bobbins *b* from the forward compartment 333 into the cradle 335 to be gripped between the spindle 90 or 92 and the appropriate spindle-cup 110 on the yoke-shaped member 109 when the latter is released by the cam 114.

Successive bobbins are released alternately from the compartments 333 and 334 of the magazine 326 by upper gates 337 and 338 and lower gates 339 and 340 adapted to be operated simultaneously in pairs. The upper gate 337 is in the form of a U-shaped frame, see Fig. 3, having a bar 341 extending longitudinally along the side wall 327 with fingers 342 projecting therefrom through suitable openings in the wall and into the compartment 333. The ends of the U-shaped frame are in the form of curved arms 343, see Fig. 5, which straddle the end walls 329 and 330 of the magazine, see Fig. 3, and are pivoted at their upper ends on pintles 344 projecting outwardly from the end walls. The upper gate 338 is of U-shape similar to the gate 337 but extends at the rear of the wall 328 of the magazine and has fingers 346 projecting through suitable openings in the wall and into the compartment 334. The arms 349 at the ends of the gate 338 are also pivotally mounted on the pintles 344. The two upper gates 337 and 338 are connected together for movement as a unit by means of overlapping flanges 350 and 351 on the arms 343 and 349 which are connected together in any particular adjusted relationship by means of bolts 352 passing through slots in the flanges, see Fig. 36.

The lower gate 339 is also in the form of a U-shaped frame positioned below the gate 337 and having fingers 353 projecting through suitable openings in the side wall 327 into the compartment 333. The fingers 353 are spaced from the fingers 342 of the upper gate 337 a distance approximately equal to the diameter of a bobbin *b*. Arms 354 at the ends of the lower gate 339 extend upwardly between the arms 343 of the upper gate 337 and the end walls of the magazine and are pivotally mounted on pintles 355. The lower gate 340 is similar to the gate 339 but positioned at the opposite side of the magazine 326 with its fingers 356 projecting through suitable openings in the wall 328 into the compartment 334 and spaced from the fingers 346 of the upper gate 338 a distance substantially equal to the diameter of the bobbin *b*. The arms 357 at the ends of the gate 340 are pivotally mounted on the pintles 355 and the two lower gates are connected together by bolts 358 for movement as a unit.

The upper pair of gates 337, 338 and lower pair 339, 340 are operated simultaneously but in opposite directions by means of a slide 359, see Figs. 5 and 35, which is reciprocable vertically in a guideway 360 on the inner end wall 329 of the magazine 326, see Fig. 36. The slide 359 is positioned between the arms of the gates and the end wall 329 of the magazine 326 and is connected to the arm 343 of the gate 337 by a link 362. A similar link 363 at the opposite side of the slide 359 connects the latter to the arm 357 of the gate 340. Thus, when the slide 359 is moved downwardly to the position shown in Fig. 5 the upper gate 337 will be moved toward the magazine by the link 362 to position the fingers 342 in the compartment 333 and the upper gate 338 connected thereto will be moved outwardly to withdraw the fingers 346 from the compartment 334. The lower gates 339 and 340, however, will be shifted simultaneously in the opposite direction by the link 363 so that the fingers 353 of the gate 339 will be withdrawn from the compartment 333 and the fingers 356 of the gate 340 projected into the compartment 334.

By this action a bobbin b will be released from the compartment 333 by the lower gate 339 and guided by the inwardly directed plate 336 to drop down onto the inclined bottom wall of the magazine and into the cradle 335. The bobbins b above the released bobbin, however, will be retained in the compartment 333 by the gate 337. Simultaneously, the lower gate 340 will be moved into the compartment 334 to prevent release of bobbins therefrom and the upper gate 338 will be withdrawn from the compartment to release the lowermost bobbin therein so that it will drop down onto the fingers 356 of the lower gate.

When the slide 359 is slid upwardly from the position shown in Fig. 5 to that shown in Fig. 35 the end of the link 362 connected thereto, see Fig. 36, will move outwardly away from the slide to rock the upper gates 337 and 338 as a unit in clockwise direction; while the link 363 being connected to the lower gates 339 and 340 will shift the latter as a unit in the opposite direction or counterclockwise as viewed in Figs. 5 and 35. Such simultaneous movement of the gates 339 and 340 will release the lowermost bobbin b in the compartment 334 by the withdrawal of the fingers 356, while the fingers 353 of the gate 339 will move into the compartment 333. At the same time the upper gate 338 will be shifted to project its fingers 346 into the compartment 334 to retain the bobbins b above the one being released therefrom and the gate 337 will be moved outwardly to permit the lowermost bobbin in the compartment 333 to drop onto the fingers 353 of the lower gate 339. Thus the gates 337 to 340 are operative upon reciprocation of the slide 359 to release successive bobbins singly and alternately from the compartments 333 and 334.

The slide 359 is slid either upwardly or downwardly during a doffing and donning operation to release a bobbin b to be donned on the second successive spindle as related to the spindle from which the wound bobbin B is doffed. The lower end of the slide 359 is in the form of a plate 364, see Figs. 5 and 35, having a transverse slot 365 therein for receiving the laterally projecting end 366 of one arm 367 of a bell-crank lever 368. The bell-crank lever 368 is pivoted intermediate its ends in a suitable bearing 369 on the bracket 137, see Figs. 5 and 35. The depending arm 370 of the bell-crank lever 368 carries a follower 371 which projects into a cam-groove 372 formed in the same side of the segment gear 133 as the face-cam 254. The cam-groove 372 is of a contour to adapt it to move the slide 359 in one direction during one-half revolution and in the opposite direction during its second half-revolution. It is to be noted further that the cam-groove 372 is so related to the segments 320 on the gear 133 as to effect operation of the bell-crank lever 368 during rotation of the shaft 255 immediately prior to the engagement of the teeth on the segment-gear with the gear 132 which rotates the turret 93 through a quarter-revolution. Consequently, the released bobbin b will drop into position on the cradle 335 before the turret is rotated. It will be understood that the cam 372 is so arranged as to operate the gates 337 to 340 to release a bobbin b from the appropriate compartment 333 or 334 to be donned on the spindle moving into donning position or, in other words, to raise the slide 359 when a bobbin is to be donned on spindle 89 or 91 and lower the slide when a bobbin is to be donned on spindle 90 or 92.

*Yarn-retrieving means*

After a wound bobbin B has been doffed and an empty bobbin b on the next successive spindle has been moved into winding position yarn-retrieving means operate to position the feeding yarn strand y to adapt it to be caught in one of the notches 104 in the spindle-cup 101 or 120.

The yarn-retrieving means is illustrated in Figs. 3 to 5 and 43 as comprising hooks 375 and 376 located adjacent the opposite ends of the turret 93 and adapted to move axially of the bobbin b in one direction to engage the yarn strand y and then in the opposite direction to draw the strand toward the spindle-cup 101 or 120. The yarn-hook 376 is formed at the end of an arm 377, see Fig. 3, and positioned above and a little forward of the axis of the spindle 89 or 91 when one of the latter is in winding position. The open side of the hook 376 faces toward the thread-guide 160 so that when the winding operation is started the yarn strand y will be withdrawn from the hook. As shown in Fig. 3, the arm 377 extends axially of the spindle and then rearwardly at right-angles with its end attached to a horizontal slide bar 378. The bar 378 is mounted to slide in guideways 379 and 380 on the side wall 327 of the magazine 326, see Fig. 4.

The opposite hook 375 is formed at the end of an arm 381, see Figs. 3 and 5, and is positioned above and a little rearwardly of the axis of the spindle 90 or 92 when one of the latter is in winding position. The arm 381 extends axially of the spindle and then rearwardly in a curved portion 382, see Fig. 5, with its end attached to or formed integrally with a slide 383. The slide 383 is slidable on the slide-bar 378 and guided by the guideways 379 and 380. The open side of the hook 375 faces rearwardly as viewed in Fig. 3 so that the yarn strand y will be withdrawn therefrom at the beginning of the winding.

Figure 43:
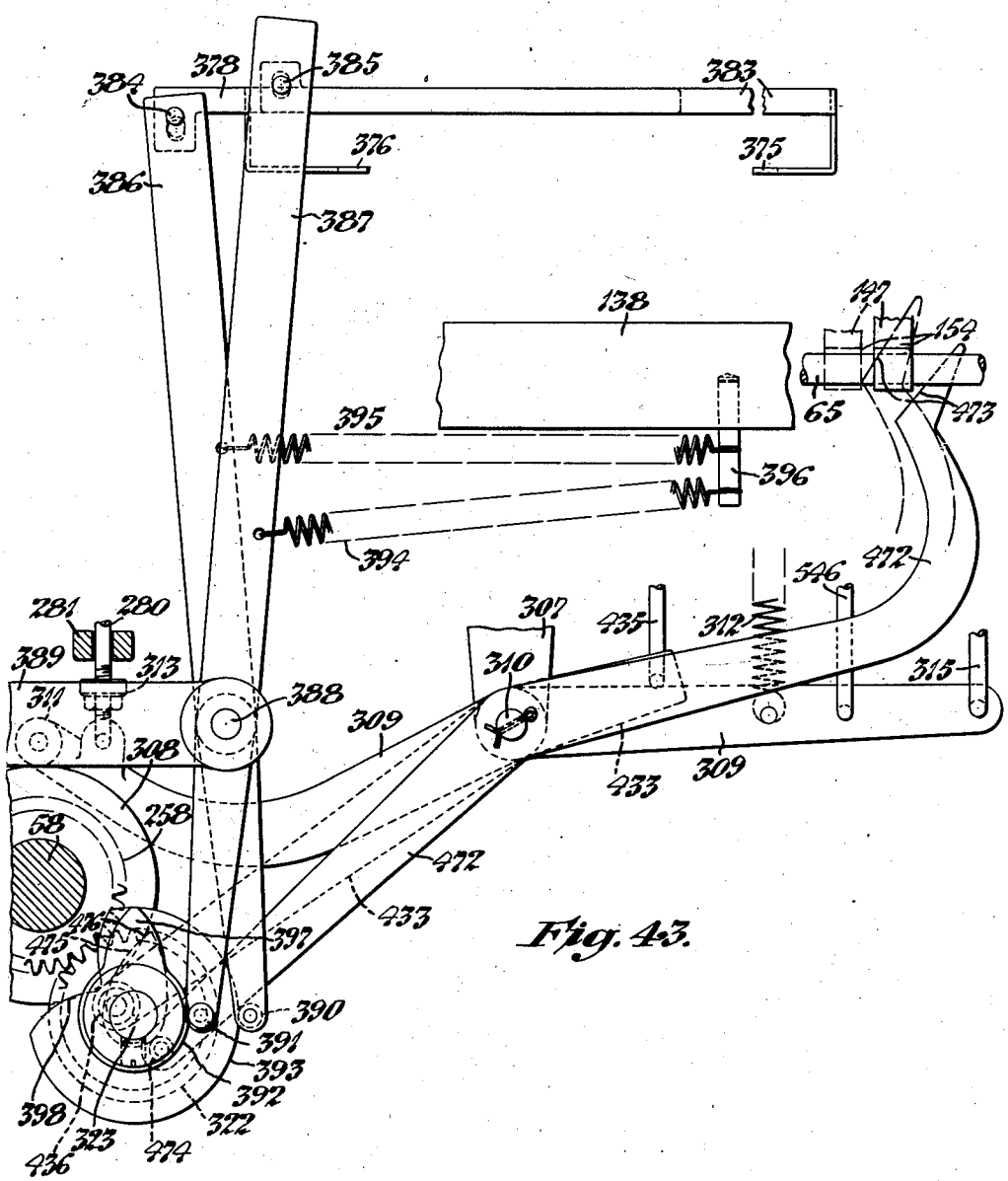
Fig. 43 is a detailed view of the yarn-retrieving hooks and the cam-means for operating the same.

The outer ends of the slide bars 378 and 383 are connected to rods 384 and 385 projecting laterally from the sides of levers 386 and 387, see Figs. 3 and 43. The levers 386 and 387 are pivoted intermediate their ends on a pivot-stud 388 carried by a bracket 389 attached to and projecting from the shelf 3 supporting the casing 46. Rollers or cam-followers 390 and 391 are mounted on the ends of the shorter arms of the levers 386 and 387 to adapt them to bear against the periphery of cams 392 and 393 on the shaft 323. The cam-followers 390 and 391 are held in engagement with the periphery of the cams 392 and 393 by means of springs 394 and 395 connected at one end to the levers and anchored at their opposite ends to a pin 396 fast in the cross-strut 138.

As will be noted by reference to Fig. 43, the cams 392 and 393 are so arranged as to normally hold the yarn-hooks 375 and 376 in their retracted inoperative position during the winding operation. However, during a donning and doffing operation the shaft 323 is rotated through one complete revolution by the gear 258, referred to previously, so that the lobe 397 on the cam 392 will oscillate the lever 387 to cause it to reciprocate the slide 383 and thereby the yarn-hook 375. During its reciprocation the yarn-hook 375 will catch the yarn strand $y$ leading from the bobbin B doffed from the spindle 89 or 91 and draw it toward the spindle-cup 120 of the spindle 90 or 92 to adapt it to be engaged in one of the angular notches 104. Upon rotation of the spindle 90 or 92 to start the winding of a new bobbin $b$ the yarn strand will be broken between the spindle-cup 120 and the doffed bobbin B but the yarn strand will be retained in the notch 104 to wind onto the bobbin $b$.

Simultaneously with the reciprocation of the yarn-hook 375 the dwell 398 in the cam 393 will effect oscillation of the lever 386 to reciprocate the yarn-hook 376. The yarn-hook 376 operates in the same manner as the yarn-hook 375 to catch the yarn strand and draw it into position to be engaged by one of the notches 104 in the spindle-cup 101 on the spindle 89 or 91.

Bunch-building mechanism

Bobbins for use in automatic looms require a "bunch" consisting of a relatively short length of reserve yarn wound at the base of the yarn-carrier or bobbin $b$ before the service winding is commenced. It is therefore usual in bobbin winding machines to provide a device termed a "bunch-builder" which restrains the yarn from being traversed except to a slight extent at the start of the winding of a bobbin and after a predetermined length of yarn is wound into the bunch releases the yarn to permit it to be traversed for the service winding.

The bunch-building mechanism, best illustrated in Figs. 1 to 6 and 40 to 42, comprises a yarn-retaining member 402 adjacent one driving head 23 and a second yarn-retaining member 403 adjacent the other driving head 49. The yarn-retaining member 403 is pivotally mounted intermediate its ends on a bracket 404 projecting from the casing 46, see Fig. 3, for rocking movement in a horizontal plane above the butt end of a bobbin $b$ mounted on spindle 89 or 91. The yarn-retaining member 403 has angular end portions to provide a crotch 405 at one side of its pivot and an arm 406 at the opposite side of the pivot.

The yarn-retaining member 402 is in the form of a plate having a projecting finger with a V-shaped notch 407 intermediate its ends and an angular tail-portion 408 extending toward the casing 6 for guiding the yarn strand $y$ into the notch, see Fig. 40. The yarn-retaining member or plate 402 is supported in horizontal position at the lower end of the depending curved arm 410 of a rockable frame 411, see Fig. 42. The frame 411 extends laterally of the arm 410 and then downwardly to provide an offset arm 412, being formed with a U-shaped portion 413 intermediate its ends. The frame 410 is rockably mounted on a pivot-pin 414 projecting laterally from a bracket 415 on the casing 6 and through the U-shaped portion 413 of the frame. The depending offset arm 412 of the frame 411 is provided with a slot 416 at its lower end, see Fig. 42.

The two yarn-retaining members 402 and 403 are connected by a U-shaped frame 418 for simultaneous movement from their inoperative position shown in Fig. 1 to their operative position shown in Fig. 40. The U-shaped frame 418 is pivotally mounted intermediate the ends of its vertical side arms 419 and 420 on pivot-pins 421 and 422 projecting inwardly from the arms 423 and 424 of a bracket 425 bolted to the cross-strut 282, see Fig. 5. The upper ends of the side arms 419 and 420 of the U-shaped frame 418 are offset outwardly and the arm 420 is connected to the arm 406 of the yarn-retaining member 403 by a connecting link 427, see Fig. 40. The upper offset end of the arm 419 is connected to operate the yarn-retaining member 402 by means of a link 428 having a right-angular portion 429, see Fig. 3, projecting laterally through the slot 416 in the depending arm 412 of the rockable frame 411 as shown in Fig. 42. The link 428 extends beyond the arm 412 of the rockable frame 411 and is connected to a ratchet-escapement means to be described later.

The yarn-retaining members 402 and 403 are rocked into operative position simultaneously at the beginning of the winding of a bobbin B in either direction to cause one or the other to engage the yarn strand between the bobbin $b$ and the thread-guide 160, see Fig. 40. Their operating means consists in a lever 433 pivoted intermediate its ends on the pivot-pin 310 described previously, see Figs. 2, 3 and 4. One end of the lever 433 is connected to an angular bracket 434 on the U-shaped frame 418 by means of a link 535. The opposite end of the lever 433 has a follower or roller 436, see Figs. 2 and 43, which bears against the periphery of the cam 308 on the sleeve 259, previously described as employed for operating the lever 309. After a bobbin B has been completed by winding it in either direction and the sleeve 259 has been clutched to the shaft 58 the cam 308 will be rotated through a complete revolution to rock the lever 433 on the pivot-pin 310. This rocking movement of the lever 433 will be transmitted through the link 435 to rock the frame 418, which motion, in turn, is transmitted through the links 427 and 428 to simultaneously move the yarn-retaining members 402 and 403 into their operative position shown in Fig. 40. The appropriate yarn-retaining member 402 or 403, depending upon in which direction the bobbin B is to be wound, will engage the yarn strand $y$ between the thread-guide 162 and bobbin $b$ and restrain it in the V-shaped notch 407 or crotch 405 to cause a bunch $r$ to be wound with a restricted traverse, see Fig. 40.

The period of operation of the yarn-retaining members 402 and 403 is controlled by a ratchet-escapement mechanism generally similar to that shown in United States Letters Patent No. 1,809,217 to J. M. Quill, issued June 9, 1931. Suffice it to state herein that the ratchet-escapement mechanism comprises a flat horizontal supporting plate 441 mounted on the casing 6 and having upstanding end walls 442. Journaled on a stud 444 is a toothed ratchet-wheel 445, see Figs. 3 and 40, carrying a cam-disk 446 fast therewith which has a recess 447 with an arcuate boundary cut into its side as indicated by dotted lines in Fig. 40. A spring 448 coiled around the stud 444 has one end anchored to the upper end thereof with its opposite end fastened in a hole in the cam-disk 446, the tension of the spring tending to rotate the ratchet-wheel 445 and cam-disk in clockwise direction as viewed in Fig. 40.

Normally, rotation of the ratchet-wheel 445 and cam 446 is prevented by means of a holding pawl 449 engaging with the teeth of the ratchet. The ratchet-teeth extend throughout substantially the entire circumference of the ratchet-wheel 445 and a stop-finger 450 projects radially at one end of the series of teeth in position to be engaged by the end of the holding pawl 449 to limit the rotation of the ratchet-wheel under the action of the spring 448. The holding pawl 449 is pivoted on a stud 451 which also forms the pivot for an escapement-lever 452.

The escapement lever 452 is formed with a toe-portion 455 adapted to normally ride on the periphery of the cam-disk 446, see Fig. 40, the end of the toe being of arcuate shape to adapt it to slide through the recess 447 in the periphery of the cam 446 when the recess is turned into register therewith as shown in Fig. 3 of the drawings. Projecting laterally from the escapement-lever 452 at the opposite side of the pivot 451 from the toe 455 is an arm 456 which is connected at its outer end to the end of the link 428 which projects beyond the arm 412 of the rockable frame 411, see Fig. 42. By this arrangement the rocking movement of the U-shaped frame 418 to set the yarn-retaining members 402 and 403 in operative position will operate to rock the escapement-lever 452 from the position shown in Fig. 3 to that shown in Fig. 40 to withdraw the toe-portion 455 of the lever 452 from the recess 447 and release the ratchet-wheel 445 and cam-disk 446 which will then be rotated by the spring 448 to their initial operating position.

An actuating lever 457 is pivotally connected at one end to the escapement lever 452 by means of a screw 458. The actuating lever 457 carries a pawl 459 pivoted at 460 and having a sharpened toe at its end adapted to engage the teeth of the ratchet-wheel 445 as shown in Figs. 3 and 40. The pawls 449 and 459 are connected by a spring 461 which normally maintains them in position to engage the teeth of the ratchet-wheel 455. The pawls 449 and 459 have depending lugs 462 and 463 for engagement with the escapement-lever 452 at opposite sides of the pivot stud 451 to effect disengagement of the pawls from the ratchet-teeth when the escapement-lever is rocked to reset the bunch-builder. A helical spring 464 anchored to the end wall 442 of the plate 441 has its opposite end hooked into a hole in an arm 465 of the actuating lever 457, thus tending to rock the latter in counterclockwise direction.

The actuating lever 457 is of arcuate form extending through an opening 466 in the end wall 442 of the plate 441 and is provided with a depending flange or contact-member 467 in position to be engaged by an abutment or bunter 468 on the traverse-rod 140 whereby to rock the lever to cause the pawl 459 to turn the ratchet-wheel 445 intermittently. The bunter 468 is of comparatively narrow width so that when the actuating lever 457 is moved to its inoperative position shown in Fig. 3 the contact-member 467 will be moved out of the path of movement of the bunter. As the traverse-rod 140 is reciprocated during the initial stage of winding a bobbin B the actuating lever 457 is rocked by the bunter 468 to advance the ratchet-wheel 445 with a step by step motion. After a predetermined number of reciprocations of the traverse-rod 140 the ratchet-wheel 455 will be turned to a position where the recess 447 in the cam 446 will register with the end of the toe 455 of the escapement-lever 452 to release the latter. The spring 464 will then act to swing the escapement lever 452 in counterlockwise direction, see Fig. 3. This latter movement of the escapement-lever 452 will act through the angular portion 429 of the link 428 and arm 412 to rock the frame 411 and yarn-retaining member 402 mounted thereon away from the bobbin b to release the yarn strand y for service winding by the thread-guide 160. The movement of the link 428 will also rock the U-shaped frame 418 and through the link 427 shift the opposite yarn-retaining member 403 to its inoperative position shown in Fig. 3. The thread-guide 160 will then continue to operate in the usual manner after the bunch r has been wound to wind the bobbin B. The bunch-building mechanism will remain inoperative until reset by the actuation of the frame 418 at the completion of the winding of each bobbin B.

It may happen that upon arrestment of the winding operation the reciprocating traverse-rod 140 will come to rest with its bunter 468 in the path of movement of the contact-member or flange 467 to interfere with the resetting of the ratchet-escapement mechanism, see Fig. 3. To avoid such a condition a set-back lever 472 is provided, see Figs. 4 and 43, for sliding the traverse-rod 140 to the right as viewed in Fig. 3 prior to the resetting of the ratchet-escapement mechanism. The lever 472 is pivoted intermediate its ends on the pivot-stud 310 and has an angular cam-face 473 at its end engageable with the depending arm 153 of the connecting-member 147 at the inner end of the traverse-rod 140 for sliding the traverse-rod outwardly away from the contact-member, see Figs. 5 and 43. The opposite end of the lever 472 has a follower or roller 474 which bears against the periphery of a cam 475 on the cam-shaft 323. A lobe 476 on the cam 475 acts to rock the lever 472 at the beginning of a doffing and donning cycle and prior to the rocking of the frame 418 to set the yarn-retaining members 402 and 403.

*Bobbin-chase forming mechanism*

At the start of winding a bobbin B on a core or yarn-receiver b of the form shown herein it is necessary to build-up a mass of yarn on the butt end of the receiver of such form as to provide a conical base or chase on which the subsequent layers of yarn are deposited to build the body of the bobbin in accordance with the usual practice. The chase-forming mechanism, best illustrated in Figs. 2 to 6 and 35 to 40, comprises former-bars 482 and 483 mounted at opposite ends of the traverse-rod 140 for reciprocation therewith. The former-bar 482 is mounted on the member 147 connecting the traverse-rod 140 to the rod 141 and the former-bar 483 is mounted on the member 155 connecting the traverse-rod to the rod 142. The former-bars 482 and 483 are of the same shape but of opposite hand to adapt them to extend inwardly toward each other. Each former-bar 482 or 483 comprises an elbow-shaped arm having a cam-face or guiding edge 484. The edge 484 of each former-bar 482 or 483 is inclined with respect to the axis of the traverse-rod 140 to adapt it to be engaged by one or the other of the rearward ends 166 or 167 of the angular arms 163 or 164 on the thread-guide 160 at the beginning of the winding to control the position of the contact-wheel 169 in lateral relation to the bobbin b.

Each former-bar 482 and 483 has a slot 487 adjacent the inner end of its arm and a second slot 488 inclined with respect thereto, see Fig. 3. The former-bar 482 is mounted for adjustment on a plate 489 by means of a pin 490 extending upwardly from the plate through the slot 487 and a screw 491 extending through the inclined slot 488 and into the plate, see Figs. 3, 5 and 39. The plate 489 is supported at the upper end of an arm 492 having ears 494 at its lower end for mounting it for rocking movement on a pin 493 carried intermediate the ends of the depending arm 153 of the connecting-member 147. The former-bar 483 is similarly mounted on a plate 495 by means of a pin 496 and screw 497 and the plate is formed as part of an arm 498 pivotally mounted on a pin 499 carried intermediate the ends of the depending arm 153 of the connecting-member 155, see Fig. 6.

The former-bars 482 and 483 are rocked from inoperative to operative position to adapt one or the other to be engaged by the thread-guide 160 by means of bearing plates 502 and 503 engaging the arms 492 and 498 on which the former-bars are mounted, see Figs. 4 and 5. The bearing plates 502 and 503 extend laterally from the upper ends of triangularly-shaped levers 504 and 505, see Fig. 35, pivotally mounted on pins 506 and 507 extending between spaced ears 508 and 509 on the cross-strut 282, see Figs. 37 and 38. Rods 510 and 511 slidably mounted in the cross-strut 282 are connected to the levers 504 and 505 in spaced relation to the pivot-pins 506 and 507 by means of pins 512 and 513 extending through the rods and levers, see Fig. 39. The rods 510 and 511, in turn, are both connected to the opposite ends of a transverse lever 514, see Fig. 4, by means of pins 515 and 516 extending through the rods and the ends of the lever. The lever 514 is pivoted midway of its ends on a stud 517 extending between spaced ears 518 projecting upwardly from the cross-strut 282. The rods 510 and 511 and pins 512, 513 and 515, 516 connecting the ends of the lever 514 with the levers 504 and 505 constitute universal joints for transmitting the rocking movement of the lever 514 to the levers 504 and 505 to move one or the other bearing plate 502 or 503 toward the traverse-rod 140 and to withdraw the opposite bearing plate away from the latter.

Figure 39:
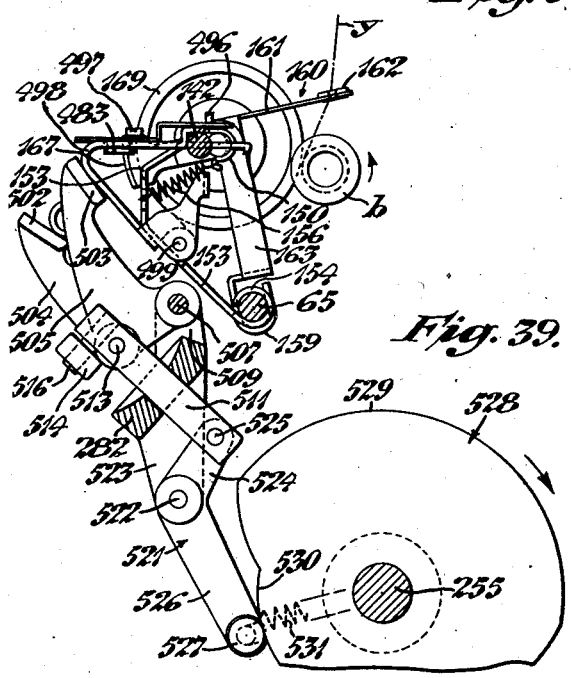
Fig. 39 is a detailed sectional view taken on line 39—39 of Fig. 37 and showing the outer or right-hand bearing plate set in operative position.

The transverse lever 514 is adapted to be rocked alternately in opposite directions at intervals between successive winding operations by a bell-crank lever 521, see Fig. 39, pivotally mounted on a pin 522 held in spaced ears 523 depending from the cross-strut 282. One arm 524 of the bell-crank lever 521 is pivotally connected to the end of the slide rod 511 below the cross-strut 282 by means of a pin 525. The opposite arm 526 of the bell-crank lever 521 carries a cam-follower 527 which engages against the periphery of a cam 528 fixedly mounted on the shaft 255 carrying the segment-gear 133. The cam 528 has a lobe 529 extending throughout substantially one-half of its circumference with a dwell portion 530 extending throughout the other half of its circumference as shown by dotted lines in Fig. 35. The lobe 529 of the cam 528 is adapted to rock the bell-crank 521 to the position shown in Fig. 35 and a spring 531 tends to rock the lever in the opposite direction as controlled by the dwell 530. As the shaft 255 rotates through one-half revolution during each donning and doffing operation the cam 528 and spring 531 will operate to rock the bell-crank 521 alternately in opposite directions. As the bell-crank 521 is connected to one end of the transverse lever 514 through the slide rod 511 the latter will be rocked alternately in opposite directions during successive donning and doffing operations and through the levers 504 and 505 will move the bearing plates 502 and 503 to shift one or the other former-bar 482 or 483 into position to be engaged by the thread-guide 160. It will be understood that the relationship of the cam 528 on the shaft 255 is such as to coordinate the shifting of the opposite former-bar 482 or 483 with the reversed relationship of the bobbins *b* mounted on the turret 93 so that the proper former-bar will be in operative position adjacent the butt end of each bobbin being wound.

Bobbin retaining gate

During the interval between the doffing of a wound bobbin B and the start of winding on a new bobbin *b* it is desirable to retain the doffed bobbin B adjacent the turret 93 so that a long length of yarn will not be unwound from the completed bobbin before the strand is broken. For this purpose a retaining chute, see Fig. 5, is provided below the turret 93. The chute comprises the inclined wall 234, previously referred to, and an opposite pivotally mounted wall 535 extending throughout the length of the turret and forming a trough therebeneath adapted to retain the wound bobbin B. The inclined wall 234 of the chute depends from the bracket 137 and is attached thereto by means of screws 537.

The opposite inclined wall 535 is pivotally mounted on the cross-strut 282 and constitutes a gate adapted for rocking movement toward and away from the wall 234. For this purpose the gate 535 has rearwardly-extending ears 538 pivoted on pins 539 held in the lugs 523 depending from the cross-strut 282. The position of the gate 535 is controlled by one arm of a two-armed lever 541 pivotally mounted on the ends of a pivot-pin 542 carried by a depending portion of the cross-strut 282, the lever being connected to the gate by means of a link 543, see Fig. 5. The opposite arm 545 of the lever 541 is connected to the cam-operated lever 309, shown in Fig. 2, for operating the starting means by a link 546. As shown in Fig. 2, the lever 309 is operated by the cam 308 on the sleeve 259 of the doffing and donning shaft 58. When the lever 309 is in its normal raised position shown by full lines in Fig. 5 the gate 535 will be in raised position to retain a doffed bobbin B in the chute. When the lever 309 is rocked by the cam 308 to start a winding operation the gate 535 will be rocked by the connecting linkage to the position shown by dash lines in Fig. 4. The gate 535 is operated to release the wound bobbin B at the start of winding a new bobbin and the sudden movement of the bobbin downwardly combined with the rotation of the spindle 89 to 91 to which the yarn strand *y* is gripped will cause the strand to break at a point between the winding head and the doffed bobbin. A suitable box or other receptacle, not herein shown, is usually provided below the gate 535 to collect the wound bobbins. The invention having been described in detail, the mode of operation of the machine is explained as follows:

Method of operation

Each winding unit of the multiple unit machine operates continuously to wind successive bobbins B, doff the wound bobbins, transfer empty bobbins *b* into winding position, retrieve the yarn strand y, set the bunch-building mechanism and start winding again. For purposes of explanation, let it be assumed that a bobbin B is being wound on the spindle 89 toward the left as viewed in Figs. 1 to 4 and 7. The spindle 89 is rotated by the unit drive-shaft 48 in the direction indicated by the arrow x in Fig. 7 to wind the yarn strand y on the bobbin b and the traverse-rod 140 is continuously reciprocated to traverse the thread-guide 160 longitudinally of the bobbin. At the end of each rearward stroke of the reciprocating thread-guide 160 the periphery of the contact-wheel 169 will engage the yarn mass wound on the bobbin b and be rotated thereby to turn the nut 168 on the screw-threaded rod 140 and advance the thread-guide therealong. This intermittent feed or advance of the thread-guide 160 results in a progressive advance of the zone of its traverse along the bobbin b to deposit the yarn in overlapping conical layers constituting the main body of the bobbin B.

Should the yarn strand y break or its supply become exhausted the yarn-controlled drop-wire 178 will be released and rock by gravity from the position shown by full lines in Fig. 23 to the position indicated by dash lines. During the rocking movement of the yarn-controlled drop-wire 178 its angular end-portion 180 will rock the knock-off member 170 from the position shown by full lines to that indicated by dash lines to raise the upper end of its arm 176 into the path of movement of the connecting-member 147 on the traverse-rod 140. Then, during the next forward stroke of the traverse-rod 140 the connecting-member 147 will bunt the knock-off member 170 to rock the detent-member 74 on which it is mounted to cause it to tilt from the position shown in Fig. 24 to that illustrated in Fig. 25. The rocking movement of the detent-member 74 thus will cause release of the arm 77 on the rock-shaft 65, see Fig. 23, and the latter will be rocked by the springs 71, see Figs. 20 and 21, to engage the inclined faces of the arms 69 and 70 with the flanges 20 and 53 on the clutches 14 and 52 to thereby disconnect the driving gears 13 and 51 from the unit drive-shafts 11 and 48.

Simultaneously with this action the intermediate portion 80 of the yoke-shaped member 66, see Figs. 1 and 22, will engage the cam-face 43 on the clutch-sleeve 37 to slide the latter against the action of the spring 40 and thereby disengage the detent 38 on the sleeve from the notch 36 in the abutment 35 on the oscillating drive-shaft 8. The rocking movement of the rod or shaft 65 thus will disconnect the shafts 11 and 48 from their drive-shafts 7 and 47 to arrest the rotation of the spindle-driving shafts 11 and 48. At this time the sleeve 37 is disconnected from the rocker-shaft 8 to arrest the reciprocation of the traverse-rod 140 and thread-guide 160. However, the doffing and donning mechanism will not be operated at this juncture as the bail of the drop-wire 185 still will be supported by the control lever 197 and feeler 195, see Figs. 27 and 28, so that the drop-wire 296 on the end of the arm 295 of the bell-crank lever 293 will remain in the position shown in full lines in Fig. 4. Therefore, the arm 301 extending from the rock-shaft 65 will not engage the hook 298 at the end of the drop-wire 296.

After the ends of the broken yarn strand y have been united, or in case a new supply package C has been placed on the bracket 86 and its end attached to the winding yarn strand on the bobbin, the winding is started again by turning the rock-shaft 65 manually in counterclockwise direction as viewed in Fig. 21 by means of the handle 73 at its end, see Fig. 2. Upon rocking movement of the rock-shaft 65 the arms 69 and 70 are withdrawn from the clutches 14 and 52, the intermediate portion 80 of the yoke-shaped member 66 is withdrawn from the sleeve 37 and the arm 77 is automatically engaged by the detent-member 74, see Figs. 23 and 24, to latch the rock-shaft in inoperative position. The clutches 14, 52 thus will be released to be slid axially by the springs 21, 54 to engage them with the driving gears 13, 51 on the shafts 11 and 48 and the sleeve 37 will be released to cause the spring 40 to carry it into engagement with the abutment on the rock-shaft 8; the winding operation being restarted thereby.

Upon completion of a bobbin B the contact arm 201 of the feeler 195 will be engaged by the winding yarn mass and the feeler will be rocked on its pivot 199 from the position shown by full lines in Fig. 27 to that indicated by dash lines. The end of the arm 203 of the feeler 195 thus will be moved laterally to release it from the upper shoulder 208 on the control lever 197 to permit the latter to rock by gravity from the position shown in Fig. 28 to that shown in Fig. 29 to release the bail of the drop-wire 185. Consequently, the arm or extension 190 of the drop-wire 185, see Figs. 26 and 27, will be raised to position its end 191 in the path of movement of the connecting-member 147 on the traverse-rod 140, see Fig. 26, which will operate in the manner explained previously to rock the detent 74 and release the rock-shaft 65 to cause arrest of the winding operation.

Upon release of the drop-wire 185 the looped end 305 of the drop-wire 302 connected thereto will move downwardly, see Fig. 32, to rock the drop-wire on its pivot 303 to move its opposite end 304 upwardly. Such upward movement of the end 304 of the drop-wire 302 will cause it to engage the depending tail-portion 299 of the drop-wire 296 and rock the latter from the position shown by full lines in Fig. 4 to that indicated by dash lines. When the rock-shaft 65 is released by the detent 74 and rocked by the springs 71, see Fig. 21, the arm 301, see Fig. 32, projecting laterally therefrom will engage the hooked end 298 of the drop-wire 296 and lift the latter, thereby raising the arm 295 of the bell-crank lever 293 on which it is mounted to rock the bell-crank lever from the position shown in Fig. 32 to that shown in Fig. 33. The end 294 of the opposite arm of the bell-crank lever 293 thus will be rocked to engage the laterally-extending flange 292 on the arm 290 and rock it on the clevis-pin 274 to release the toggle-links 270 and 271 as shown in Fig. 33. Upon release of the toggle-links 270 and 271 the spring 286 connecting the depending arm of the bell-crank lever 273 with the arm 266, see Fig. 33, will rock the latter on its pivot-stud 265 to slide the clutch-member 261 axially and engage its teeth 262 with the teeth 260 on the sleeve 259 to initiate the doffing and donning operation.

When the clutch-member 261 is engaged with the sleeve 259 the latter will be rotated from the drive-shaft 58 and through the spiral gears 257 and 258 will rotate the cam-shaft 255, see Figs. 20 and 21. The gear 258 will also drive the gear 322 to rotate the cam-shaft 323. Immediately upon rotation of the cam-shaft 255 the cam 372 will rock the bell-crank lever 368 to raise the slide 359 from the position shown in Fig. 5 to that shown in Fig. 35. Upward movement of the slide 359 thus will operate through the link 362 to rock the upper gates 337 and 338 of the magazine 326 in clockwise direction on the pintles 344 to the position shown in Figs. 35 and 36. Simultaneously, the link 363 will operate the lower gates 339 and 340 in counterclockwise direction to the position shown in Figs. 35 and 36. During this actuation of the gates 337 to 340 the fingers 356 of the lower gate 340 will be withdrawn from the compartment 334 to release a bobbin b therefrom. The fingers 353 of the lower gate 339, however, will be moved into the compartment 333 to close the bottom thereof. Simultaneously, the fingers 342 of the upper gate 337 will be withdrawn from the compartment 333 to allow the bobbins b to descend in the compartment 333 until the lowermost one engages with the fingers 353 of the lower gate 339 while the fingers 346 of the upper gate 338 are moved into the compartment 334 to hold the bobbins above the one which was released. The released bobbin b has its head h adjacent the casing 46 or toward the right as viewed in Fig. 2 to adapt it to be donned on the spindle 91.

Figure 14:
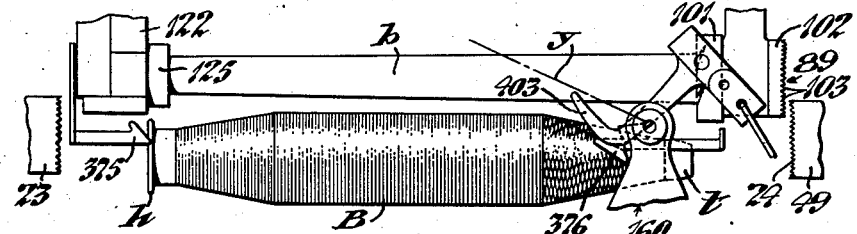
Fig. 14 is a view illustrating a doffed wound bobbin and an empty yarn-carrier as it is moved into winding position and showing the yarn-hook engaging the yarn strand between the wound bobbin and thread-guide.
Figure 15:
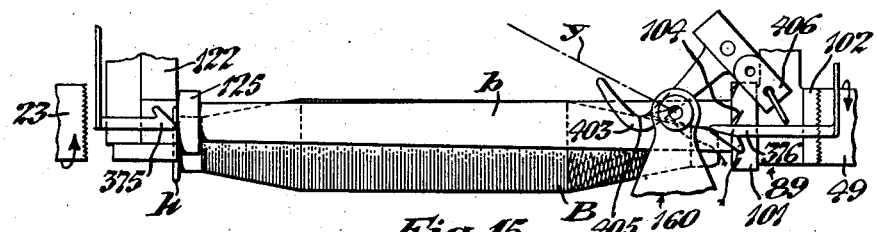
Fig. 15 is a view similar to Fig. 14 showing the empty yarn-carrier in winding position, the yarn-hook moved to engage the yarn strand with a notch in the periphery of the spindle and the yarn-retaining member in position to restrain the traverse of the yarn strand to initially wind a bunch on the carrier.
Figure 16:
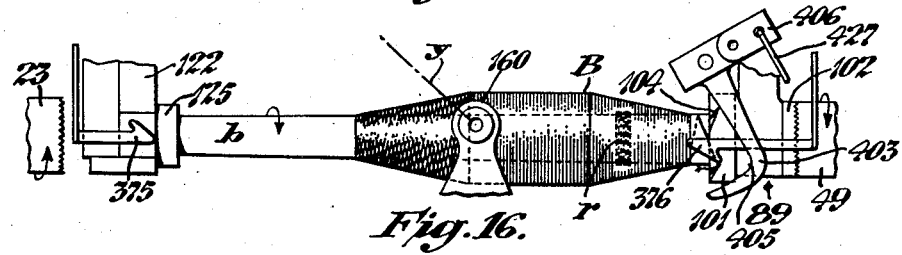
Fig. 16 is a view similar to Fig. 14 illustrating a bobbin as it is wound toward the left on the yarn-carrier and showing the yarn-retainer moved to inoperative position.

As the cam-shaft 255 commences its rotation a lobe on the face-cam 254, see Fig. 11, will operate the shifting fork 131 which bears against the gear 132 to move the turret axially toward the left as viewed in Figs. 1 to 4 and 7 to disengage the driving head 102 of the spindle 89 from the driving head 49 of the unit drive-shaft 48 as shown in Fig. 14. After the turret 93 has been shifted axially to disengage the spindle 89 from the unit drive-shaft 48 one toothed segment 320 of the gear 133 on the cam-shaft 255 will engage the gear 132 to rotate the turret through one-quarter revolution from the position shown in Figs. 7 and 8 to the position shown in Figs. 9 and 10. During this rotation of the turret 93 through one-quarter revolution the fixed cam 129 will engage the inclined cam-face 128 at the end of the hub 127 of the yoke-shaped member 122 and move it axially to the right from the position shown in Fig. 12 to that illustrated in Fig. 13 against the action of the spring 126, it being understood that these latter views show the parts in reversed position or viewed from the opposite direction as compared to Figs. 7 to 10. Such movement of the yoke-shaped member 122 will move the spindle-cups 125 mounted thereon away from the spindles 89 and 91 to release the wound bobbin B held between pairs of the latter, see Fig. 13.

Upon release of the wound bobbin B it will drop by gravity into the chute below the turret 93 formed by the plate 234 and pivoted gate 535, shown in Fig. 5, to detain the bobbin until it is released by the gate. At the end of the rotation of the turret 93 the spindle 91 and opposite spindle-cup 125 will be alined with the bobbin b supported on the cradle 335 of the magazine 326. As the turret 93 reaches this position the cam-face 128 at the end of the hub 127 of the yoke-shaped member 122 will slide off from the fixed cam 129 and the spring 126 will return the yoke-shaped member toward the plate 97 to grip the empty bobbin b between the spindle-cup 125 and the spindle 91. Thus a wound bobbin B is doffed from the spindle 89 and an empty bobbin b donned on the spindle 91.

The empty bobbin b donned on the spindle 90 during the previous doffing and donning operation is moved into winding position during the rotation of the turret 93 as above explained. After the turret 93 has completed one-quarter revolution and the teeth of the segment 320 have been disengaged from the teeth of the gear 132 a lobe on the face-cam 254 will again operate the shifting fork 131 to move the turret further to the left, as viewed in Fig. 9, to engage the driving head 121 of the spindle 90 with the driving head 23 of the unit drive-shaft 11. The bobbin b on the spindle 90 thus will be connected to be driven by the drive-shaft 11 which rotates in the opposite direction from that of the drive-shaft 48.

During the rotation of the turret 93 the cam-lug 115 on the hub 112 of the yoke-shaped member 109 will operate to set the end 200 of the feeler 194 in position to be engaged by the bobbin wound on the spindle 90, see Figs. 9 and 30 in which the parts are viewed in opposite directions. The cam-lug 115 will rock the pivoted lever 231 outwardly and such motion will be transmitted through the link 229 to rock the T-shaped member 215 in counterclockwise direction as indicated by dash lines in Fig. 30. The flange 220 at the end of the central arm 216 of the T-shaped member 215 will engage the bunter 221 on the feeler 194 and rock the latter on its pivot 198 from the position shown in Fig. 27 to that shown in Fig. 30 with the lower end of the arm 202 of the feeler riding up the inclined cam-face 210 on the control lever 196 from the lower shoulder 209, see Fig. 29, to the upper shoulder 208, see Fig. 31. Such rocking movement of the lower end of the arm 202 of the feeler 194 will rock the control lever 196 from the position shown in Fig. 29 to the position shown in Fig. 31 and thereby raise the bail of the drop-wire 185. After the feeler 194 has been set in position to be engaged by the bobbin B upon its completion the cam-lug 115 will release the pivoted lever 231 and the T-shaped member 215 will be moved to its neutral position by the spring 223.

The former-bar 482, see Fig. 3, is moved to operative position and the former-bar 483 moved to inoperative position during the doffing and donning operation by the cam 528, shown in Figs. 35 and 39. The cam 528 is mounted on the cam-shaft 255 which rotates through one-half revolution for each doffing and donning operation. During the rotation of the cam-shaft 255 the cam 528 will rock the bell-crank lever 521 in clockwise direction as viewed in Fig. 39 to slide the rod 511 downwardly. The lever 505 connected to the end of the rod 511 will be rocked in counterclockwise direction as viewed in Fig. 39 to withdraw the bearing plate 503 laterally away from the traverse-rod 140. The pivoted arm 498 on which the former-bar 483 is mounted will thereupon rock by gravity to withdraw the former-bar from its operative position shown in Fig. 39 to its inoperative position shown in Fig. 35. The end of the rod 511 being connected to one end of the transverse lever 514 will rock the latter in clockwise direction as viewed in Fig. 38. The opposite end of the transverse lever 514 being connected to the rod 510 which, in turn, is connected to the lever 504, will rock the latter in clockwise direction as viewed in Fig. 39 to move the bearing-plate 502 inwardly toward the traverse-rod 140, see Fig. 35. Due to the engagement of the plate 489 with the bearing plate 502 the former-bar 482 will be moved into operative position to be engaged by the end 166 of the arm of the thread-guide yoke 163. In other words, the cam 528 will operate through the bellcrank 521 to shift the bearing plates 502 and 503 from the position shown in Fig. 37 to the position shown in Fig. 38.

Figure 17:
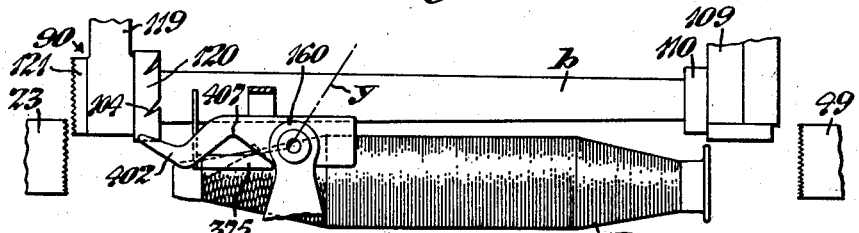
Fig. 17 is a view similar to Fig. 14 showing the wound bobbin doffed and an empty yarn-carrier as it advances into winding position.
Figure 18:
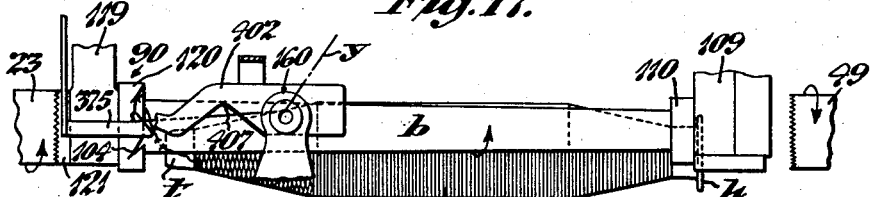
Fig. 18 is a view similar to Fig. 15 showing the empty yarn-carrier in winding position and the opposite yarn-hook and yarn-retaining member operative to start a new bobbin at the end where the winding on the previously wound bobbin was completed.
Figure 19:
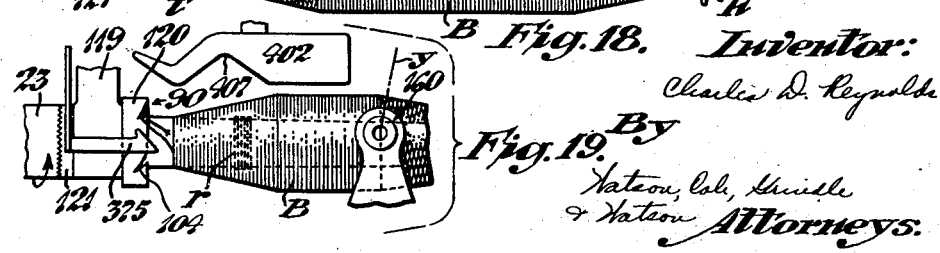
Fig. 19 is a view similar to Fig. 16 showing the succeeding bobbin as it is wound toward the right with the yarn-retaining member moved to inoperative position.

Referring to Figs. 14 to 19, the yarn-retrieving hooks 375 and 376 are operated by the levers 386 and 387 which are actuated by the cams 392 and 393. As the bobbin B wound on the spindle 89 is completed adjacent the left-hand end of the turret 93, as viewed in Figs. 1 to 7, and doffed therefrom, the yarn-retrieving hook 375 will engage the yarn strand between the doffed bobbin and the thread-guide 160 and draw it across the spindle-cup 120 on the spindle 90 in position to be engaged by a notch 104 in the cup as shown in Figs. 17 and 18.

During rotation of the sleeve 259 with the shaft 58 the cam 308 mounted thereon will rock the lever 433, see Fig. 2, which, acting through the link 435 will rock the U-shaped lever 418 to reset the bunch-building mechanism. Rocking movement of the U-shaped lever 418 will be transmitted through its side arm 419 and link 428, see Fig. 40, to rock the frame 411 and move the yarn-retaining member 402 to operative position. Simultaneously with the movement of the yarn-retaining member 402 to operative position the end of the link 428 will rock the escapement-lever 452 to the position shown in Fig. 40 to permit the ratchet-wheel 445 to be rotated by the spring 488 to its operative position. It will be understood that prior to the setting of the bunch-building mechanism by the cam 308 the cam 438 on the cam-shaft 323 will actuate the setback lever 472, see Fig. 43, to slide the traverse-rod 140 and connecting-member 147 away from the actuating lever 457 to permit the latter to be set should the traverse-rod come to rest with the connecting-member in position to prevent such setting of the actuating lever.

Adjacent the end of one revolution of the sleeve 259 the cam 308 will rock the lever 309 from the position shown by full lines in Fig. 4 to that indicated by dash lines. The lever 309 thus will be actuated to depress the link 315 and its hook-shaped end 316 will engage the arm 77, see Fig. 32, and turn the rock-shaft 65 to inoperative position to start a new winding operation. Simultaneously with the starting of a new winding operation the push-rod 280 will be elevated, see Fig. 34, to engage its abutment 313 with the outer end of the arm 279 of the bell-crank lever 273 and rock the latter to the position shown in this latter view whereby to aline the links 270 and 271 of the toggle. After the lobe of the cam 308 has turned past the follower 311 the spring 312 will rock the lever 309 from the position indicated by dash lines in Fig. 4 that shown by full lines. Thus the link 315 will be moved upwardly and the push-rod 280 depressed again to the position illustrated in Fig. 32. The spring 283 then will act on the arm 279 to rock the bell-crank lever in counterclockwise direction as viewed in Fig. 34 and through the links 270 and 271 the shifting arm 266 will be moved to disengage the clutch-member 261 from the clutch-teeth 260 on the sleeve 259 as shown in Fig. 32.

As the drive-shaft 11 starts to rotate the yarn strand y will be caught in the notch 104 in the spindle-cup 120, at which time the pivoted gate 535 of the bobbin-detaining chute will be rocked to the position indicated by dash lines in Fig. 5 by the actuation of the lever 309 and connecting linkage 543, 541 and 546. The wound bobbin B thus will be released simultaneously with the rotation of the spindle-cup 120 to cause the yarn strand y to be ruptured between the bobbin and the spindle-cup at a point adjacent the latter, the end of the strand being retained in the notch in the spindle-cup, see Fig. 18. As the yarn strand y is wound on the bobbin b advancing in the opposite direction from the winding on the previously wound bobbin B the strand will be withdrawn from the yarn-retriever hook 375 and traversed by the thread-guide 160. During the initial reciprocation of the thread-guide 160 the yarn strand will be caught in the V-shaped notch 407 of the yarn-retaining member 402 and its traverse restrained to wind a bunch r at the base of the bobbin as indicated by dotted lines in Fig. 19; it being noted that in Fig. 40 the bunch r is shown as being formed on the first or previously wound bobbin. During each reciprocation of the traverse-rod 140 the bunter 468 will engage the contact flange 467 to oscillate the actuating lever 457 of the bunch-builder. The pawl 459 on the actuating lever 457 engages the teeth of the ratchet-wheel 445 and thus will rotate it together with the disk 446 intermittently. The holding pawl 449 retains the ratchet-wheel 445 and disk 446 against retrogressive rotation between reciprocations of the pawl 459. Eventually, the ratchet-wheel will have been turned to the position shown in Fig. 3 at which juncture the arcuate recess 447 in the disk 446 will aline with the toe-portion 455 of the escapement-lever 452. The escapement-lever 452 then will be released and rocked by the spring 464 to its inoperative position shown in Fig. 3 to withdraw the flange 467 of the actuating lever 457 from the path of movement of the bunter 468. This latter rocking movement of the escapement-lever 452 will move the link 428 to rock the frame 411 and yarn-retaining member 402 to inoperative position to effect release of the yarn strand y.

Upon release of the yarn strand y from the retaining-member 402 the thread-guide 160 will traverse it to the full extent of its reciprocation to form the service winding with the layers advancing along the bobbin b. At the beginning of the service winding the end 166 of the thread-guide arm 161 will be in engagement with the inclined edge 484 of the former-bar 482 during the reciprocation of the traverse-bar 140. This engagement of the thread-guide arm 161 with the former-bar 482 will cause the end of the traverse-bar 140 to be held inwardly toward the bobbin b due to its sliding connection with the bar 141, the wire pin 150 being slidable in the slot 149 of the connecting-member 147 against the action of the spring 156. The end of the traverse-rod 140 thus will be held adjacent the bobbin b during its reciprocation to cause the contact-wheel 169 to engage the first coils of yarn wound thereon to effect intermittent rotation of the nut 168 to gradually feed the thread-guide toward the tip end of the bobbin. The advance of the thread-guide 160 in this manner causes the layers of yarn to be stepped forwardly to build a foundation mass of yarn of conical form at both ends. Eventually, the thread-guide arm 161 will ride off from the end of the former-bar 482 and the service winding will continue to build the cylindrical body of the bobbin B. The bobbin B being wound is rotated in a direction opposite to that of the previously wound bobbin B and therefore the thread-guide 160 will be advanced in the opposite direction or toward the right as viewed in Fig. 19. The service winding continues until the yarn breaks or the bobbin is completed.

Upon completion of a bobbin B on the spindle 90 the feeler 194 will be actuated to release the bail of the drop-wire 185 and thereby cause the stopping means to be actuated to arrest the winding operation and initiate the operation of the doffing and donning mechanism in the manner explained above with respect to the bobbin wound on the spindle 89. The turret 93 then will be rotated through another one-quarter revolution to doff the wound bobbin B from the spindle 90, advance the bobbin b mounted on the spindle 91 into winding position and don an empty bobbin on the succeeding spindle 92. The turret 93 will be moved axially by the spring 130 as controlled by the face-cam 254, see Fig. 9, to disengage the spindle 90 from the drive-shaft 12 and engage the spindle 91 with the drive-shaft 48. The magazine slide 359 will be lowered to operate the gate 339 and release a bobbin b from the compartment 333 as shown in Fig. 5. The lever 418, see Figs. 4 and 5, will be rocked by the cam 308 and through the links 427 and 428 will rock the yarn-retaining member 403 into its operative position shown in Fig. 40 and reset the escapement-mechanism of the bunch-builder. The feeler 195, see Fig. 27, will be reset by the cam-lug 139 on the hub 127 of the yoke-shaped member 122 and the former-bars 482, 483 reset in reverse order in the manner explained above.

It will be observed from the foregoing specification that the machine operates to wind successive bobbins in opposite directions by starting a new winding at the end where the winding on the previously wound bobbin is completed. It will be observed further that the present invention provides a machine which is entirely automatic in its operation to arrest the winding operation at the completion of each bobbin, doff the wound bobbin and don an empty yarn-carrier, attach the end of the yarn strand to the new yarn-carrier, and start another winding operation. It will be observed still further that the machine is adapted to reset the various operating elements automatically in coordinated relationship to adapt the bobbins to be wound in opposite directions.

While only one form of the invention is illustrated and described herein, it is to be understood that modifications may be made in the construction and arrangement of its parts without departing from the spirit or scope of the invention. Therefore, without limiting myself in this respect, I claim:

1. In a machine for winding successive bobbins on yarn-carriers in which the traversing means is advanced longitudinally of each rotating yarn-carrier to wind a bobbin composed of overlapping conical layers, the combination with said traversing means of means for starting the winding on each yarn-carrier adjacent the end where the winding on the previously-wound bobbin is completed and continuing the winding toward the opposite end of said carrier whereby to wind successive bobbins in opposite directions.

2. In a machine for winding successive bobbins on yarn-carriers in which the traversing means is advanced automatically longitudinally of each rotating yarn-carrier by the growth of the winding to wind the yarn in overlapping conical layers to form a bobbin on the yarn-carrier, the combination with said traversing means of means for rotatably mounting each yarn-carrier in reverse relation to the previously-wound yarn-carrier, and means for starting the winding on each yarn-carrier adjacent the end where the winding on the previously-wound bobbin is completed and continuing the winding toward the opposite end of said carrier whereby to wind successive bobbins in opposite directions.

3. In a machine for winding successive bobbins on yarn-carriers, means for mounting each yarn-carrier for rotation, means for rotating each yarn-carrier, a reciprocating thread-guide, means operative during the winding for relatively displacing the thread-guide and yarn-carrier to cause the winding to progress longitudinally of the carrier in one direction or the other to wind a bobbin, and means for starting the winding on each successive yarn-carrier adjacent the end where the winding on the previously-wound bobbin is completed and continuing the winding toward the opposite end of said carrier whereby to wind successive bobbins in opposite directions.

4. In a machine for winding successive bobbins on yarn-carriers, means for mounting each yarn-carrier for rotation, means for rotating each yarn-carrier in a direction opposite to that of the previously-wound yarn-carrier, means for winding a bobbin with the winding progressing longitudinally in one direction or the other depending upon the direction of rotation of the yarn-carrier, and means for starting the winding on each successive yarn-carrier adjacent the end where the winding on the previously-wound bobbin is completed whereby to wind successive bobbins in opposite directions.

5. In a machine for winding successive bobbins on yarn-carriers, means for mounting each yarn-carrier for rotation, means for rotating each successive yarn-carrier in a direction opposite to that of the previously-wound yarn-carrier, a reciprocating thread-guide, means operative by the rotation of the yarn-carrier for progressively advancing the thread-guide longitudinally of the yarn-carrier in one direction or the other depending upon the direction of rotation of the latter to wind a bobbin, and means for starting the winding on each yarn-carrier adjacent the end where the winding on the previously-wound bobbin is completed whereby to wind successive bobbins in opposite directions.

6. In a machine for winding successive bobbins on yarn-carriers, means for mounting each yarn-carrier for rotation, means for rotating the yarn-carriers in either direction, means operative on the last-named means to reverse the direction of rotation of each successive yarn-carrier from the direction of rotation of the previously-wound yarn-carrier, a reciprocating thread-guide, means for relatively displacing the thread-guide and yarn-carrier longitudinally of the carrier in either direction depending upon the direction of rotation of the yarn-carrier to wind a bobbin, and means for starting the winding on each yarn-carrier adjacent the end where the winding on the previously-wound bobbin is completed whereby to wind successive bobbins in opposite directions.

7. In a machine for winding successive bobbins on yarn-carriers, means for mounting each successive yarn-carrier in reversed relation to the previously-wound yarn-carrier, means for rotating each successive yarn-carrier in a direction opposite to that of the previously-wound yarn-carrier, a reciprocating thread-guide, means operative by the rotation of the yarn-carrier for progressively advancing the thread-guide longitudinally of the yarn-carrier in either direction depending upon the direction of rotation of the carrier to wind a bobbin, and means for starting the winding on each yarn-carrier adjacent the end where the winding on the previously-wound bobbin is completed whereby to wind successive bobbins in opposite directions.

8. In a winding machine of the type indicated, means for mounting each yarn-carrier for rotation, means for rotating each yarn-carrier in a direction opposite to that of the previously-wound yarn-carrier, a reciprocating traverse-rod having screw-threads thereon, a thread-guide having a contact-wheel in meshing engagement with the screw-threads on the traverse-rod, said contact-wheel adapted to engage the winding yarn mass on the yarn-carrier to advance the thread-guide longitudinally of the yarn-carrier in either direction depending upon the direction of rotation of the carrier to wind a bobbin, and means for starting the winding on each yarn-carrier adjacent the end where the winding on the previously-wound bobbin is completed whereby to wind successive bobbins in opposite directions.

9. In a machine for winding successive bobbins on yarn-carriers, means for mounting each yarn-carrier for rotation, means for rotating the yarn-carriers in either direction, means operative on the last-named means to rotate each successive yarn-carrier in a direction opposite to that of the previously-wound yarn-carrier, a reciprocating traverse-rod having screw-threads thereon, a thread-guide having a contact-wheel in meshing engagement with the screw-threads on the traverse-rod, said contact-wheel being adapted to engage the yarn mass on the yarn-carrier to advance the thread-guide longitudinally of the yarn-carrier in either direction depending upon the direction of rotation of the carrier, and means for starting the winding on each yarn-carrier adjacent the end where the winding on the previously-wound bobbin is completed whereby to wind successive bobbins in opposite directions.

10. In a machine for winding successive bobbins on yarn-carriers, means for rotating each yarn-carrier, a reciprocating thread-guide, means operative during the winding for relatively displacing the thread-guide and each yarn-carrier longitudinally of the carrier in one direction or the other to wind a bobbin, a former-bar at each end of the yarn-carrier, said former-bars being operative upon the thread-guide to form a conical chase on the yarn-carrier, and means for starting the winding on each yarn-carrier adjacent the end where the winding on the previously-wound bobbin is completed whereby to wind successive bobbins in opposite directions.

11. In a machine for winding successive bobbins on yarn-carriers, means for mounting yarn-carriers for rotation, means for rotating each yarn-carrier in a direction opposite to that of the previously-wound yarn-carrier, a reciprocating thread-guide, means for progressively advancing the thread-guide longitudinally of the yarn-carrier in either direction depending upon the direction of rotation of the carrier, a former-bar at each end of the yarn-carrier, said former-bars being operative upon the thread-guide to form a conical chase on the yarn-carrier, and means for starting the winding on each yarn-carrier adjacent the end where the winding on the previously-wound bobbin is completed whereby to wind successive bobbins in opposite directions.

12. In a winding machine of the type indicated, means for mounting yarn-carriers for rotation, means for rotating each yarn-carrier in a direction opposite to that of the previously-wound yarn-carrier, a reciprocating thread-guide, means for progressively advancing the thread-guide longitudinally of the yarn-carrier in either direction depending upon the direction of rotation of the carrier, a former-bar at each end of the yarn-carrier, said former-bars being operative upon the thread-guide to form a conical chase on the yarn-carrier, selective means for alternately moving the opposite former-bars into operative position to be engaged by the thread-guide, and means for starting the winding on each yarn-carrier adjacent the end where the winding on the previously-wound bobbin is completed whereby to wind successive bobbins in opposite directions.

13. In a machine for winding successive bobbins on yarn-carriers, means for rotating each yarn-carrier, a reciprocating thread-guide, means operative during the winding for relatively displacing the thread-guide and each yarn-carrier longitudinally of the carrier in one direction or the other to wind a bobbin, means for starting the winding at one end or the other of successive yarn-carriers whereby to wind successive bobbins in opposite directions, and yarn-retaining means for restricting the traverse of the yarn strand to wind a bunch at the beginning of each winding operation.

14. In a machine for winding successive bobbins on yarn-carriers, means for mounting each yarn-carrier for rotation, means for rotating each yarn-carrier in a direction opposite to that of the previously-wound yarn-carrier, a reciprocating thread-guide, means operative during the winding for advancing the thread-guide longitudinally of the yarn-carrier in either direction depending upon the direction of rotation of the carrier to wind a bobbin, means for starting the winding at one end or the other of successive yarn-carriers whereby to wind successive bobbins in opposite directions, and yarn-retaining means adjacent each end of the yarn-carrier for restricting the traverse of the yarn strand to wind a bunch at the beginning of each winding operation.

15. In a winding machine of the type indicated, means for mounting yarn-carriers for rotation, means for rotating each yarn-carrier in a direction opposite to that of the previously-wound yarn-carrier, a reciprocating thread-guide, means operative by the rotation of a yarn-carrier for progressively advancing the thread-guide longitudinally of the yarn-carrier to wind a bobbin, said last-named means being operative to advance the thread-guide longitudinally in either direction depending upon the direction of rotation of the yarn-carrier, means for starting the winding on each yarn-carrier adjacent the end where the winding on the previously-wound bobbin is completed whereby to wind successive bobbins in opposite directions, yarn-retaining means for restricting the traverse of the yarn strand to wind a bunch at one end of each yarn-carrier, and means for resetting the yarn-retaining means in inoperative position after a bunch has been wound.

16. In a winding machine of the type indicated, means for mounting yarn-carriers for rotation, means for rotating each yarn-carrier in a direction opposite to that of the previously-wound yarn-carrier, a reciprocating thread-guide, means operative by the rotation of the yarn-carrier for progressively advancing the thread-guide longitudinally of the yarn-carrier to wind a bobbin, said last-named means being operative to advance the thread-guide in either direction depending upon the direction of rotation of the yarn-carrier, means for starting the winding on each yarn-carrier adjacent the end where the winding on the previously-wound bobbin is completed whereby to wind successive bobbins in opposite directions, yarn-retaining means having hooks at opposite ends of the yarn-carrier engageable with the yarn strand to restrict its traverse to wind a bunch at one end of the yarn-carrier, and means for simultaneously shifting the yarn-retaining hooks to inoperative position after a bunch has been wound.

17. In a machine for winding successive bobbins on yarn-carriers, means for mounting each yarn-carrier for rotation, means for rotating each yarn-carrier, a reciprocating thread-guide, means for progressively displacing the thread-guide and yarn-carrier longitudinally of the carrier in one direction and then in opposite direction on successive yarn-carriers to wind successive bobbins in opposite directions, and means for arresting the winding operation upon completion of each bobbin wound in either direction.

18. In a machine for winding successive bobbins on yarn-carriers, means for mounting each yarn-carrier for rotation, means for rotating each yarn-carrier, a reciprocating thread-guide, means for progressively displacing the thread-guide and yarn-carrier longitudinally of the carrier in one direction and then in the opposite direction on successive yarn-carriers, means for starting the winding at one end or the other of the yarn-carriers whereby to wind successive bobbins in opposite directions, and stopping means adjacent opposite ends of the yarn-carrier, said stopping means being operative alternately to arrest the winding operation.

19. In a machine for winding successive bobbins on yarn-carriers, means for mounting each yarn-carrier for rotation, means for rotating each yarn-carrier, a reciprocating thread-guide, means for progressively displacing the thread-guide and yarn-carrier longitudinally of the carrier in one direction and then in the opposite direction on successive yarn-carriers, means for starting the winding on each yarn-carrier adjacent the end where the winding on the previously-wound bobbin is completed to wind successive bobbins in opposite directions, and stopping means operative by the winding after a predetermined growth in either direction for arresting the winding operation.

20. In a machine for winding successive bobbins on yarn-carriers, means for mounting each yarn-carrier for rotation, means for rotating each yarn-carrier, a reciprocating thread-guide, means for progressively displacing the thread-guide and yarn-carrier longitudinally of the carrier in one direction and then in the opposite direction on successive yarn-carriers, means for starting the winding on each yarn-carrier adjacent the end where the winding on the previously-wound bobbin is completed to wind successive bobbins in opposite directions, stopping means adjacent both ends of the yarn-carrier, the stopping means at the ends of the yarn-carrier being alternately operative and inoperative, and means for setting the stopping means after each winding operation to render the one adjacent the starting end of the yarn-carrier inoperative and the one adjacent the opposite end of the yarn-carrier operative.

21. In a machine for winding successive bobbins on yarn-carriers in which the rotating yarn-carrier and traversing means are displaced relatively longitudinally of the carrier during the winding to wind a bobbin, means for doffing a wound bobbin, means for donning an empty yarn-carrier, and means for starting the winding on each empty yarn-carrier adjacent the end where the winding on the previously-wound bobbin is completed and continuing the winding toward the opposite end of said carrier.

22. In a machine for winding successive bobbins on yarn-carriers in which the rotating yarn-carrier and traversing means are displaced relatively longitudinally of the carrier to wind a bobbin, means for doffing a wound bobbin, means for donning an empty yarn-carrier, said last-named means being operative to don each empty carrier in reversed relation to the previously-wound yarn-carrier, and means for starting the winding at the end of each empty yarn-carrier adjacent the end where the winding on the previously-wound bobbin is completed and continuing the winding toward the opposite end of said carrier whereby to wind successive bobbins in opposite directions.

23. In a machine for winding successive bobbins on yarn-carriers in which the rotating yarn-carrier and traversing means are displaced relatively longitudinally of the carrier to wind a bobbin, means for doffing a wound bobbin, means for donning an empty yarn-carrier, means for rotating each yarn-carrier in a direction opposite to that of the previously-wound yarn-carrier, means for relatively displacing the yarn-carrier and traversing means in one direction or the other depending upon the direction of rotation of said carrier, and means for starting the winding at the end of each empty yarn-carrier adjacent the end where the winding on the previously-wound bobbin is completed whereby to wind successive bobbins in opposite directions.

24. In a machine for winding successive bobbins on yarn-carriers in which the rotating yarn-carrier and traversing means are displaced relatively longitudinally of the carrier to wind a bobbin, means for doffing a wound bobbin, means for donning an empty yarn-carrier, said last-named means being operative for donning each empty yarn-carrier in reversed relation to the previously-wound yarn-carrier, means for rotating each yarn-carrier in a direction opposite to that of the previously-wound yarn-carrier, means for relatively displacing the yarn-carrier and traversing means in one direction or the other depending upon the direction of rotation of said carrier, and means for starting the winding on each yarn-carrier adjacent the end where the winding of the previously-wound bobbin is completed whereby to wind successive bobbins in opposite directions.

25. In a machine for winding successive bobbins on yarn-carriers, means for mounting each yarn-carrier for rotation, means for rotating each yarn-carrier, means for winding a bobbin on each yarn-carrier in a direction opposite to that of the previously-wound bobbin, means for doffing a wound bobbin and donning an empty yarn-carrier, and means for starting the winding on each empty yarn-carrier adjacent the end where the winding on the previously-wound bobbin is completed.

26. In a machine for winding successive bobbins on yarn-carriers, means for mounting each yarn-carrier for rotation, means for rotating each yarn-carrier, a reciprocating thread-guide, means operative during the winding for relatively displacing the thread-guide and each yarn-carrier longitudinally of the carrier in one direction or the other to wind a bobbin, means for doffing a wound bobbin, means for donning an empty yarn-carrier, and means for starting the winding at the end of each empty yarn-carrier adjacent the end where the winding on the previously-wound bobbin is completed whereby to wind successive bobbins in opposite directions.

27. In a winding machine of the type indicated, means for mounting yarn-carriers for rotation, means for rotating each yarn-carrier in a direction opposite to that of the previously-wound yarn-carrier, a reciprocating thread-guide, means operative upon rotation of a yarn-carrier for relatively displacing the thread-guide and yarn-carrier longitudinally of the carrier in either direction depending upon the direction of rotation of the carrier to wind a bobbin, means for doffing a wound bobbin, means for donning an empty yarn-carrier, and means for starting the winding at the end of each empty yarn-carrier adjacent the end where the winding on the previously-wound bobbin is completed whereby to wind successive bobbins in opposite directions.

28. In a machine for winding successive bobbins on yarn-carriers, means for mounting each yarn-carrier for rotation, means for rotating each yarn-carrier, a reciprocating thread-guide, means operative during the winding for relatively displacing the thread-guide and yarn-carrier longitudinally of the carrier in one direction or the other to wind a bobbin, means for doffing a wound bobbin, means for donning an empty yarn-carrier, said last-named means operative to don each yarn-carrier in reversed relation to the previously-wound yarn-carrier, and means for starting the winding on each empty yarn-carrier adjacent the end where the winding on the previously-wound bobbin is completed to wind successive bobbins in opposite directions.

29. In a machine for winding successive bobbins on yarn-carriers, means for mounting yarn-carriers for rotation, means for rotating each yarn-carrier in a direction opposite to that of the previously-wound yarn-carrier, a reciprocating thread-guide, means operative upon rotation of the yarn-carrier for relatively displacing the thread-guide and yarn-carrier longitudinally of the carrier in either direction depending upon the direction of rotation of the carrier to wind a bobbin, means for doffing a wound bobbin, means for donning an empty yarn-carrier, said last-named means operative to don each yarn-carrier in reversed relation to the previously-wound yarn-carrier, and means for starting the winding on each empty yarn-carrier adjacent the end where the winding on the previously-wound bobbin is completed whereby to wind successive bobbins in opposite directions.

30. In a winding machine of the type indicated, means for supporting yarn-carriers for rotation, means for rotating each yarn-carrier in a direction opposite to that of the previously-wound yarn-carrier, a reciprocating traverse-rod having screw-threads thereon, a thread-guide having a contact wheel in meshing engagement with the screw-threads on the traverse-rod, said contact-wheel being engageable with the winding yarn mass on the yarn-carrier for advancing the thread-guide longitudinally of the yarn-carrier in one direction or the other depending upon the direction of rotation of the latter to wind a bobbin, means for doffing a wound bobbin and donning an empty carrier, and means for starting the winding on each empty yarn-carrier adjacent the end where the winding on the previously-wound bobbin is completed whereby to wind successive bobbins in opposite directions.

31. In a machine for winding successive bobbins on yarn-carriers, means for mounting each yarn-carrier for rotation, means for rotating each yarn-carrier, means for winding bobbins in one direction or the other on successive yarn-carriers, means for doffing a wound bobbin, means for donning an empty carrier, means at each end of the yarn-carrier for gripping the yarn strand trailing from the wound bobbin, means at each end of the yarn-carrier for engaging the yarn strand to position it to be engaged by the gripping means, and means for actuating the last-named means to operative position during a doffing-and-donning operation whereby to start the winding on each yarn-carrier adjacent the end where the winding of the previously-wound bobbin is completed.

32. In a winding machine of the type indicated, means for mounting yarn-carriers for rotation, means for rotating each yarn-carrier in a direction opposite to that of the previously-wound yarn-carrier, means for winding bobbins in one direction or the other on the rotating yarn-carriers depending upon the direction of rotation of the latter, means for doffing a wound bobbin, means for donning an empty yarn-carrier, means at each end of the yarn-carrier for gripping the yarn strand trailing from the wound bobbin, a yarn-hook at each end of the yarn-carrier for engaging the yarn strand and positioning it to be engaged by the gripping means, and means for simultaneously actuating the yarn-hooks during a doffing-and-donning operation whereby to start the winding on each yarn-carrier adjacent the end where the winding on the previously-wound bobbin is completed.

33. In a winding machine of the type indicated, means for mounting yarn-carriers for rotation, means for rotating the yarn-carriers, means for winding a bobbin on each yarn-carrier in a direction opposite to that of the previously-wound yarn-carrier, means for doffing a wound bobbin and donning an empty yarn-carrier, and means operated by each bobbin after a predetermined growth thereof in either direction for arresting the winding operation and initiating the operation of the doffing-and-donning means.

34. In a winding machine of the type indicated, means for mounting yarn-carriers for rotation, means for rotating each yarn-carrier in a direction opposite to that of the previously-wound yarn-carrier, means for winding bobbins on successive yarn-carriers in opposite directions depending upon the direction of rotation of the latter, means for doffing a wound bobbin, means for donning an empty carrier, means for starting the winding at one end or the other of the yarn-carrier, and means operative by each bobbin after a predetermined growth thereof in either direction for initiating the doffing-and-donning operations and starting a new winding operation.

35. In a winding machine of the type indicated, means for mounting yarn-carriers for rotation, means for rotating each yarn-carrier in a direction opposite to that of the previously-wound yarn-carrier, a reciprocating thread-guide, means operative during the winding for relatively displacing the thread-guide and yarn-carrier longitudinally of the carrier in either direction depending upon the direction of rotation to wind a bobbin, means for doffing a wound bobbin, means for donning an empty carrier, said last-named means being operative to don each yarn-carrier in reversed relation to the preceding yarn-carrier, means at each end of the yarn-carrier for starting the winding whereby to wind successive bobbins in opposite directions, and means operated by each bobbin after a predetermined growth thereof in either direction for arresting the winding operation, initiating the operation of the doffing-and-donning means, and starting the new winding.

36. In a winding machine of the type indicated, means for mounting yarn-carriers for rotation, means for winding a bobbin on each yarn-carrier with the winding progressing in a direction opposite to that of the previously-wound bobbin, a magazine for holding a supply of empty yarn-carriers arranged in reversed relationship, means for advancing the yarn-carriers from the magazine into position to be donned in alternately reversed relationship, and means for doffing a wound bobbin and donning an empty yarn-carrier.

37. In a winding machine of the type indicated, means for mounting yarn-carriers for rotation, means for winding a bobbin on each yarn-carrier with the winding progressing in a direction opposite to that of the previously-wound bobbin, a magazine for holding a supply of empty yarn-carriers arranged in reversed relationship, means for advancing the yarn-carriers from the magazine into position to be donned in alternately reversed relationship, means for doffing a wound bobbin and donning an empty yarn-carrier, means operated by the yarn mass on each bobbin being wound after a predetermined growth thereof for initiating the operation of the doffing-and-donning means, and means for starting the winding on each empty yarn-carrier adjacent the end where the winding on the previously-wound bobbin is completed.

38. In a winding machine of the type indicated, means for mounting yarn-carriers for rotation, means for rotating each yarn-carrier in a direction opposite to that of the previously-wound yarn-carrier, means for winding a bobbin longitudinally of each yarn-carrier with the winding progressing in a direction opposite to that of the previously-wound bobbin, a magazine for holding a supply of empty yarn-carriers arranged in reversed relationship, means for advancing the yarn-carriers from the magazine into position to be donned in alternately reversed relationship, means for doffing a wound bobbin and donning an empty yarn-carrier, and means for starting the winding on each empty yarn-carrier adjacent the end where the winding on the previously-wound bobbin is completed.

39. In a winding machine of the type indicated, means for mounting yarn-carriers for rotation, means for winding a bobbin longitudinally of each yarn-carrier with the winding progressing in a direction opposite to that of the previously-wound bobbin, a magazine for holding two rows of empty yarn-carriers with the yarn-carriers of one row arranged in reversed relation to the yarn-carriers of the other row, selective means for advancing empty yarn-carriers alternately from adjacent rows in the magazine into position to be donned, and means operated by the yarn mass on each bobbin being wound after a predetermined growth thereof for doffing the wound bobbin and donning an empty yarn-carrier.

40. In a winding machine of the type indicated, a rotatable turret having a plurality of angularly-spaced winding spindles for mounting yarn-carriers, means for winding a bobbin on each yarn-carrier with the winding progressing in a direction opposite to that of the previously-wound bobbin, means for doffing a wound bobbin from one winding spindle and donning an empty yarn-carrier on another spindle during rotation of the turret, and means for rotating the turret.

41. In a winding machine of the type indicated, a rotatable turret having a plurality of angularly-spaced winding spindles for mounting yarn-carriers, the adjacent winding spindles being arranged to mount the yarn-carriers in reversed relationship, means for winding a bobbin on each yarn-carrier with the winding progressing in a direction opposite to that of the previously-wound bobbin, means for doffing a wound bobbin from one winding spindle and donning an empty yarn-carrier on another spindle during rotation of the turret, and means for rotating the turret.

42. In a winding machine of the type indicated, a rotatable turret having a plurality of angularly-spaced winding spindles for mounting yarn-carriers, the adjacent winding spindles being arranged to mount the yarn-carriers in reversed relationship, means for winding a bobbin on each yarn-carrier with the winding progressing in a direction opposite to that of the previously-wound bobbin, means for doffing a wound bobbin from one winding spindle and donning an empty yarn-carrier on another spindle during rotation of the turret, stopping means for arresting the winding operation, and means operated by each bobbin being wound after a predetermined growth thereof for actuating the stopping means to arrest the winding operation and rotate the turret.

43. In a winding machine of the type indicated, a rotatable turret having a plurality of angularly-spaced winding spindles for mounting yarn-carriers, the adjacent winding spindles being arranged to mount yarn-carriers in alternately reversed relationship, means for winding a bobbin on each yarn-carrier with the winding progressing in a direction opposite to that of the previously-wound bobbin, means for doffing a wound bobbin from one winding spindle and donning an empty yarn-carrier on another spindle during rotation of the turret, means for starting the winding at one end or the other of the yarn-carriers, stopping means for arresting the winding operation, and means operated by each bobbin being wound after a predetermined growth thereof in either direction for arresting the winding operation, rotating the turret and starting a new winding operation.

44. In a winding machine of the type indicated, a rotatable turret having a plurality of angularly-spaced winding spindles for mounting yarn-carriers, the adjacent winding spindles being arranged to mount yarn-carriers in alternately reversed relationship, means for winding a bobbin on each yarn-carrier with the winding progressing in a direction opposite to that of the previously-wound bobbin, a magazine for holding a supply of empty yarn-carriers arranged in reversed relationship, means for advancing a yarn-carrier from the magazine into position to be donned in reverse relation to the yarn-carrier previously advanced, means for doffing a wound bobbin and donning an empty yarn-carrier during rotation of the turret, and means for rotating the turret.

45. In a winding machine of the type indicated, a rotatable turret having a plurality of angularly-spaced winding spindles for mounting yarn-carriers, the adjacent winding spindles being arranged to mount yarn-carriers in alternately reversed relationship, means for winding a bobbin longitudinally of each yarn-carrier with the winding progressing in a direction opposite to that of the previously-wound bobbin, a magazine for holding two rows of empty yarn-carriers with the yarn-carriers of one row arranged in reversed relationship with respect to the yarn-carriers of the other row, selective means for advancing yarn-carriers alternately from adjacent rows in the magazine into position to be donned, means for doffing a wound bobbin and donning an empty yarn-carrier during rotation of the turret, and means operated by the yarn mass on a winding bobbin after a predetermined growth thereof for rotating the turret.

46. In a winding machine of the type indicated, a rotatable turret, a plurality of rotatable spindles arranged in angularly-spaced relationship on the turret and adapted to mount yarn-carriers, the adjacent winding spindles being adapted to mount yarn-carriers in alternately reversed relationship, driving means for the spindles, means for connecting and disconnecting successive spindles with the driving means, means for winding a bobbin on each successive yarn-carrier in a direction opposite to that of the next previously-wound bobbin, means for doffing a wound bobbin and transferring an empty yarn-carrier into winding position during rotation of the turret, and means for rotating the turret.

47. In a winding machine of the type indicated, a rotatable turret, a plurality of rotatable spindles arranged in angularly-spaced relationship on the turret and adapted to mount yarn-carriers, the adjacent winding spindles being adapted to mount yarn-carriers in alternately reversed relationship for winding bobbins in opposite directions, separate driving means at each end of the turret, means for detachably connecting one of the winding spindles with the driving means at one end of the turret, means for winding a bobbin on the yarn-carrier on said last-named spindle, means for disconnecting said winding spindle from its driving means, means for rotating the turret and detachably connecting the successive spindle with the opposite driving means, and means for doffing the wound bobbin and donning an empty yarn-carrier during rotation of the turret.

48. In a winding machine of the type indicated, a rotatable turret, a plurality of rotatable spindles arranged in angularly-spaced relationship on the turret and adapted to mount yarn-carriers, the adjacent winding spindles being adapted to mount yarn-carriers in alternately reversed relationship for winding bobbins in opposite directions, separate driving means at each end of the turret, means for rotating the separate driving means in opposite directions, means for detachably connecting one of the winding spindles with the driving means at one end of the turret, means for winding a bobbin on the yarn-carrier on said last-named spindle, means for disconnecting said winding spindle from its driving means, rotating the turret and detachably connecting the successive spindle with the opposite driving means, and means for doffing the wound bobbin and donning an empty yarn-carrier during rotation of the turret.

49. In a winding machine of the type indicated, a turret mounted for rotary and axial movement, a plurality of rotatable spindles arranged in angularly-spaced relationship on the turret and adapted to mount yarn-carriers, a driving head, means for shifting the turret axially to engage a spindle with the driving head or disengage it therefrom, means for winding bobbins on the yarn-carriers, and means for rotating the turret to simultaneously doff a wound bobbin from winding position and transfer an empty yarn-carrier into winding position.

50. In a winding machine of the type indicated, a turret mounted for rotary and axial movement, a plurality of rotatable spindles arranged in angularly-spaced relationship on the turret and adapted to mount yarn-carriers, a driving head, means for shifting the turret axially to engage a spindle with the driving head or disengage it therefrom, means for winding bobbins on the yarn-carriers, means for rotating the turret to remove a wound bobbin from winding position and transfer an empty yarn-carrier into winding position, means for doffing a wound bobbin and donning a empty yarn-carrier during rotation of the turret, and means operative upon completion of a bobbin to actuate the turret shifting and rotating means.

51. In a winding machine of the type indicated, a turret mounted for rotary and axial movement, a plurality of rotatable spindles arranged in angularly-spaced relationship on the turret, the adjacent spindles being adapted to mount yarn-carriers in alternately reversed relationship for winding bobbins in opposite directions, a driving head, means for shifting the turret axially to engage a spindle with the driving head or disengage it therefrom, means for winding a bobbin on the yarn-carrier mounted on each spindle engaged with a driving head, and means for rotating the turret to remove a wound bobbin from winding position and transfer an empty yarn-carrier into winding position.

52. In a winding machine of the type indicated, a turret mounted for rotary and axial movement, a plurality of rotatable spindles arranged in angularly-spaced relationship on the turret and adapted to mount yarn-carriers, the adjacent winding spindles being adapted to mount yarn-carriers in alternately reversed relationship, a driving head at each end of the turret in position to aline with the spindles on the turret, means for shifting the turret axially to engage successive spindles with the opposite driving heads or disengage them therefrom, means for winding a bobbin on each successive spindle in the opposite direction from that of the next previously-wound bobbin, and means for rotating the turret to simultaneously remove a wound bobbin from winding position and transfer an empty carrier into winding position.

53. In a winding machine of the type indicated, a turret mounted for rotary and axial movement, a plurality of rotatable spindles arranged in angularly-spaced relationship on the turret and adapted to mount yarn-carriers, the adjacent winding spindles being arranged to mount yarn-carriers in alternately reversed relationship, a driving head at each end of the turret in position to aline with the rotatable spindles on the turret, means for rotating the driving heads in opposite directions, means for shifting the turret axially to engage the spindles with the opposite driving heads and disengage them therefrom, means for winding bobbins on successive yarn-carriers in the opposite direction from that of the next previously-wound bobbin, and means for rotating the turret to remove a wound bobbin from winding position and transfer an empty yarn-carrier into winding position.

54. In a winding machine of the type indicated, a turret mounted for rotary and axial movement, a plurality of rotatable spindles arranged in angularly-spaced relationship on the turret and adapted to mount yarn-carriers, the adjacent winding spindles being arranged to mount successive yarn-carriers in alternately reversed relationship, a driving head at each end of the turret in position to aline with the spindles on the turret, means for rotating the driving heads in opposite directions, means for shifting the turret axially to connect successive spindles alternately with the opposite driving heads and disconnect them therefrom, means for winding bobbins on successive yarn-carriers in the opposite direction from that of the next previously-wound bobbin, means for rotating the turret to remove a wound bobbin from winding position and transfer an empty carrier into winding position, and means operative by the winding on the bobbin being wound after a predetermined growth thereof for actuating the turret shifting and rotating means.

55. In a winding machine of the type indicated, a rotatable turret having pairs of rotatable spindle-cups arranged in alinement for supporting yarn-carriers therebetween, said spindle-cups of each pair being relatively movable axially toward and away from each other to grip or release a yarn-carrier, means for winding bobbins on the yarn-carriers supported between the spindle-cups of the several pairs, means for rotating the turret, and means operative during the rotation of the turret for relatively moving the spindle-cups to doff a wound bobbin as it is transferred from winding position.

56. In a winding machine of the type indicated, a rotatable turret having pairs of rotatable spindle-cups arranged in alinement for supporting yarn-carriers therebetween, said spindle-cups of each pair being relatively movable axially toward and away from each other to grip or release the yarn-carriers, means for winding bobbins on the yarn-carriers supported between the spindle-cups, means for rotating the turret, and cams operative during the rotation of the turret for relatively moving the spindle-cups to doff the wound bobbins.

57. In a winding machine of the type indicated, a rotatable turret having alined end-members mounting a plurality of pairs of rotatable spindle-cups for supporting yarn-carriers therebetween, said end-members being relatively movable axially toward and away from each other to cause the spindle-cups to grip or release the yarn-carriers, means for winding a bobbin on one of the yarn-carriers, a magazine adjacent the winding yarn-carrier adapted to advance empty carriers one at a time, means for rotating the turret, and means operative during rotation of the turret for relatively moving the end-members axially to doff a wound bobbin as it is transferred from winding position and grip an empty yarn-carrier advanced from the magazine to transfer it into winding position.

58. In a winding machine of the type indicated, a rotatable and axially movable turret having alined end-members mounting a plurality of pairs of rotatable spindle-cups for supporting yarn-carriers therebetween, said end-members being relatively movable axially toward and away from each other to cause the spindle-cups to grip or release the yarn-carriers, a rotatable driving head, means for shifting the turret axially to engage one of the spindle-cups with the driving head or disengage it therefrom, means cooperating with the rotating yarn-carrier to wind a bobbin thereon, means for rotating the turret after the winding of a bobbin is completed, and means operative during rotation of the turret for relatively moving the end-members axially to doff the wound bobbin from one pair of spindle-cups and grip an empty yarn-carrier in another pair of spindle-cups to transfer it into winding position.

59. In a winding machine of the type indicated, a rotatable turret having alined end-members mounting a plurality of pairs of rotatable spindle-cups for supporting yarn-carriers therebetween, the adjacent pairs of spindle-cups on the end-members being arranged to mount successive yarn-carriers in alternately reversed relationship and the end-members being relatively movable axially toward and away from each other to grip or release the yarn-carriers, a driving head at each end of the turret in position to aline with one of the spindle-cups of each pair, means for rotating the driving heads in opposite directions, means for shifting the turret axially to engage a spindle-cup with one of the opposite driving heads, means cooperating with the rotating yarn-carrier to wind a bobbin thereon, means for rotating the turret after the winding of a bobbin is completed, and means operative during rotation of the turret for relatively moving the end-members to doff a wound bobbin as it is transferred from winding position and grip an empty yarn-carrier to be transferred to winding position.

60. In a machine for winding successive bobbins on yarn-carriers, means for traversing the yarn on each bobbin with a relatively short traverse, means for advancing the traverse longitudinally of each yarn-carrier, and means for causing the traverse to advance in the reverse direction on each atlernately wound carrier.

CHARLES D. REYNOLDS.